(12) United States Patent
Kang et al.

(10) Patent No.: US 12,551,531 B2
(45) Date of Patent: Feb. 17, 2026

(54) INTERLEUKIN-2 AND USE THEREOF

(71) Applicant: INNOVENT BIOLOGICS (SUZHOU) CO., LTD., Jiangsu (CN)

(72) Inventors: Lishan Kang, Jiangsu (CN); Fenggen Fu, Jiangsu (CN); Shuaixiang Zhou, Jiangsu (CN); Xinzhen Shi, Jiangsu (CN); Junjian Liu, Jiangsu (CN)

(73) Assignee: INNOVENT BIOLOGICS (SUZHOU) CO., LTD., Jiangsu (CN)

( * ) Notice: Subject to any disclaimer, the term of this patent is extended or adjusted under 35 U.S.C. 154(b) by 1480 days.

(21) Appl. No.: 17/059,539

(22) PCT Filed: Sep. 20, 2019

(86) PCT No.: PCT/CN2019/107054
§ 371 (c)(1),
(2) Date: Nov. 30, 2020

(87) PCT Pub. No.: WO2020/057645
PCT Pub. Date: Mar. 26, 2020

(65) Prior Publication Data
US 2021/0213102 A1  Jul. 15, 2021

(30) Foreign Application Priority Data
Sep. 21, 2018  (CN) .................. 201811108663.X

(51) Int. Cl.
| | |
|---|---|
| C07K 14/55 | (2006.01) |
| A61K 38/20 | (2006.01) |
| A61K 47/68 | (2017.01) |
| C07K 16/18 | (2006.01) |
| C07K 16/28 | (2006.01) |
| C07K 16/30 | (2006.01) |
| C07K 16/40 | (2006.01) |
| C12N 15/62 | (2006.01) |

(52) U.S. Cl.
CPC ...... *A61K 38/2013* (2013.01); *A61K 47/6851* (2017.08); *A61K 47/6853* (2017.08); *A61K 47/6865* (2017.08); *C07K 14/55* (2013.01); *C07K 16/18* (2013.01); *C07K 16/2803* (2013.01); *C07K 16/3053* (2013.01); *C07K 16/40* (2013.01); *C12N 15/62* (2013.01); *C07K 2317/55* (2013.01); *C07K 2317/622* (2013.01); *C07K 2319/30* (2013.01)

(58) Field of Classification Search
None
See application file for complete search history.

(56) References Cited

U.S. PATENT DOCUMENTS

| | | |
|---|---|---|
| 4,518,584 A | 5/1985 | Mark et al. |
| 5,153,310 A | 10/1992 | Mitchell et al. |
| 6,171,586 B1 | 1/2001 | Lam et al. |
| 6,207,156 B1 | 3/2001 | Kuchroo et al. |
| 6,267,958 B1 | 7/2001 | Andya et al. |
| 9,244,059 B2 | 1/2016 | Triebel et al. |
| 2004/0175357 A1 | 9/2004 | Shanafelt et al. |
| 2011/0070238 A1 | 3/2011 | Triebel et al. |
| 2011/0150892 A1 | 6/2011 | Thudium et al. |
| 2012/0244112 A1 | 9/2012 | Ast et al. |
| 2018/0142037 A1 | 5/2018 | Ast et al. |
| 2021/0221863 A1 | 7/2021 | Kang et al. |
| 2023/0145766 A1 | 5/2023 | He et al. |
| 2023/0174604 A1 | 6/2023 | Fu et al. |

FOREIGN PATENT DOCUMENTS

| | | |
|---|---|---|
| CA | 3040313 A1 | 5/2018 |
| CN | 1309705 A | 8/2001 |
| CN | 102101885 A1 | 6/2011 |
| CN | 103492411 A | 1/2014 |
| CN | 104231068 A | 12/2014 |
| CN | 105980410 A | 9/2016 |
| CN | 116370641 A | 7/2023 |
| EP | 4273161 A1 | 11/2023 |
| JP | H04-503604 A | 7/1992 |
| JP | 2007-527242 A | 9/2007 |
| JP | 2007-528728 A | 10/2007 |
| JP | 2007-535919 A | 12/2007 |
| JP | 2008-509651 A | 4/2008 |
| JP | 2014-506793 A | 3/2014 |
| JP | 2017-500040 A | 1/2017 |
| JP | 2017-518361 A | 7/2017 |
| JP | 2020-529977 A | 10/2020 |
| JP | 2021-531013 A | 11/2021 |
| TW | 201237165 A1 | 9/2012 |

(Continued)

OTHER PUBLICATIONS

Lopes et al: "ALKS 4230: a novel engineered IL-2 fusion protein with an improved cellular selectivity profile for cancer immunotherapy", Journal for Immunotherapy of Cancer, vol. 8, No. 1, 2020:e000673. 13 pages.

Wu et al: "IL-2R[alpha]-biased agonist enhances antitumor immunity by invigorating tumor-infiltrating CD25+CD8+ T cells", Nature Cancer, vol. 4, No. 9, 2023:1309-1325. 35 pages.

Zhang et al.: "Comparative analysis of bat genomes provides insight into the evolution of flight and immunity", Science, 2013, 339(6118): 456-460. 10 pages.

Smith, Interleukin-2, Inception, Impact and Implications, Science 240, 1169-76 (1988).

(Continued)

*Primary Examiner* — Michael D Pak
(74) *Attorney, Agent, or Firm* — LEASON ELLIS LLP

(57) ABSTRACT

The present invention relates to a novel interleukin-2 (IL-2) mutant protein. The present invention further provides a fusion protein and an immunoconjugate comprising the IL-2 mutant protein, a nucleic acid encoding the IL-2 mutant protein, and a vector and a host cell comprising the nucleic acid. The present invention further provides a method for preparing the IL-2 mutant protein, a pharmaceutical composition comprising the IL-2 mutant protein, and therapeutic use of the mutant protein.

13 Claims, 5 Drawing Sheets
Specification includes a Sequence Listing.

(56) References Cited

FOREIGN PATENT DOCUMENTS

| | | |
|---|---|---|
| TW | 201831688 A | 9/2018 |
| TW | 202144391 A | 12/2021 |
| WO | 1990/010070 A1 | 9/1990 |
| WO | 91/02000 A1 | 2/1991 |
| WO | 98/42752 A1 | 10/1998 |
| WO | 00/37504 A2 | 6/2000 |
| WO | 01/14424 A2 | 3/2001 |
| WO | 2005/086751 A2 | 9/2005 |
| WO | 2005/086798 A2 | 9/2005 |
| WO | 2005/100395 A2 | 10/2005 |
| WO | 2006/044908 A2 | 4/2006 |
| WO | 2010/021961 A2 | 2/2010 |
| WO | 2010/087994 A2 | 8/2010 |
| WO | 2012/119093 A1 | 9/2012 |
| WO | 2014/008218 A1 | 1/2014 |
| WO | 2014153111 A2 | 9/2014 |
| WO | 2017/025016 A1 | 2/2017 |
| WO | 2018223923 A1 | 12/2018 |
| WO | 2019/028419 A1 | 2/2019 |
| WO | 2019096194 A1 | 5/2019 |
| WO | 2019/173832 A2 | 9/2019 |
| WO | 2019246404 A1 | 12/2019 |
| WO | 2020/020783 A1 | 1/2020 |
| WO | 2020057646 A1 | 3/2020 |
| WO | 2021185361 A1 | 9/2021 |
| WO | 2023023070 A2 | 2/2023 |
| WO | 2023045977 A1 | 3/2023 |

OTHER PUBLICATIONS

Bazan et al., Unraveling the structure of IL-2, Science 257, 410-413 (1992).

Krieg et al, Improved IL-2 immunotherapy by selective stimulation of IL-2 receptors on lymphocytes and endothelial cells, Proc Natl Acad Sci 107, 11906-11 (2010).

Boyman et al., The role of interleukin-2 during homeostasis and activation of the immune system, J. Nat. Rev. Immunol. 12, 180-190 (2012).

Fontenot et al, A function for interleukin 2 in Foxp3-expressing regulatory T cells, Nature Immunol. 6,1142-51 (2005).

D'Cruz et al., Development and function of agonist-induced CD25+ Foxp3+ regulatory T cells in the absence of interleukin 2 signaling, Nature Immunol. 6,1152-59 (2005).

Maloy et al., Fueling regulation: IL-2 keeps CD4+ Treg cells fit, Nature Immunol. 6,1071-72 (2005).

Boyman et al., Selective Stimulation of T Cell Subsets with Antibody-Cytokine Immune Complexes, Science 311, 1924-1927 (2006).

Levin et al., Exploiting a natural conformational switch to engineer an interleukin-2 'superkine', Nature, vol. 484, p. 529-533, 2012.

Vazquez-Lombardi, et al., Potent antitumour activity of interleukin-2-Fc fusion proteins requires Fc-mediated depletion of regulatory T-cells, Nature Communications, 8:15373, 2017.

Gerngross, Advances in the production of human therapeutic proteins in yeasts and filamentous fungi, Nat Biotech 22, 1409-1414 (2004).

Li et al., Optimization of humanized IgGs in glycoengineered Pichia pastoris, Nat Biotech 24, 210-215 (2006).

Graham et al., Characteristics of a human cell line transformed by DNA from human adenovirus type 5, J Gen Virol 36,59-72 (1977).

Mather, Establishment and Charaterization of Two Distinct Mouse Testicular Epithelial Cell Lines, Biol Reprod 23, 243-252 (1980).

Mather et al., Culture of Testicular Cells in Hormone-supplemented serum-free medium, Annals N. Y. Acad Sci. 383, 44-68 (1982).

Urlaub et al., Isolation of Chinese hamster cell mutants deficient in dihydrofolate reductase activity, Proc Natl Acad Sci USA 77, 4216 (1980).

Hurwitz et al. (1998) CTLA-4 blockade synergizes with tumor-derived granulocyte-macrophage colony-stimulating factor for treatment of an experimental mammary carcinoma, Proc. Natl. Acad. Sci. USA 95(17):10067-10071.

Camacho et al. (2004) Phase 1 clinical trial of anti-CTLA4 human monoclonal antibody CP-675,206 in patients (pts) with advanced solid malignancies, J. Clin. Oncology 22(145): Abstract No. 2505.

Mokyr et al. Realization of the Therapeutic Potential of CTLA-4 Blockade in Low-Dose Chemotherapy-treated Tumor-bearing Mice, (1998) Cancer Res. 58:5301-5304.

Lenardo et al., Interleukin-2 programs mouse αβ T lymphocytes for apoptosis, Nature 353: 858 (1991).

Estep et al., High throughput solution based measurement of antibody-antigen affinity and epitope binning. MAbs, 2013, 5(2): pp. 270-278.

Denesyuk et al., Molecular models of two competitive inhibitors, IL-2δ2 and IL-2δ3, generated by alternative splicing of human interleukin-2, Immunology Letters, 60 (1998) 61-66.

Xu et al., Structure-Function Studies of the C-terminal α-Helix of Human Iterleukin-2 by site-directed mutagenesis, Chinese Journal of Biotechnology, 9(4):298-302, 1993.

International Search Report and Written Opinion of PCT/CN2019/107054, mailed on Dec. 20, 2019.

Lorenzo Benatuil et al.: "An improved yeast transformation method for the generation of very large human antibody libraries", Protein Engineering, Design & Selection, vol. 23 No. 4 pp. 155-159, 2010.

International Search Report and Written Opinion of PCT/CN2019/107055, mailed on Dec. 12, 2019.

Vidarsson et al., IgG subclasses and allotypes: from structure to effector functions , 2014, vol. 5, Article 520:1-17.

Carmenate et al., "Human IL-2 mutein with higher antitumor efficacy than wild type IL-2". The Journal of Immunology. 2013, 190(12): 6230-6238.

Smith et al.: "A novel, native-format bispecific antibody triggering T-cell killing of B-cells is robustly active in mouse tumor models and cynomolgus monkeys", Scientific Reports, 2015-5:17943—DOI: 10.1038/srep17943.

International Search Report and Written Opinion of PCT/CN2021/081840, mailed Jul. 1, 2021.

International Search Report and Written Opinion of PCT/CN2021/081841, mailed Jun. 18, 2021.

Chen et. al. "A novel human IL 2 mutein with minimal systemic toxicity exerts greater antitumor efficacy than wild-type IL 2", Cell Death and Disease, 2018, 9:989, pp. 1-12.

Hadash-Bengad et al., "Immunotherapy Potentiates the Effect of Chemotherapy in Metastatic Melanomna—A Retrospective Study", Frontiers in Oncology, 2020, vol. 10, Article 70, 8 pages.

International Search Report and Written Opinion of PCT/CN2024/143132, mailed Mar. 25, 2025. 13 pages.

U.S. Appl. No. 19/376,374, filed Oct. 31, 2025. [110 pages].

Chirifu et al., "Crystal structure of the IL-15-IL-15Ra complex, a cytokine-receptor unit presented in trans", Nature Immunology, vol. 8, No. 9, 2007, pp. 1001-1007.

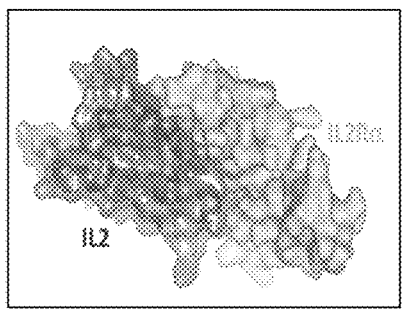
FIG. 1A. Crystal structures of IL-2 and IL-2Rα
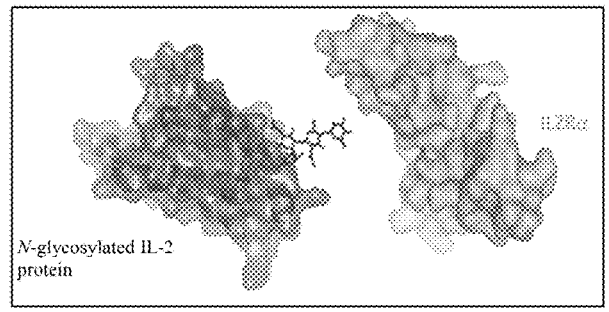
FIG. 1B. Structural schematic of glycosylated IL-2 protein
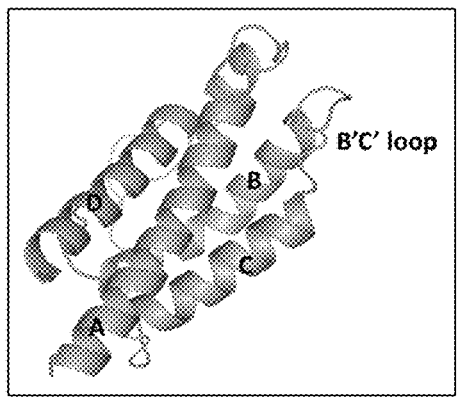
FIG. 2A. Crystal structure of IL-2 (PBD:2ERJ)
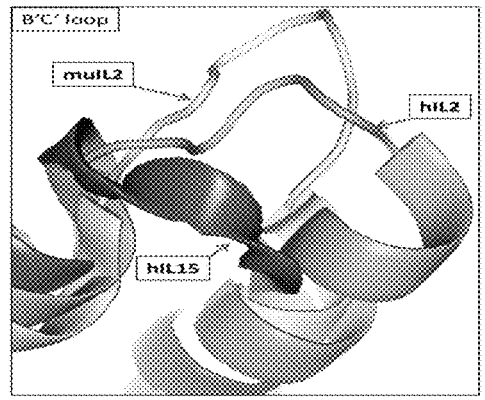
FIG. 2B. B'C' loop structure superpose of human IL-2, murine IL-2, and human IL15

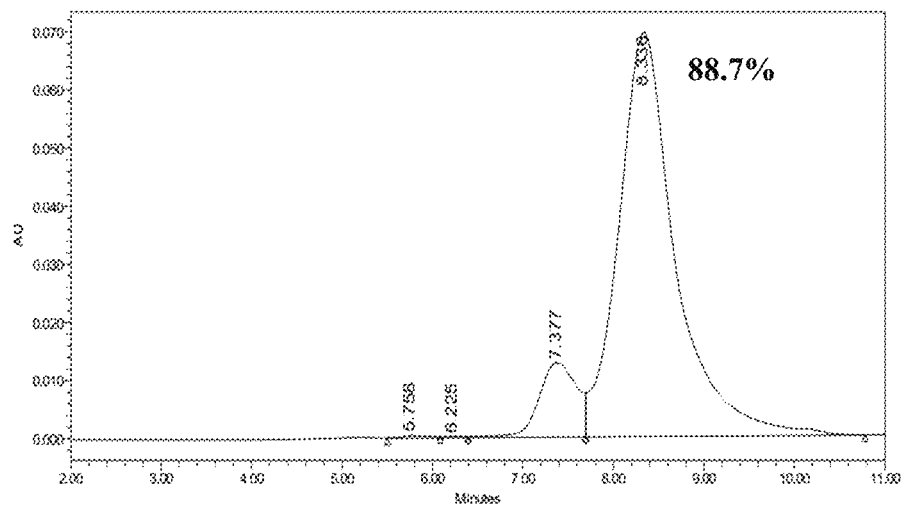
FIG. 3. HPLC purity chromatogram of a purified IL-2Rα sample
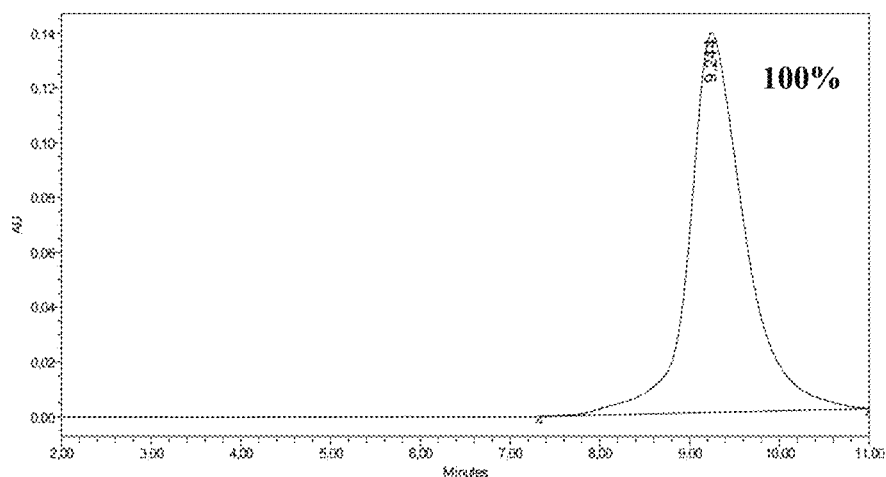
FIG. 4. HPLC purity chromatogram of a purified IL-2Rβ sample

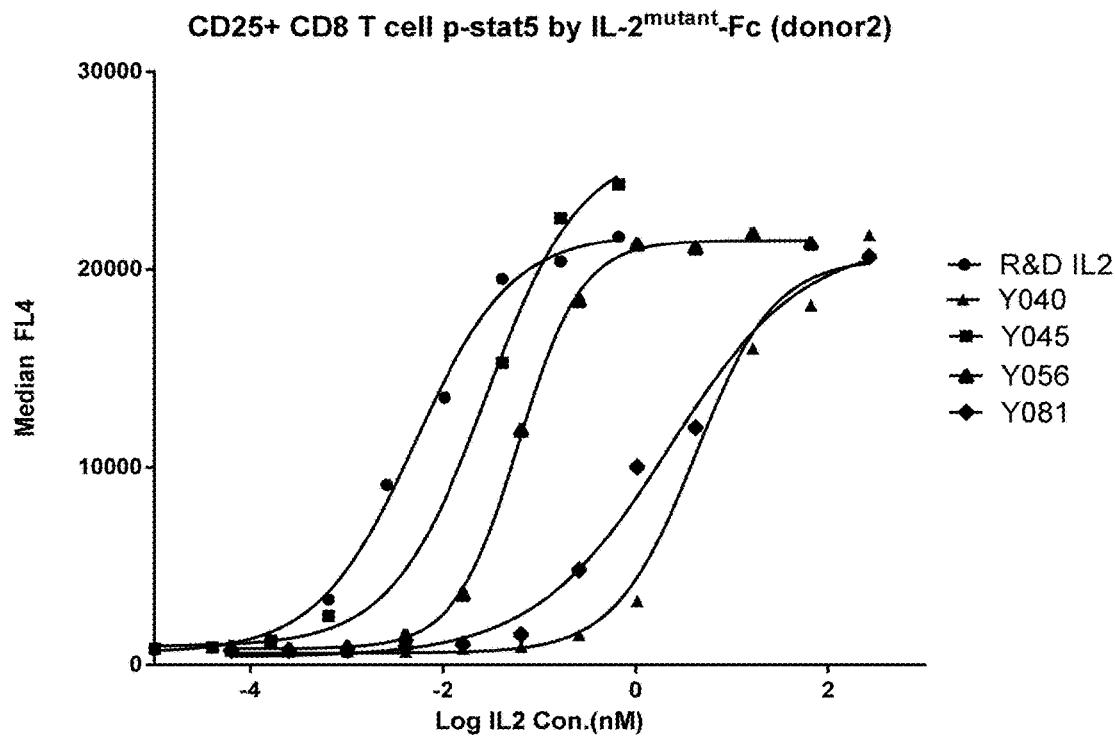

FIG. 5E

| IL-2 protein | SEQ ID NO | Position No. 1-42 | 43 | 44 | 45 |
|---|---|---|---|---|---|
| IL-2^WT | 26 | APTSSSTKKTQLQLEHLLLDLQMILNGINNYKNPKLTRMLTF | K | F | Y |
| IL-2^glycan5 | 35 | APTSSSTKKTQLQLEHLLLDLQMILNGINNYKNPKLTRMLTF | N | F | T |
| IL-2^hyb15BCL | 40 | APTSSSTKKTQLQLEHLLLDLQMILNGINNYKNPKLTRMLTF | K | F | Y |
| IL-2^truncate1 | 41 | APTSSSTKKTQLQLEHLLLDLQMILNGINNYKNPKLTRMLTF | K | F | Y |

| IL-2 protein | SEQ ID NO | Position No. 46-71 | 72 | 73-83 | 84 |
|---|---|---|---|---|---|
| IL-2^WT | 26 | MPKKATELKHLQCLEEELKPLEEVLN | L | AQSKNFHLRPR | D |
| IL-2^glycan5 | 35 | MPKKATELKHLQCLEEELKPLEEVLN | L | AQSKNFHLRPR | D |
| IL-2^hyb15BCL | 40 | MPKKATELKHLQCLEEELKPLEEVLN | L | SGDASIH | D |
| IL-2^truncate1 | 41 | MPKKATELKHLQCLEEELKPLEEVLN | L | AQSKNFH | D |

| IL-2 protein | SEQ ID NO | Position No. 85-133 |
|---|---|---|
| IL-2^WT | 26 | LISNINVIVLELKGSETTFMCEYADETATIVEFLNRWITFSQSIISTLT |
| IL-2^glycan5 | 35 | LISNINVIVLELKGSETTFMCEYADETATIVEFLNRWITFSQSIISTLT |
| IL-2^hyb15BCL | 40 | LISNINVIVLELKGSETTFMCEYADETATIVEFLNRWITFSQSIISTLT |
| IL-2^truncate1 | 41 | LISNINVIVLELKGSETTFMCEYADETATIVEFLNRWITFSQSIISTLT |

FIG. 6

INTERLEUKIN-2 AND USE THEREOF

The application contains a sequence listing which has been submitted electronically in ASCII format and is hereby incorporated by reference in its entirety. Said ASCII copy, created on Jan. 23, 2024, is named 11275_011221-US0_ST25.txt and is 5,895 bytes in size.

TECHNICAL FIELD

The present invention relates to a novel interleukin-2 (IL-2) mutant protein and use thereof. In particular, the present invention relates to an IL-2 mutant protein with improved properties, such as improved druggability, reduced binding ability for an IL-2Rα receptor, and/or enhanced binding ability for an IL-2Rβ receptor, compared to a wild-type IL-2 protein. The present invention further provides a fusion protein and an immunoconjugate comprising the IL-2 mutant protein, a nucleic acid encoding the IL-2 mutant protein, and a vector and a host cell comprising the nucleic acid. The present invention further provides a method for preparing the IL-2 mutant protein, a pharmaceutical composition comprising the IL-2 mutant protein, and therapeutic use of the mutant protein.

BACKGROUND

Interleukin-2 (IL-2), also known as T-cell growth factor (TCGF), is a pluripotent cytokine produced mainly by activated T cells, in particular, by CD4+ T helper cells. In eukaryotic cells, human IL-2 (uniprot: P60568) is synthesized as a precursor polypeptide of 153 amino acids, and mature secretory IL-2 is produced after removal of 20 N-terminus amino acids. The sequences of IL-2 from other species have also been disclosed. See NCBI Ref Seq No. NP032392 (mice), NP446288 (rats) or NP517425 (chimpanzees).

Interleukin-2 has 4 antiparallel and amphipathic a helices, which form a quaternary structure essential for its function (Smith, *Science* 240, 1169-76 (1988); Bazan, *Science* 257, 410-413 (1992)). In most cases, IL-2 acts through three different receptors: interleukin-2 receptor α (IL-2Rα; CD25), interleukin-2 receptor β(IL-2Rβ; CD122), and interleukin-2 receptor γ (IL-2Rγ; CD132). IL-2Rβ and IL-2Rγ are critical for IL-2 signaling, while IL-2Rα (CD25) is not essential for signaling but can enable IL-2 to bind to a receptor with high affinity (Krieg et al., *Proc Natl Acad Sci* 107, 11906-11 (2010)). The trimeric receptor (IL-2Rαβγ) formed by the combination of IL-2Rα, IL-2Rβ, and IL-2Rγ is an IL-2 high-affinity receptor (with a $K_D$ of about 10 μM), the dimeric receptor (IL-2Rβγ) consisting of IL-2Rβ and IL-2Rγ is an intermediate affinity receptor (with a $K_D$ of about 1 nM), and the IL-2 receptor formed solely by subunit a is a low affinity receptor.

Immune cells express dimeric or trimeric IL-2 receptors. The dimeric receptor is expressed on cytotoxic CD8+ T cells and natural killer cells (NK), whereas the trimeric receptor is expressed predominantly on activated lymphocytes and CD4+ CD25+ FoxP3+ suppressive regulatory T cells (Treg) (Byman, O. and Sprent. *J. Nat. Rev. Immunol.* 12, 180-190 (2012)). Effector T cells and NK cells in a resting state are relatively insensitive to IL-2 because they do not have CD25 on the cell surface. However, Treg cells consistently express the highest level of CD25 in vivo, and therefore normally IL-2 would preferentially stimulate Treg cell proliferation.

IL-2 mediates multiple actions in an immune response by binding to IL-2 receptors on different cells. In one aspect, as an immune system stimulator, IL-2 can stimulate T cell proliferation and differentiation, induce cytotoxic T lymphocyte (CTL) production, promote B cell proliferation and differentiation and immunoglobulin synthesis, and stimulate the production, proliferation and activation of natural killer (NK) cells, and thus has been approved as an immunotherapeutic agent for the treatment of cancer and chronic viral infection. In another aspect, IL-2 contributes to the maintenance of immunosuppressive CD4+ CD25+ regulatory T cells (i.e., Treg cells) (Fontemot et al., *Nature Immunol* 6, 1142-51 (2005); D'Cruz and Klein, *Nature Immunol* 6, 1152-59 (2005); Maloy and Powrie, *Nature Immunol* 6, 1171-72 (2005)), and mediates activation-induced cell death (AICD) and participates in the establishment and maintenance of immune tolerance to autoantigens and tumor antigens (Lenardo et al., *Nature* 353:858 (1991)), thus causing, in patients, tumor tolerance due to AICD and immunosuppression due to activated Treg cells. In addition, high-dose IL-2 administration may cause vascular leak syndrome (VLS) in patients. IL-2 has been shown to induce pulmonary edema by direct binding to IL-2 trimeric receptors (IL-2Rαβγ) on lung endothelial cells (Krieg et al., *Proc Nat Acad Sci USA* 107, 11906-11 (2010)).

To solve the above problems associated with IL-2 immunotherapy, it has been proposed to alter the selectivity or preference of IL-2 for different receptors to reduce the toxicity of IL-2 therapy and/or improve its effect. For example, it has been proposed that a complex of IL-2 and IL-2 monoclonal antibody, by targeting IL-2 to cells expressing CD122 but not CD25, induces preferential amplification of $CD122^{high}$ populations, and improves the effect of IL-2 therapy in vivo (Boyman et al., *Science* 311, 1924-1927 (2006)). Oliver A S T et al. (US2018/0142037) proposed to introduce triple mutations F42A/Y45A/L72G at amino acid residue positions 42, 45, and 72 of IL-2 so as to reduce the affinity for the IL-2Rα receptor. Aron M. Levin et al. (*Nature*, Vol 484, p 529-533, DOI: 10.1038/nature10975) proposed an IL-2 mutant $IL-2^{H9}$ called "superkine", which comprises quintuple mutations L80F/R81D/L85V/I86V/I92F and has enhanced binding to IL-2Rβ, thereby boosting the stimulation of CD25− cells, while still maintaining high binding to CD25. Rodrigo Vazquez-Lombardi et al. (*Nature Communications*, 8:15373, DOI: 10.1038/ncomms15373) proposed a human IL-2 mutant protein $IL-2^{3X}$ with triple mutations, which has residue mutations R38D-K43E-E61R at amino acid residue positions 38, 43, and 61 respectively, resulting in the mutant protein not binding to IL-2Rα. However, the mutant protein has a weak activation effect on CD25− cells, but remains activation preference for CD25+ cells. Rodrigo Vazquez-Lombardi et al. also proposed to improve the pharmacodynamic properties of interleukin by preparing interleukin 2-Fc fusions. However, the fusion proteins were low in expression level and prone to from aggregates.

In view of the role of IL-2 in immune regulation and disease, there remains a need in the art to develop new IL-2 molecules with improved properties, in particular IL-2 molecules that are advantageous to production and purification and have improved pharmacodynamic properties.

SUMMARY ne present invention satisfies the above needs by providing a novel IL-2 mutant protein with improved druggability and improved IL-2 receptor selectivity/preference relative to wild-type IL-2 protein.

Thus, in one aspect, the present invention provides a novel IL-2 mutant protein. In some embodiments, the IL-2 mutant protein disclosed herein has one or more of the following properties:
(i) improved druggability, in particular improved expression and/or purification when expressed in mammalian cells;
(ii) reduced or eliminated binding to IL-2Rα;
(iii) enhanced binding capacity to IL-2Rβ.

In some embodiments, the present invention provides an IL-2 mutant protein comprising an introduced mutated glycosylation motif at the binding interface of IL-2 and IL-2Rα. In other embodiments, the present invention provides an IL-2 mutant protein comprising a deletion and/or substitution in the B'C' loop region of IL-2 to have a shortened loop sequence. In still other embodiments, the present invention provides an IL-2 mutant protein having both a mutated glycosylation motif and a shortened B'C' loop sequence.

In addition, the present invention provides a fusion protein and an immunoconjugate comprising the IL-2 mutant protein, a pharmaceutical composition, and a combination product; a nucleic acid encoding the IL-2 mutant protein, and a vector and a host cell comprising the nucleic acid; and a method for producing the IL-2 mutant protein, the fusion protein and the immunoconjugate disclosed herein.

Furthermore, the present invention further provides a method for treating diseases, and a method and use for stimulating the immune system in a subject using the IL-2 mutant protein, the fusion, and the immunoconjugate disclosed herein. In some embodiments, the method disclosed herein results in strong activation and amplification of CD25⁻ effector T cells and NK cells in a subject. In still other embodiments, the IL-2 mediated immune downregulation on Treg cells can be effectively reduced by the methods disclosed herein.

The present invention is further illustrated in the following drawings and specific embodiments. However, these drawings and specific embodiments should not be construed as limiting the scope of the present invention, and modifications easily conceived by those skilled in the art will be included in the spirit of the present invention and the protection scope of the appended claims.

BRIEF DESCRIPTION OF THE DRAWINGS

FIG. 1 shows (A) the crystal structures of IL-2 and IL-2Rα (PDB:1Z92) and (B) the structural schematic diagram of an IL-2 glycosylated protein.

FIG. 2 shows (A) the crystal structure of IL-2 (PBD: 2ERJ) and (B) the B'C' loop structure superpose of human IL-2, murine IL-2 and human IL15.

FIG. 3 shows the HPLC purity chromatogram of a purified IL-2Rα sample.

FIG. 4 shows the HPLC purity chromatogram of a purified IL-2Rβ sample.

FIG. 6 shows the mature protein sequence (SEQ ID NO: 26) of human interleukin (IL-2) and the numbering of amino acid residues thereof, and shows exemplary IL-2 glycosylation mutant (SEQ ID NO: 35) and IL-2 chimeric (SEQ ID NO: 40) and truncated B'C' loop (SEQ ID NO; 41) mutants.

DETAILED DESCRIPTION

Figure 5A:
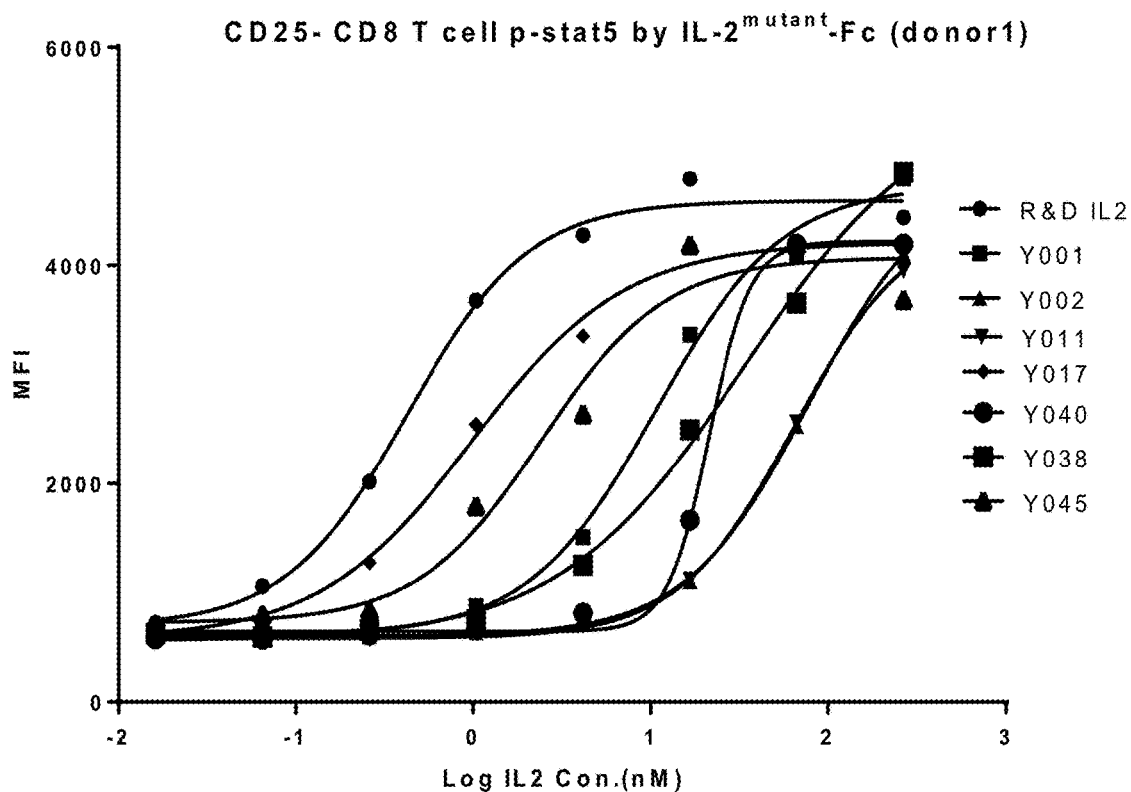
FIG. 5 shows the curves of some screened and constructed IL-2$^{mutant}$-FC fusion proteins activating p-STAT5 signals on CD8⁺ CD25⁻/CD25⁺ T cells.
Figure 5B:
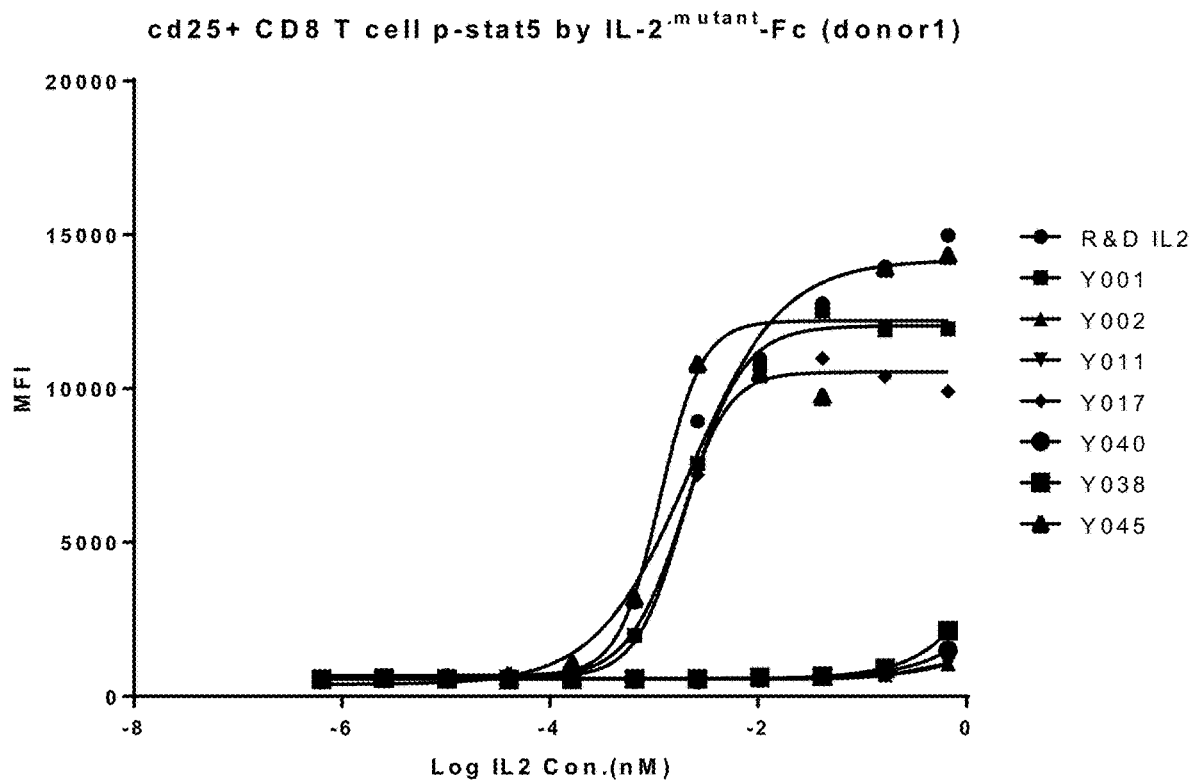

Unless otherwise defined, all technical and scientific terms used herein have the same meaning as those commonly understood by those of ordinary skill in the art. For the purposes of the present invention, the following terms are defined below.

The term "about" used in combination with a numerical value is intended to encompass the numerical values in a range from a lower limit less than the specified numerical value by 5% to an upper limit greater than the specified numerical value by 5%.

The term "and/or" should be understood to refer to any one of the options or any two or more of the options.

As used herein, the term "comprise" or "include" is intended to mean that the elements, integers or steps are included, but not to the exclusion of any other elements, integers or steps. As used herein, the term "comprise" or "include", unless indicated otherwise, also encompasses the situation where the entirety consists of the described elements, integers or steps. For example, when referring to an IL-2 mutant protein "comprising" or "including" a mutation or a combinatorial mutation, it is also intended to encompass IL-2 mutant proteins having only said mutation or combinatorial mutation.

As used herein, wild-type "interleukin-2" or "IL-2" refers to a parent IL-2 protein, preferably a naturally occurring IL-2 protein, e.g., a native IL-2 protein derived from a human, mouse, rat, or non-human primate, serving as a template to which a mutation or a combinatorial mutation disclosed herein is introduced, including both unprocessed (e.g., without the removal of the signal peptide) and processed (e.g., with the removal of the signal peptide) forms. A full-length native human IL-2 sequence comprising a signal peptide is shown in SEQ ID NO: 29 and the sequence of its mature protein is shown in SEQ ID NO: 30. In addition, this term includes naturally occurring allelic and splice variants, isotypes, homologs, and species homologs of IL-2. This term also includes variants of native IL-2, which may, for example, have at least 95%-99% or more identity to the native IL-2 or have no more than 1-10 or 1-5 amino acid mutations (especially conservative amino acid substitutions) and have substantially the same binding affinity for IL-2Rα and/or IL-2Rβ as the native IL-2 protein. Therefore, in some embodiments, compared to the native IL-2 protein, the wild-type IL-2 protein may comprise amino acid mutations that do not affect its binding to the IL-2 receptor. For example, a native human IL-2 protein (uniprot: P60568) with a mutation C125S introduced at position 125 is a wild-type IL-2 protein disclosed herein. An example of a wild-type human IL-2 protein comprising the C125S mutation is set forth in SEQ ID NO: 26. In some embodiments, the wild-type IL-2 sequence may have at least more than 85% or 95%, or even at least 96%, 97%, 98%, or 99% amino acid sequence identity to the amino acid sequence set forth in SEQ ID NOs: 26, 29, or 30.

As used herein, the amino acid mutation may be an amino acid substitution, deletion, insertion, and addition. Any combination of substitution, deletion, insertion and addition may be made to obtain a final mutant protein construct with the desired properties, such as reduced binding affinity for IL-2Rα. Amino acid deletions and insertions include amino- and/or carboxyl-terminus deletions and insertions of a polypeptide sequence. For example, an alanine residue can be deleted at position 1 of a full-length human IL-2. In some embodiments, the preferred amino acid mutation is an amino acid substitution. In other embodiments, the preferred amino acid mutation is an amino acid deletion. In some embodiments, a mutation is introduced at a specific mutant amino acid position described herein to obtain an IL-2 mutant protein with an altered glycosylation motif. In some embodiments, a mutation is introduced at a specific mutant amino acid position described herein to obtain an IL-2 mutant protein with a shortened B'C' loop sequence.

In the present invention, when mentioning the amino acid position of the IL-2 protein, it is determined by referring to the amino acid sequence of the wild-type human IL-2 protein (also referred to as IL-2$^{WT}$) set forth in SEQ ID NO: 26 (as shown in FIG. 6). The corresponding amino acid positions on other IL-2 proteins or polypeptides (including full-length sequences or truncated fragments) can be identified by performing an amino acid sequence alignment (e.g., using Basic Local Alignment Search Tool (BLAST) available from http://blast.ncbi.nlm.nih.gov/Blast.cgi?PROGRAM=blastp&PAGE_TYPE=BlastSearch&LINK_LOC=blasthome, with default parameters). Therefore, in the present invention, unless otherwise stated, an amino acid position in an IL-2 protein or polypeptide is an amino acid position numbered according to SEQ ID NO: 26. For example, when mentioning "F42", it refers to a phenylalanine residue F at position 42 of SEQ ID NO: 26, or an amino acid residue at corresponding positions of other IL-2 polypeptide sequences by alignment.

As used herein, when referring to the IL-2 mutant protein, mutations are described in the following manners. An amino acid substitution is expressed as original amino acid residue/position/amino acid residue for substitution. For example, a substitution of the amino acid at position 35 by asparagine (N) can be denoted as 35N. If the original amino acid residue at position 35 is lysine, it can also be denoted as K35N. When a residue for substitution is denoted by X, e.g., 36X, it means that the amino acid at position 36 can be substituted by any residue. If X has the value of a specific residue, the position is substituted by the specific X residue defined. However, when only the original residues and positions are given, e.g., L36 and T37 in the mutated glycosylation motif K35N-L36-T37 disclosed herein, it is meant that no mutation occurs at positions 36 and 37, i.e. the original residues L and T remain at positions 36 and 37.

As used herein, the "percent sequence identity" can be determined by comparing two optimally aligned sequences over a comparison window. Preferably, the sequence identity is determined over the full length of a reference sequence (e.g., SEQ ID NO: 26). Methods of sequence alignment for comparison are well known in the art. Algorithms suitable for determining the percent sequence identity include, for example, BLAST and BLAST 2.0 algorithms (see Altschul et al., *Nuc. Acids Res* 25: 3389-402, 1977 and Altschul et al., *J. mol. Biol.* 215: 403-10, 1990). Software for performing BLAST analysis is publicly available (http://www.ncbi.nlm.nih.gov/) from the National Center for Biotechnology Information. For purposes of this application, the percent identity is typically determined using the BLAST 2.0 algorithm, with parameters set to default values.

As used herein, the term "conservative substitution" means an amino acid substitution that does not adversely affect or alter the biological function of a protein/polypeptide comprising an amino acid sequence. For example, a conservative substitution may be introduced by standard techniques known in the art, such as site-directed mutagenesis and PCR-mediated mutagenesis. A typical conservative amino acid substitution involves a substitution of an amino acid by another amino acid having similar chemical properties (e.g., charge or hydrophobicity). The following six groups comprise amino acids that can be typically conservatively substituted by each other: 1) alanine (A), serine (S), and threonine (T); 2) aspartic acid (D) and glutamic acid (E); 3) asparagine (N) and glutamine (Q); 4) arginine (R) and lysine (K); 5) isoleucine (I), leucine (L), methionine (M), and valine (V); and 6) phenylalanine (F), tyrosine (Y), and tryptophan (W). For example, the wild-type IL-2 protein may have conservative amino acid substitutions, or only conservative amino acid substitutions, relative to one of SEQ ID NOs: 26, 29, and 30. For another example, the mutant IL-2 protein disclosed herein may have conservative amino acid substitutions, or only conservative amino acid substitutions, relative to the IL-2 mutant protein sequence specifically set forth herein (e.g., any one of SEQ ID NOs: 31-50).

"Affinity" or "binding affinity" refers to the inherent binding ability that reflects the interaction between members of a binding pair. The affinity of a molecule X for its binding partner Y can be represented by an equilibrium dissociation constant ($K_D$), which is the ratio of a dissociation rate constant ($k_{dis}$) to an association rate constant ($k_{on}$). The binding affinity can be measured by common methods known in the art. One specific method for measuring the affinity is the bio-layer interferometry (BLI) technology described herein.

As used herein, an antibody-binding molecule is a polypeptide molecule that can specifically bind to an antigen, e.g., an immunoglobulin molecule, an antibody, or an antibody fragment (e.g., a Fab fragment and a scFv fragment).

As used herein, an antibody Fc fragment refers to a C-terminus region of an immunoglobulin heavy chain that contains at least a portion of the constant region, and may include Fc fragments of native sequences and variant Fc fragments. In one embodiment, a human IgG heavy chain Fc fragment extends from Cys226 or from Pro230 of a heavy chain to a carboxyl terminus. In another embodiment, the C-terminus lysine (Lys447) of the Fc fragment may or may not be present. In other embodiments, the Fc fragment may comprise a mutation, for example, a L234A/L235A mutation. Unless otherwise indicated herein, amino acid residues in the Fc fragment are numbered according to the EU numbering system, also called the EU index, as described in Kabat, E. A. et al., *Sequences of Proteins of Immunological Interest,* 5th edition, Public Health Service, National Institutes of Health, Bethesda, MD (1991), NIH Publication 91-3242.

All aspects of the present invention are further detailed in the following sections.

1. IL-2 Mutant Protein Disclosed Herein

In one aspect, the present invention provides a novel IL-2 mutant protein with improved druggability and/or improved IL-2 receptor selectivity/preference.

Advantageous Biological Properties of the IL-2 Mutant Protein Disclosed Herein

The IL-2 protein triggers signaling and functions by interacting with IL-2 receptors. Wild-type IL-2 exhibits different affinities for different IL-2 receptors. IL-2Rβ and IL-2Rγ receptors having a low affinity for wild-type IL-2 are expressed on resting effector cells, including $CD8^+$ cytotoxic T cells and NK cells. IL-2Rα receptors with a high affinity for wild-type IL-2 are expressed on regulatory T cell (Treg) cells and activated effector cells. Due to high affinity, the wild-type IL-2 will preferentially bind to IL-2Rα on the cell surface and then recruit IL-2Rβγ. Treg cells and activated effector cells are stimulated by downstream p-STAT5 signals released through the IL-2Rβγ. Thus, without being bound by theory, decreasing or eliminating the affinity of IL-2 for the IL-2Rα receptor will reduce the preference of IL-2 for preferentially activating $CD25^+$ cells and the IL-2 mediated immune downregulation of Treg cells. Without being bound by theory, maintaining or enhancing the affinity for the IL-2Rβ receptor will retain or enhance the activation of IL-2 on effector cells such as CD8+ cytotoxic T cells and NK cells, and thus the immunostimulation of IL-2.

The inventors have found that the expression and/or purity of the IL-2 mutant protein can be improved and/or the binding of the IL-2 mutant protein to the IL-2Rα can be reduced by introducing one or more specific N-glycosylation motifs at the binding interface of the IL-2 and the IL-2Rα. Furthermore, the inventors have found that the expression and/or purity of the IL-2 can be increased and the affinity of the IL-2 for the IL-2Rβ can be increased by replacing the B'C' loop sequence of the IL-2 with a short B'C' loop sequence from another interleukin cytokine such as IL-15, or by truncating the B'C' loop sequence of the IL-2.

Thus, the present invention provides an IL-2 mutant protein with improved properties. The IL-2 mutant protein disclosed herein may have improved properties relative to the wild-type IL-2, which are selected from, for example, one or more of the following: (i) improved expression and/or purity when expressed in mammalian cells; (ii) reduced or eliminated binding to IL-2Rα; and/or (iii) enhanced binding to IL-2Rβ receptor.

In some embodiments, the IL-2 mutant protein disclosed herein has improved properties relative to the wild-type IL-2, which are selected from, for example, one or more of the following:

(1) reduced or eliminated binding affinity for IL-2Rα receptor;
(2) enhanced binding affinity for IL-2Rβ receptor;
(3) reduced binding affinity for high-affinity IL-2R receptor (IL-2Rαβγ);
(4) increased binding affinity for intermediate-affinity IL-2R receptor (IL-2Rβγ);
(5) a reduced ability to activate IL-2 signaling, particularly STAT5 phosphorylation signals, in $CD25^+$ cells (particularly activated $CD8^+$ T cells and Treg cells);
(6) resulting in a decrease in IL-2 mediated activation and proliferation of $CD25^+$ cells (particularly activated $CD8^+$ T cells and Treg cells);
(7) reducing or eliminating preference of the IL-2 for preferentially stimulating Treg cell proliferation;
(8) reducing the IL-2 mediated immune downregulation effect of Treg cells;
(9) maintaining or enhancing, especially enhancing, the activation of $CD25^-$ cells, particularly $CD25^-$ T effector cells and NK cells;
(10) resulting in an increase in IL-2 mediated activation and proliferation of effector T cells and NK cells;
(11) resulting in increased immunostimulation; and
(12) increasing anti-tumor effect.

In some embodiments, the IL-2 mutant protein disclosed herein has the property of (1) above, preferably further has one or more, especially all, properties selected from (3) and (5)-(8), and more preferably still further has one or more, especially all, properties selected from (2) and (9)-(12). In some embodiments, the IL-2 mutant protein disclosed herein has the property of (2) above, preferably further has one or more, especially all, properties selected from (9)-(12), and more preferably still further has one or more, especially all, properties selected from (1), (3), and (5)-(8).

In some preferred embodiments, the IL-2 mutant protein disclosed herein, relative to the wild-type IL-2 protein, also has the following property: reduced n vivo toxicity mediated by the binding of IL-2 to the high-affinity receptor IL-2Rαβγ.

In some embodiments, the IL-2 mutant protein disclosed herein has improved druggability. For example, when expressed in mammalian cells such as H293T cells, preferably in the form of an Fc fusion protein, the IL-2 mutant protein has one or more properties selected from the following: (i) superior expression level to the wild type IL-2 protein: (ii) superior stability to the wild-type IL-2 protein; and (iii) easy purification to a higher protein purity.

In some embodiments disclosed herein, the IL-2 mutant protein disclosed herein shows an increased expression level relative to the wild-type IL-2. In some embodiments disclosed herein, the increased expression occurs in a mammalian cell expression system. The expression level can be determined by any suitable method that allows for quantitative or semi-quantitative analysis of the amount of recombinant IL-2 protein in cell culture supernatant, preferably the supernatant purified by one-step affinity chromatography. For example, the amount of recombinant IL-2 protein in a sample can be assessed by Western blotting or ELISA. In some embodiments, compared with the wild-type IL-2 protein, the expression level of IL-2 mutant protein disclosed herein in mammalian cells is increased by more than at least 1.1-fold, or at least 1.5-fold, or at least 2-fold, 3-fold, or 4-fold.

In some embodiments, as shown by determining the purity of the protein purified by protein A affinity chromatography, the IL-2 mutant protein-Fc fusion disclosed herein exhibits better stability, e.g., less tendency to form aggregates, relative to the wild-type IL-2 protein fusion. In some embodiments, the purity of the protein is detected by a SEC-HPLC technique. In some preferred embodiments, the IL-2 mutant protein disclosed herein can reach a purity of higher than 70%, 80%, or 90% after being purified by one-step protein A affinity chromatography.

In some embodiments, compared with the wild-type IL-2 protein (e.g., $IL-2^{WT}$ set forth in SEQ ID NO: 26), the binding affinity of the IL-2 mutant protein disclosed herein for the IL-2Rα receptor is reduced by more than at least 5-fold, at least 10-fold, or at least 25-fold, especially at least 30-fold, 50-fold, or 100-fold. In a preferred embodiment, the mutant protein disclosed herein does not bind to the IL-2Rα receptor. The binding affinity can be determined by measuring the equilibrium dissociation constant ($K_D$) of the IL-2 mutant protein disclosed herein, such as the IL-2 mutant protein disclosed herein fused to an Fc fragment, to the IL-2Rα using the bio-layer interferometry (BLI) technology. In some embodiments, the monovalent binding affinity of the IL-2 mutant protein (e.g., in the form of an Fc fusion) for the IL-2Rα or IL-2Rβ is determined by BLI technology.

In some embodiments, compared with the wild-type IL-2 (e.g., $IL-2^{WT}$ set forth in SEQ ID NO: 26), the binding affinity of the IL-2 mutant protein disclosed herein for the IL-2R43 is enhanced by more than at least 5-fold, 10-fold, or at least 25-fold, especially at least 30-fold, 50-fold, or 100-fold, and more preferably at least 150-fold, 200-fold, 250-fold, 300-fold, 350-fold, 400-fold, 450-fold, or 500-fold, or 550-fold. The binding affinity can be determined by measuring the equilibrium dissociation constant ($K_D$) of the IL-2 mutant protein disclosed herein, such as the IL-2 mutant protein disclosed herein fused to an Fc fragment, to the IL-2R43 using the bio-layer interferometry (BLI) technology. In one embodiment, in a BLI assay (e.g., the BLI assay described in the examples), the monovalent binding affinity $K_D$ value of the IL-2 mutant protein disclosed herein (in the form of an IL-2-Fc fusion protein) for the IL-2Rβ is less than 10.0E-07M, such as 8.0E-07M to 1.0E-07M, such as 4.0E-07M, 3.0E-07M, 2.0E-07M, 1.0E-07M, and preferably less than 10.0E-08M, such as less than 9.0E-10M.

In one embodiment, the IL-2 mutant protein disclosed herein reduces IL-2-mediated activation and proliferation of $CD25^+$ cells relative to the wild-type IL-2. In one embodiment, the $CD25^+$ cells are $CD25^+$ $CD8^+$ T cells. In another embodiment, the $CD25^+$ cells are Treg cells. In one embodiment, in the STAT5 phosphorylation assay, the ability of the IL-2 mutant protein to activate $CD25^+$ cells is identified by measuring the activation of STAT5 phosphorylation signals by the IL-2 mutant protein in $CD25^+$ cells. For example, as described in the examples of this application, STAT5 phosphorylation in cells can be analyzed by flow cytometry to determine the half maximum effective concentration ($EC_{50}$).

In one embodiment, the IL-2 mutant protein disclosed herein maintains or enhances IL-2-mediated activation and proliferation of $CD25^-$ cells relative to the wild-type IL-2. In one embodiment, the $CD25^-$ cells are $CD8^+$ effector T cells or NK cells. In one embodiment, in the STAT5 phosphorylation assay, the ability of the IL-2 mutant protein disclosed herein to activate $CD25^-$ cells is identified by measuring the $EC_{50}$ value of the IL-2 mutant protein in activating STAT5 phosphorylation signals in $CD25^-$ cells. In one embodiment, as determined in the STAT5 phosphorylation assay, compared with the wild-type IL-2 protein (e.g., human IL-2 set forth in SEQ ID NO: 26), the ability of the IL-2 mutant protein disclosed herein to activate $CD25^+$ cells is increased by at least 1-fold, e.g., 2-fold, 3-fold, 4-fold, 5-fold, 6-fold, 7-fold, 8-fold, 9-fold, or 10-fold.

In one embodiment, the IL-2 mutant protein disclosed herein eliminates or reduces the preference of IL-2 for preferentially activating $CD25^+$ cells relative to the wild-type IL-2. In one embodiment, the $CD25^+$ cells are $CD25^+$ $CD8^+$ T cells. In another embodiment, the $CD25^+$ cells are Treg cells. In one embodiment, in the STAT5 phosphorylation assay, the ability of the IL-2 mutant protein to activate $CD25^-$ cells is identified by measuring the $EC_{50}$ values of the IL-2 mutant protein in activating STAT5 phosphorylation signals in $CD25^-$ cells and in $CD25^+$ cells respectively. For example, the activation preference of the IL-2 mutant protein for $CD25^+$ cells was determined by calculating the ratio of EC50 values of the IL-2 mutant protein in activating STAT5 phosphorylation signals in $CD25^-$ and in $CD25^+$ T cells. Preferably, compared with the wild-type protein, the preference of the mutant protein for $CD25^+$ cells is reduced by at least 10-fold, preferably at least 100-fold, 150-fold, or 200-fold.

The Mutant Protein Disclosed Herein
Glycosylated Mutant Protein

In one aspect, the present invention provides an IL-2 mutant protein comprising a mutated glycosylation motif at the binding interface of the IL-2 and the IL-2Rα.

As is known in the art, a polypeptide is typically glycosylated via an N-linkage or an O-linkage. N-linked glycosylation refers to the attachment of a carbohydrate moiety to the side chain of an asparagine residue. The tripeptide sequences asparagine-X-serine (N X S) and asparagine-X-threonine (N X T) are N-linked glycosylation motifs, wherein X is any amino acid except proline. The presence of any of these tripeptide sequences in the polypeptide will result in a potential glycosylation site. The addition of an N-linked glycosylation site to a protein (e.g., IL-2) can be conveniently accomplished by altering the amino acid sequence so that it contains one or more of the tripeptide sequences above. For example, an N-linked glycosylation site can be added by altering the amino acid. For example, the codon encoding N-X-z (wherein z is any amino acid) can be altered to encode N-X-T or N-X-S, or the codon encoding y-X-T/S can be altered to encode N-X-T/S. Alternatively, codons encoding two amino acids can be altered simultaneously to introduce N-linked glycosylation sites (e.g., codons for y-X-z can be altered to encode N-X-T/S).

As used herein, a glycosylation motif, which occurs in the IL-2 protein due to an introduced mutation, can be described as a mutated glycosylation motif. For example, the mutated glycosylation motif K35N-L36-T37 is an N-linked glycosylation motif formed by substituting lysine at position 35 by asparagine while residues at positions 36 and 37 remain unchanged. In a preferred embodiment disclosed herein, the mutated glycosylation motif introduced is an N-linked glycosylation motif N-X-S/T, wherein X is any amino acid except proline. In some embodiments, for example, X may be an amino acid same as the amino acid at the corresponding position in the wild-type IL-2, or a conservatively substituted residue thereof.

In some embodiments, the present invention provides an IL-2 glycosylated mutant protein which, as compared to the wild-type IL-2 (preferably the human IL-2, and more preferably the IL-2 comprising the sequence of SEQ ID NO: 26), comprises at least one mutation that introduces one or more glycosylation motifs N-X-S/T at an amino acid position selected from: 35N-36X-37T/S, 38N-39X-40T/S, 41N-42X-43T/S, 43N-44X-45T/S, 45N-46X-47T/S, 62N-63X-64T/S, 68N-69X-70T/S, 72N-73X-74T/S, and 74N-75X-76T/S, wherein X is any amino acid except proline, and preferably X is an amino acid same as the amino acid at the corresponding position in the wild-type IL-2 or a conservatively substituted residue thereof; and the amino acid positions are numbered according to SEQ ID NO: 26. In some embodiments, more than one N-linked glycosylation site can be introduced, such as two glycosylation sites. Different glycosylation sites can impart different properties on the IL-2. For example, some glycosylation sites can impart improved expression and/or purification, and some can improve the selectivity for the IL-2 receptor. In still other embodiments, the mutant protein disclosed herein can comprise, in addition to a glycosylation motif introduced by a mutation, at least 1-30 amino acid residues different from those of the wild-type IL-2, such as 1-20, 1-15, 1-10, or 1-5 different amino acid residues. These different residues may be conservative substitutions, or other mutations imparting other improved properties on the IL-2.

Glycosylation Mutation to Improve Druggability

In some embodiments, the mutated glycosylation motif improves the druggability of the IL-2 protein, particularly facilitates expression and/or purification of the IL-2 protein.

In one embodiment, the mutated glycosylation motif that improves the druggability is selected from 35N-36X-37T/S, 38N-39X-40T/S, and 74N-75X-76T/S. In a preferred embodiment, the mutated glycosylation motif is selected from (i) K35N-L36-T37, (ii) R38N-M39-L40S, and (iii) Q74N-S75-K76T. In a more preferred embodiment, the mutated glycosylation motif is K35N-L36-T37.

Thus, in some embodiments, the present invention provides an IL-2 mutant protein which, as compared to the wild-type IL-2, comprises a mutated glycosylation motif selected from 35N-36X-37T/S, 38N-39X-40T/S, and 74N-75X-76T/S, and has improved druggability. In one embodiment, the mutation may facilitate expression and/or purification of the IL-2 mutant protein when the mutant protein, preferably in the form of an Fc fusion protein, is expressed in a mammalian cell. In yet another embodiment, the mutation may promote the stability of the IL-2. For example, the IL-2 mutant protein, as compared to the wild-type IL-2, has a reduced tendency to form aggregates during production when expressed in the form of an Fc fusion protein. For example, after expression and one-step protein A affinity purification, the mutant protein may have a higher purity than the wild-type protein. In a preferred embodiment, as compared to the wild-type IL-2, the mutant protein comprises a mutated glycosylation motif selected from (i) K35N-L36-T37, (ii) R38N-M39-L40S, and (iii) Q74N-S75-K76T, and preferably, the mutant protein comprises the mutated glycosylation motif K35N-L36-T37.

In some embodiments, the mutated glycosylation motif is introduced into the IL-2 protein by K35N mutation. In some embodiments, the present invention provides an IL-2 mutant protein that has a mature region having at least 90% identity in an amino acid sequence to that of the wild-type IL-2 protein set forth in one of SEQ ID NOs: 26, 29, and 30, and also has the amino acid residue T37 and the K35N mutation.

In some embodiments, the mutated glycosylation motif is introduced into the IL-2 protein by a pairwise mutation selected from R38N/L40S and Q74N/K76T. In some embodiments, the present invention provides an IL-2 mutant protein that has a mature region having at least 90% identity in an amino acid sequence to that of the wild-type IL-2 protein set forth in one of SEQ ID NOs: 26, 29, and 30, and also has a pairwise mutation selected from R38N/L40S and Q74N/K76T.

In some embodiments, the mutant protein comprises a sequence having at least 90%, 92%, 93%, 94%, 95%, 96%, 97%, 98%, or 99% identity to an amino acid sequence selected from SEQ ID NOs: 31, 32, and 38. In yet another preferred embodiment, the mutant protein comprises the amino acid sequences set forth in SEQ ID NO: 31, 32, and 38.

Glycosylation Mutation that Reduces Binding to IL-2Rα

In some embodiments, the mutated glycosylation motif improves the receptor selectivity of the IL-2 protein, and particularly reduces the binding of the IL-2 to the IL-2Rα.

In one embodiment, the mutated glycosylation motif that reduces the binding of the IL-2 to the IL-2Rα is selected from 41N-42X-43T/S, 43N-44X-45T/S, 45N-46X-47T/S, 68N-69X-70T/S, and 72N-73X-74T/S, and preferably 43N-44X-45T/S, wherein the amino acid positions are numbered according to SEQ ID NO: 26. In a preferred embodiment, the mutated glycosylation motif that reduces the binding of the IL-2 to the IL-2Rα is selected from (i) T41N-F42-K43S, (ii) K43N-F44-Y45T, (iii) Y45N-M46-P47S, (iv) E68N-V69-L70S, and (v) L72N-A73-Q74T, and preferably K43N-F44-Y45T.

Thus, in some embodiments, the present invention provides an IL-2 mutant protein which, as compared to the wild-type IL-2, comprises a mutated glycosylation motif, wherein the mutant protein comprises one or more mutated glycosylation motifs selected from 41N-42X-43T/S, 43N-44X-45T/S, 45N-46X-47T/S, 68N-69X-70T/S, and 72N-73X-74T/S, and preferably 43N-44X-45T/S, wherein the amino acid positions are numbered according to SEQ ID NO: 26, and the mutant protein has reduced or eliminated binding to the IL-2Rα as compared to the wild-type IL-2.

In yet another embodiment, the present invention provides an IL-2 mutant protein which, as compared to the wild-type IL-2, comprises a mutated glycosylation motif, wherein the mutant protein comprises one or more mutated glycosylation motifs selected from (i) T41N-F42-K43S, (ii) K43N-F44-Y45T, (iii) Y45N-M46-P47S, (iv) E68N-V69-L70S, and (v) L72N-A73-Q74T, and preferably the mutant protein comprises the mutated glycosylation motif K43N-F44-Y45T.

In some embodiments, the mutated glycosylation motif is introduced into the IL-2 protein by a pairwise mutation selected from T41N/K43S, K43N/Y45T, Y45N/P47S, E68N/L70S, and L72N/Q74T. In some embodiments, the present invention provides an IL-2 mutant protein that has a mature region having at least 85% or 90% identity in an amino acid sequence to that of the wild-type IL-2 protein set forth in one of SEQ ID NOs: 26, 29, and 30, and has a pairwise mutation selected from T41N/K43S, K43N/Y45T, Y45N/P47S, E68N/L70S, and L72N/Q74T, and preferably K43N/Y45T. In some embodiments, the mutant protein comprises a sequence having at least 90%, 92%, 93%, 94%, 95%, 96%, 97%, or 98% identity to an amino acid sequence selected from SEQ ID NOs: 33, 34, 35, 37, and 39.

In some embodiments, in addition to the above mutated glycosylation motifs that reduce the binding of the IL-2 to the IL-2Rα, the IL-2 mutant protein can further comprise: (i) a mutated glycosylation motif selected from 35N-36X-37T/S, 38N-39X-40T/S, and 74N-75X-76T/S; and/or (ii) a K35Q mutation. Compared to the wild-type IL-2, the mutant protein has reduced or eliminated binding to IL-2Rα and has improved expression and/or purification. e.g., when expressed in a mammalian cell in the form of an Fc fusion protein. In some preferred embodiments, the present invention provides an IL-2 mutant protein that has a mature region having at least 85% or 90% identity in an amino acid sequence to that of the wild-type IL-2 protein set forth in one of SEQ ID NOs: 26, 29, and 30, has a pairwise mutation selected from T41N/K43S, K43N/Y45T, Y45N/P47S, E68N/L70S, and L72N % Q74T, and has a mutation selected from K35N, R38N/L40S, Q74N/K76T, and K35Q. In some embodiments, the mutant protein comprises a sequence having at least 90%, 92%, 93%, 94%, 95%, 96%, 97%, or 98% identity to an amino acid sequence selected from SEQ ID NOs: 45-47.

B'C' Loop Chimeric Mutant Protein and B'C' Loop Truncated Mutant Protein

In one aspect, the present invention provides a B'C' loop chimeric IL-2 mutant protein and a B'C' loop truncated IL-2 mutant protein formed by introducing a mutation into the B'C' loop region of the IL-2. The IL-2 protein is a member of the short chain type I cytokine family with four α-helical bundles (A, B, C, and D). As used herein, a "B'C' loop region" and a "B'C' loop sequence" can be used interchangeably and refer to a linker sequence between the B and C helices of the IL-2 protein. In one embodiment, according to the numbering of SEQ ID NO: 26, the linker sequence is a sequence linking the residue at position 72 to the residue at position 84 in the IL-2 polypeptide. In the wild-type proteins set forth in SEQ ID NOs: 26, 29, and 30, the linker sequence comprises 11 amino acids, namely A73-R83.

In some embodiments, due to the mutation introduced, the mutant protein comprises a shortened B'C' loop region (i.e. a shortened linker sequence between amino acid residues aa72 and aa84) as compared to the wild-type IL-2 (preferably, the human IL-2, and more preferably the IL-2 comprising the sequence of SEQ ID NO: 26), wherein, preferably, the shortened loop region has less than 10, 9, 8, 7, 6 or 5 amino acids in length, and more preferably has 7 amino acids in length, and the amino acid residues are numbered according to SEQ ID NO: 26.

In some embodiments, the IL-2 mutant protein disclosed herein is a B'C' loop chimeric mutant protein. The mutant protein, relative to the wild-type IL-2, comprises a substitution of a sequence from aa73 to aa83, for example, by a short B'C' loop sequence from other four-helical short-chain cytokine family members. The short B'C' loop suitable for the substitution of the wild-type IL-2 can be identified from other four-helical short-chain cytokine IL family members, such as IL-15, IL-4, IL-21, or IL family members from non-human species such as mice, by the superpose of a crystal structure. In a preferred embodiment, the sequence used for substitution is a B'C' loop sequence from interleukin IL-15, particularly human IL-15. Preferably, the sequence of residues 73-83 in the wild-type IL-2 is substituted by the sequence SGDASIH.

In some embodiments, the IL-2 mutant protein disclosed herein is a B'C' loop truncated mutant protein. The mutant protein, relative to the wild-type IL-2, has a truncation of the aa73 to aa83 sequence, e.g., truncating 1, 2, 3, or 4 amino acids from the C-terminus. Preferably, the truncated loop region (i.e., the linker sequence between position 72 and position 84) has the sequence A(Q/G)S(K/A)N(F/I)H. More preferably, the truncated loop region has the sequence AQSKNFH or AGSKNFH.

In one embodiment, by substituting or truncating the B'C' loop, the stability of the B'C' loop can be increased, thereby increasing the stability of the IL-2 and/or the affinity of the IL-2 for the IL-2Rβ. Thus, in one embodiment, the present invention provides an IL-2 mutant protein having increased stability and/or increased binding affinity for IL-2Rβ relative to the wild-type IL-2. The mutant protein comprises the aforementioned B'C' loop chimeric mutation or B'C' loop truncated mutation, especially a substituting loop sequence SGDASIH or a truncated loop sequence AQSKNFH or AGSKNFH located between position 72 and position 84.

In one embodiment, the B'C' loop chimeric mutation or B'C' loop truncated mutation not only provides increased binding to IL-2Rβ, but also can facilitate the expression and/or purification of the IL-2 protein, particularly in a mammalian cell expression system. Thus, in one embodiment, the present invention provides an IL-2 mutant protein having enhanced binding to IL-2Rβ and/or improved expression and/or purification relative to the wild-type IL-2. The IL-2 mutant protein comprises the aforementioned B'C' loop chimeric mutation or the B'C' loop truncated mutation, especially a substituting loop sequence SGDASIH or a truncated loop sequence AQSKNFH or AGSKNFH located between position 72 and position 84.

In some preferred embodiments, the present invention provides an IL-2 mutant protein that has a mature region having at least 85% or 90% identity in an amino acid sequence to that of the wild-type IL-2 protein set forth in one of SEQ ID NOs: 26, 29, and 30, and also comprises a linker sequence between amino acid positions 72 and 84 selected from SGDASIH. AQSKNFH, AGSKNFH, AQSANFH, and AQSANIH. In some embodiments, the mutant protein comprises a sequence having at least 90%, 92%, 93%, 94%, 95%, 96%, 97%, or 98% identity to an amino acid sequence selected from SEQ ID NOs: 40-44, preferably SEQ ID NOs: 40-42, more preferably SEQ ID NOs: 40 or 41.

Protein with a Combinatorial Mutation

In one aspect, the present invention provides an IL-2 mutant protein comprising a combinatorial mutation. In one embodiment, glycosylation mutations introduced into the binding interface of the IL-2 and the IL-Rα, can be combined with each other, and also can be combined with a B'C' loop mutation, preferably the B'C' loop mutation described herein. In another embodiment, the B'C' loop mutation described herein may also be combined with a glycosylation mutation introduced into the binding interface of the IL-2 and the IL-Rα, preferably the glycosylation mutation described herein. In a preferred embodiment, by combining the B'C' loop mutation with the glycosylation mutation introduced into the binding interface of the IL-2 and the IL-Rα, two or all three of the following improved properties may be provided: (i) reduced (or eliminated) binding to IL-2Rα, (ii) enhanced binding to IL-2Rβ, and (iii) improved expression and purification.

Thus, in one embodiment, the present invention provides an IL-2 mutant protein comprising, compared to the wild-type IL-2 (preferably the human IL-2, and more preferably the IL-2 comprising the sequence of SEQ ID NO: 26), the combinatorial mutation of: (i) a mutated glycosylation motif selected from 41N-42X-43T/S, 43N-44X-45T/S, 45N-46X-47T/S, 68N-69X-70T/S, and 72N-73X-74T/S; and (ii) a shortened B'C' loop region sequence between amino acid positions aa72 and aa84 selected from SGDASIH and A(Q/G)S(K/A)N(F/I)H, wherein the amino acid positions are numbered according to SEQ ID NO: 26.

In some preferred embodiments, the present invention provides an IL-2 mutant protein that has a mature region having at least 85% or 90% identity in an amino acid sequence to that of the wild-type IL-2 protein set forth in one of SEQ ID NOs: 26, 29, and 30, and also comprises a linker sequence between amino acid positions 72 and 84 selected from SGDASIH, AQSKNFH, AGSKNFH, AQSANFH, and AQSANIH, and has a pairwise mutation selected from T41N/K43S, K43N/Y45T, Y45N/P47S, E68N/L70S, and L72N/Q74T. In some preferred embodiments, the present invention provides an IL-2 mutant protein that has a mature region having at least 85% or 90% identity in an amino acid sequence to that of the wild-type IL-2 protein set forth in one of SEQ ID NOs: 26, 29, and 30, and also comprises a linker sequence between amino acid positions 72 and 84 selected from SGDASIH, AQSKNFH and AGSKNFH, and has a pairwise mutation K43N/Y45T. In some embodiments, the mutant protein comprises a sequence having at least 90%, 92%, 93%, 94%, 95%, 96%, 97%, or 98% identity to an amino acid sequence selected from SEQ ID NOs: 48, 49 or 50, preferably SEQ ID NOs: 48 or 49. In some embodiments, the mutant protein consists of the sequence of SEQ ID NOs: 48, 49, or 50.

In some embodiments, due to the combinatorial mutation, the IL-2 has a reduced preference for preferentially stimulating p-STATA5 signaling in CD25$^+$ T cells and an enhanced ability to stimulate signaling in CD25$^-$ T cells. Thus, in one embodiment, the present invention also provides an IL-2 mutant protein comprising the following combinatorial mutation:
  (i) a mutated glycosylation motif K43N-F44-Y45T at amino acid positions 43-45 and a substituting sequence SGDASIH between amino acid positions aa72 and aa84; or
  (ii) a mutated glycosylation motif K43N-F44-Y45T at amino acid positions 43-45 and a truncated sequence AQSKNFH between amino acid positions aa72 and aa84.

Besides, the mutant protein has a reduced preference for preferentially stimulating p-STATA5 signaling in CD25$^+$ T cells and an enhanced ability to stimulate signaling in CD25$^-$ T cells, as compared to the wild-type IL-2. Preferably, the mutant protein comprises a sequence of SEQ ID NOs: 48 or 49 or a sequence having at least 95%, 96%, or higher identity thereto. More preferably, the mutant protein consists of a sequence of SEQ ID NOs: 48 or 49.

Other Mutations

In addition to the mutations in the above regions and positions, the IL-2 mutant protein disclosed herein can also have one or more mutations in other regions or positions, as long as it retains one or more beneficial properties described above. For example, the IL-2 mutant protein disclosed herein may also comprise a substitution at position 125, such as C125S, C125A, C125T, or C125V, so as to provide additional advantages, such as improved expression or homogeneity or stability (see, e.g., U.S. Pat. No. 4,518,584). Those skilled in the art know how to determine additional mutations that can be incorporated into the IL-2 mutant protein disclosed herein.

The sequence difference between the IL-2 mutant protein and the wild-type protein can be expressed in terms of sequence identity or in terms of the difference in the number of amino acids between the two. In one embodiment, the IL-2 mutant protein has at least 85%, 86%, 87%, 88%, or 89% identity, preferably more than 90% (preferably 95%) but preferably no more than 97% and more preferably no more than 96% identity to the wild-type protein. In another embodiment, in addition to the above glycosylation mutations, the B'C' loop mutations, or a combinatorial mutation of both mutations disclosed herein, the IL-2 mutant protein may also have no more than 15, such as 1-10, or 1-5, mutations relative to the wild-type protein. In one embodiment, the other mutations may be conservative substitutions.

2. Fusion Protein and Immunoconjugate

The present invention also provides a fusion protein comprising the IL-2 mutant protein disclosed herein. In one preferred embodiment, the IL-2 mutant protein disclosed herein is fused to another polypeptide, such as albumin, and preferably an antibody Fc fragment, which can provide improved pharmacokinetic properties. In one embodiment, the Fc fragment comprises a mutation that reduces or removes effector functions, such as the L234A/L235A mutation or L234A/L235E/G237A mutation that reduces binding to a Fcγ receptor. Preferably, the Fc-containing fusion protein has an increased serum half-life. In a preferred embodiment, the Fc-containing fusion protein also has reduced Fc-mediated effector functions, such as reduced or eliminated ADCC or ADCP or CDC effector functions.

In one embodiment, the present invention also provides an IL-2 mutant protein-Fc fusion protein, wherein the Fc fragment comprises effector functions, such as ADCC. As reported in the literature (Rodrigo Vazquez-Lombardi et al., ibid), the wild-type IL-2 may, via fusion to the Fc, deplete Treg cells by Fc-mediated immune effector functions, particularly mediated by binding to FcγR, thereby improving the tumor therapy effect. Therefore, the fusion of the IL-2 mutant protein disclosed herein having improved production properties such as expression and/or purification with an Fc fragment retaining immune effector functions also falls within the consideration of the present invention. In one embodiment, the fusion protein comprises the mutation K35N or K35Q or the pairwise mutation R38N/L40S or Q74N/K76T. In other embodiments, the fusion protein comprises the substituting sequence SGDASIH or the truncated sequence A(Q/G)S(K/A)N(F/I)H located between amino acid positions aa72 and aa84. In one embodiment, the fusion protein comprises an amino acid sequence having more than 90% to 99% identity to an amino acid sequence selected from SEQ ID NOs: 7, 8, 14, and 20-22. In another embodiment, the fusion protein comprises an amino acid sequence having no more than 0-10 or 0-5 amino acid mutations relative to the amino acid sequence of SEQ ID NO; 12.

In some embodiments, the IL-2 mutant protein is fused to the Fc via a linker. In some embodiments, the linker may be selected to enhance the activation of the Fc fusion protein on CD25⁻ T cells. In one embodiment, the linker is GSGS, preferably 2×(G4S).

In some embodiments, the Fc fusion protein comprises an amino acid sequence having at least 85%, at least 95%, or at least 96% identity to an amino acid sequence selected from SEQ ID NOs: 3-13 and 16-25. In some embodiments, the Fc fusion protein consists of sequences of SEQ ID NOs: 3-13 and 16-25.

The present invention also provides an immunoconjugate comprising the IL-2 mutant protein disclosed herein and an antigen-binding molecule. Preferably, the antigen-binding molecule is an immunoglobulin molecule, particularly an IgG molecule, an antibody, or an antibody fragment, and more particularly a Fab molecule or an scFv molecule. In some embodiments, the antigen-binding molecule specifically binds to an antigen present on a tumor cell or in tumor environment, such as an antigen selected from: fibroblast activation protein (FAP), A1 domain of tenascin-C (TNC A1), A2 domain of tenascin-C (TNC A2), extra domain B (EDB) of fibronectin, carcinoembryonic antigen (CEA), and melanoma-associated chondroitin sulfate proteoglycan (MCSP). Thus, the immunoconjugate disclosed herein can target the tumor cell or the tumor environment after being administrated to a subject, thereby providing further therapeutic benefits, such as the feasibility of treatment at lower doses and the consequent low side effects, and enhanced anti-tumor effects.

In the fusion protein and immunoconjugate disclosed herein, the IL-2 mutant protein disclosed herein can be linked, either directly or through a linker, to another molecule or antigen-binding molecule, and in some embodiments, a proteolytic cleavage site is provided therebetween.

3. Polynucleotide, Vector, and Host

The present invention provides a nucleic acid encoding any of the IL-2 mutant proteins, fusions or conjugates above. The polynucleotide sequence encoding the mutant protein disclosed herein can be generated by de novo solid phase DNA synthesis or by PCR mutagenesis of an existing sequence encoding the wild-type IL-2 using methods well known in the art. In addition, the polynucleotide and the nucleic acid disclosed herein may comprise a segment encoding a secretion signal peptide and are operably linked to a segment encoding the mutant protein disclosed herein so that secretory expression of the mutant protein disclosed herein can be directed.

The present invention also provides a vector comprising the nucleic acid disclosed herein. In one embodiment, the vector is an expression vector, such as a eukaryotic expression vector. The vector includes, but is not limited to, a virus, a plasmid, a cosmid, a lambda phage, or a yeast artificial chromosome (YAC). In a preferred embodiment, the expression vector disclosed herein is a pYDO_017 expression vector.

In addition, the present invention also provides a host cell comprising the nucleic acid or the vector. Host cells suitable for replicating and supporting the expression of the IL-2 mutant protein, the fusion or the immunoconjugate are well known in the art. Such cells can be transfected or transduced with a particular expression vector, and a large number of cells comprising vectors can be cultivated for inoculation in large-scale fermenters, so as to obtain sufficient IL-2 mutants, fusions or immunoconjugates for clinical application. In one embodiment, the host cell is eukaryotic. In another embodiment, the host cell is selected from a yeast cell and a mammalian cell (e.g., a CHO cell or a 293 cell). For example, the polypeptide may be produced in a bacterium, particularly when glycosylation is not required. After expression, the polypeptide can be isolated from the bacterial cell paste in a soluble fraction and can be further purified. In addition to prokaryotes, eukaryotic microorganisms such as filamentous fungi or yeast are cloning or expression hosts for the vector suitable for encoding the polypeptide, including fungal and yeast strains in which the glycosylation pathway has been "humanized", which results in the production of the polypeptide with a partially or fully human glycosylation pattern. See Gemgross, *NatBiotech*, 22, 1409-1414 (2004) and Li et al., *NatBiotech*, 24, 210-215 (2006). Examples of available mammalian host cell lines include SV40 transformed monkey kidney CV1 lines (COS-7), human embryonic kidney lines (293 or 293T cells, as described, for example, in Graham el al., *JGenVirol* 36, 59 (1977)), baby hamster kidney cells (BHK), mouse Sertoli cells (TM4 cells, as described, for example, in Mather, *BiolReprod* 23, 243-251 (1980)), monkey kidney cells (CV1), African green monkey kidney cells (VERO-76), human cervical cancer cells (HELA), canine kidney cells (MDCK), buffalo rat liver cells (BRL3A), human lung cells (W138), human liver cells (HepG2), mouse mammary tumor cells (MMT060562), TRI cells (as described, for example, in Mather et al., *Annals N.Y. AcadSci* 383, 44-68 (1982)), MRC5 cells, and FS4 cells. Other available mammalian host cell lines include Chinese hamster ovary (CHO) cells, including dhfr-CHO cells (Urlaub et al., *ProcNatlAcadSciUSA* 77, 4216 (1980)), and myeloma cell lines such as YO, NS0, P3X63, and Sp2/0. In one embodiment, the host cell is a eukaryotic cell, preferably a mammalian cell such as a Chinese hamster ovary (CHO) cell, a human embryonic kidney (HEK) cell, or a lymphocyte (e.g., YO, NS0, and Sp20 cells).

4. Preparation Method

In a further aspect, the present invention provides a method for preparing the IL-2 mutant protein, the fusion or the conjugate disclosed herein, wherein the method comprises culturing a host cell comprising a nucleic acid encoding the protein, the fusion or the conjugate under conditions suitable for expression of the IL-2 mutant protein, the fusion or the conjugate, as provided above, and optionally isolating the protein, the fusion or the conjugate from the host cell (or the host cell culture medium).

5. Assay

The IL-2 mutant protein provided herein can be identified, screened, or characterized for its physical/chemical properties and/or biological activities through a variety of assays known in the art.

In one aspect, the IL-2 mutant protein disclosed herein can be tested for its binding activity to an IL-2 receptor. For example, the binding to a human IL-2Rα or β protein can be determined by methods known in the art, such as ELISA, Western blotting, and the like, or by the exemplary methods disclosed in the examples herein. For example, the flow cytometry can be used, wherein cells such as yeast display cells that are transfected to express the mutant protein on the cell surface react with a labeled (e.g., biotin-labeled) IL-2Rα or β protein. Alternatively, the binding of the mutant protein to the receptor, including the binding kinetics (e.g., the $K_D$ value), can be determined by a bio-layer interferometry (BLI) assay using a recombinant mutant protein-Fc fusion. In some embodiments, the BLI assay as described in the examples is used.

In yet another aspect, the ability of the IL-2 mutant protein to bind to the IL-2 receptor can be measured indirectly by measuring the signaling and/or immune activation at the downstream of receptor binding.

Thus, in some embodiments, an assay for identifying the IL-2 mutant protein having a biological activity is provided. The biological activities may include, for example, the ability to induce proliferation of T cells and/or NK cells and/or Treg cells with IL-2 receptors, the ability to induce IL-2 signaling in T cells and/or NK cells and/or Treg cells with IL-2 receptors, reduced ability to induce apoptosis in T cells, the ability to induce tumor regression and/or to improve survival, and reduced in vivo toxicity properties, such as reduced vascular permeability. The present invention also provides an IL-2 mutant protein having such biological activities in vivo and/or in vitro.

Various methods known in the art can be used for determining the biological activities of the IL-2. For example, an assay suitable for testing the ability of the IL-2 mutant protein disclosed herein to stimulate IFN-γ production by NK cells may comprise the steps of: incubating the cultured NK cells with the IL-2 mutant protein, the fusion or the immunoconjugate disclosed herein, and measuring the IFN-γ concentration in the culture medium by ELISA. IL-2 signaling induces several signaling pathways and involves JAK (Janus kinase) and STAT (signal transducers and activators of transcription) signaling molecules.

The interaction of the IL-2 with the β and γ subunits of the receptor results in phosphorylation of the receptor and JAK1 and JAK3 (which bind to the 0 and γ subunits, respectively). STAT5 then binds to the phosphorylated receptor and is phosphorylated on a very important tyrosine residue. This results in dissociation of STAT5 from the receptor, dimerization of STAT5, and translocation of STAT5 dimers to the nucleus where they facilitate the transcription of target genes. Thus, the ability of the mutant IL-2 polypeptide to induce signaling via the IL-2 receptor can be assessed, for example, by measuring the phosphorylation of STAT5. Details of this method have been disclosed in the examples. For example, PBMCs can be treated with the mutant IL-2 polypeptide, the fusion or the immunoconjugate disclosed herein, and the level of phosphorylated STAT5 is determined by flow cytometry.

In addition, T-cell or NK-cell proliferation in response to the IL-2 can be measured by incubating T cells or NK cells isolated from blood with the mutant IL-2 polypeptide or the immunoconjugate disclosed herein, followed by determination of ATP content in lysates of the treated cells. Prior to treatment, T cells may be pre-stimulated with phytohemagglutinin (PHA-M). This assay allows sensitive quantification of the number of viable cells, and a number of suitable alternative assays (e.g., [3H]-thymidine incorporation assay, cell titration GloATP assay, AlamarBlue assay, WST-1 assay, and MTT assay) are also known in the art.

Furthermore, the effect of the mutant IL-2 on tumor growth and survival can be assessed in a variety of animal tumor models known in the art. For example, heterografts of human cancer cell lines can be implanted into immunodeficient mice and treated with the mutant IL-2 polypeptide, the fusion or the immunoconjugate disclosed herein. The in vivo toxicity of the mutant IL-2 polypeptide, the fusion, and the immunoconjugate disclosed herein can be determined based on mortality, life-time observations (visible symptoms of adverse effects, e.g., behavior, body weight, and body temperature), and clinical and anatomical pathology (e.g., measurement of blood chemistry values and/or histopathological analysis). For example, the vascular permeability induced by IL-2 treatment can be examined with a vascular leakage reporter molecule in a pretreated vascular permeability animal model. Preferably, the vascular leakage reporter molecule is large enough to reveal the permeability of the wild-type IL-2 form for pretreatment.

Furthermore, for the IL-2 glycosylated mutant protein disclosed herein, the presence, absence, or degree of glycosylation can also be determined by any method known to those skilled in the art, including a semi-qualitative measurement of the molecular weight (MW) shift, as observed by Western blotting or from Coomassie-stained SDS-PAGE gels. A quantitative measurement can include the use of mass spectrometer techniques and observation of the added MW shift corresponding to asparagine-linked glycosylation, or observation of the mass shift associated with removal of asparagine-linked glycosylation by an enzyme such as peptide-N-glycosidase F (PNGase-F; SigmaAldrich, St. Louis, MO).

6. Screening Method

In a further aspect, the present invention provides a method for obtaining the IL-2 mutant protein with improved properties.

In one embodiment, the present invention provides a method for obtaining the IL-2 mutant protein, comprising:
  artificially engineering one or more (e.g., two or three) glycosylation motifs N-X-S/T (X can be any amino acid except P (proline)) at the binding interface of the IL-2 and the IL-2Rα, and preferably introducing a glycosylation motif in the region of the IL-2 selected from: aa35-40, aa41-47, aa62-64, aa68-74, and aa74-76;
  and allowing expression of the engineered IL-2 mutant protein, e.g., in the form of an Fc fusion (e.g., FcLALA fusion), in mammalian cells (e.g., HEK293 cells or CHO cells). For the design of a site for introducing glycosylation motifs, an N-glycosylation prediction tool can be used to select the site that can be mutated to promote potential N-linked glycosylation, for example, by identifying residues that can be mutated to form a standard N-x-T/S glycosylation site (wherein N is asparagine and x is any amino acid except proline). Furthermore, an amino acid in the IL-2 that is 3.6 Å away from the IL-2Rα and has side chains exposed in a solution can be identified as a candidate amino acid for mutation to asparagine using a structure-based approach. In some preferred embodiments, the introduced glycosylation motif mutation is selected from K35N-L36-T37, R38N-M39-L40S, T41N-F42-K43S, K43N-F44-Y45T, Y45N-M46-P47S, E62N-L63-K64T, E68N-V69-L70S, L72N-A73-Q74T, and Q74N-S75-K76T.

In another aspect, the present invention provides a method for obtaining the IL-2 mutant protein, comprising:
  introducing deletions and/or substitutions in the B'C' loop region (aa73-83) of the IL-2 to form a shortened loop region, and preferably substituting the B'C' loop region by a B'C' loop sequence from other four-helical short-chain cytokine family members, such as IL-15, to form a B'C' loop chimera, or truncating the B'C' loop of the IL-2 to form a B'C' loop truncate, wherein, preferably, the shortened loop region has less than 10, 9, or 8 amino acids in length, and more preferably has 7 amino acids in length; preferably, 1, 2, 3, or 4 amino acids are truncated from the C-terminus of the loop region; and preferably, the shortened loop region has the sequence A(Q/G)S(K/A)N(F/I)H, or SGDASIH;
  and allowing expression of the engineered IL-2 mutant protein, e.g., in the form of an Fc fusion (e.g., FcLALA fusion), in mammalian cells (e.g., HEK293 cells or CHO cells).

In one embodiment, the method further comprises: identifying the IL-2 mutant protein with improved druggability (e.g., expression level and/or product stability and/or homogeneity, such as one-step Fc affinity chromatography purity) after protein expression and purification. In a preferred embodiment, a glycosylation motif mutation is introduced in the region aa35-40 or aa74-76 of the IL-2 to improve the druggability of the mutant protein. Preferably, the introduced glycosylation motif mutation is selected from K35N-L36-T37, R38N-M39-L40S, and Q74N-S75-K76T. In another preferred embodiment, the druggability of the mutant protein is improved by substituting the B'C' loop by a shortened loop, such as the loop sequence of the IL-15, or by truncating the B'C' loop. Preferably, the shortened loop sequence is selected from A(Q/G)S(K/A)NFH and SGDASIH. In a further preferred embodiment, the method comprises introducing mutations at other sites, such as K35Q, in addition to the glycosylation mutation, to improve the druggability of the mutant protein. As will be appreciated by those skilled in the art, these mutations can be combined with mutations imparting other improved properties to obtain an IL-2 mutant protein with multiple improved properties.

In one embodiment, the method further comprises identifying the IL-2 mutant protein that exhibits reduced (preferably eliminated) IL-2Rα binding ability relative to the wild-type IL-2. In one embodiment, the binding ability of the IL-2 mutant protein to the IL-2Rα is determined by measuring the affinity $K_D$ value, for example, by the bio-layer interferometry. In yet another embodiment, the binding ability is determined by measuring the activation effect of the IL-2 mutant protein on CD25 T cells. In one embodiment, the IL-2 mutant protein, relative to the wild-type IL-2, exhibits reduced activation effect on CD25$^+$ T cells, for example, as determined by measuring activation of p-STAT5 signals in the cells. Preferably, a mutation is introduced into the region aa41-47, aa68-70 or aa72-74 of the IL-2 to form a potential N-linked glycosylation site, and then whether the mutation results in reduced or eliminated binding of the IL-2 to the IL-2Rα is tested. Preferably, the introduced glycosylation motif mutation is selected from T41N-F42-K43S, K43N-F44-Y45T, Y45N-M46-P47S, E68N-V69-L70S, and L72N-A73-Q74T. As will be appreciated by those skilled in the art, these glycosylation mutations can be combined with mutations imparting other improved properties to obtain an IL-2 mutant protein with multiple improved properties.

In one embodiment, the method further comprises identifying the IL-2 mutant protein that exhibits enhanced binding to IL-2Rβ relative to the wild-type IL-2. In one embodiment, the binding ability of the IL-2 mutant protein to the IL-2R1 is determined by measuring the affinity $K_D$ value, for example, by the bio-layer interferometry. In yet another embodiment, the binding ability is determined by measuring the activation effect of the IL-2 mutant protein on CD25$^-$ T cells. In one embodiment, the IL-2 mutant protein, relative to the wild-type IL-2, exhibits enhanced activation effect on CD25$^-$ T cells, for example, as determined by measuring activation of p-STAT5 signals in the cells. In a preferred embodiment, the B'C' loop is substituted by a shortened loop, such as the loop sequence of IL-15, or the B'C' loop is truncated, to enhance binding to the IL-2Rβ. Preferably, the shortened loop sequence is selected from A(Q/G)S(K/A)NFH and SGDASIH. As will be appreciated by those skilled in the art, these glycosylation mutations can be combined with mutations imparting other improved properties to obtain an IL-2 mutant protein with multiple improved properties.

In a further embodiment, the method comprises introducing in combination the above mutation that improves the druggability, a mutation that reduces binding to the IL-2Rα, a mutation that enhances binding to the IL-2Rβ, and/or a combinatorial mutation that imparts other improved properties, to obtain an IL-2 mutant protein with multiple improved properties. In a preferred embodiment, a glycosylation mutation, for example, in the regions aa41-47 and aa68-74, and a truncation/substitution mutation that shortens the length of the B'C' loop region are introduced in combination. In a preferred embodiment, the method comprises identifying the IL-2 mutant protein that exhibits reduced binding to the IL-2Rα and enhanced binding to the IL-2Rβ relative to the wild-type IL-2, and optionally identifying the IL-2 mutant protein that also has improved druggability (e.g., improved expression and/or purity, and/or product stability, and/or homogeneity).

In some embodiments, the parental wild-type IL-2 protein used as a mutation template preferably has at least 85%, or at least 90% or 95% identity to SEQ ID NO: 26, and more preferably is a IL-2 protein derived from human.

7. Pharmaceutical Composition and Pharmaceutical Preparation

The present invention also comprises a composition (including a pharmaceutical composition or a pharmaceutical preparation) comprising the IL-2 mutant protein or the fusion or immunoconjugate thereof, and a composition comprising the polynucleotide encoding the IL-2 mutant protein or the fusion or immunoconjugate thereof. Such compositions can further optionally comprise suitable pharmaceutical adjuvants, such as a pharmaceutical carrier and a pharmaceutical excipient known in the art, including buffers.

The pharmaceutical carrier applicable to the present invention may be sterile liquid, such as water and oil, including those derived from petroleum, animals, plants or synthesis, such as peanut oil, soybean oil, mineral oil, sesame oil, etc. Water is a preferred carrier when the pharmaceutical composition is administered intravenously. Saline solutions, aqueous dextrose and glycerol solutions can also be employed as liquid carriers, particularly for injectable solutions. Suitable pharmaceutical excipients include starch, glucose, lactose, sucrose, gelatin, malt, rice, flour, chalk, silica gel, sodium stearate, glycerol monostearate, talc, sodium chloride, dried skim milk, glycerol, propylene, glycol, water, ethanol, etc. For use and application of excipients, see *Handbook of Pharmaceutical Excipients*, the fifth edition, R. C. Rowe, P. J. Seskey and S. C. Owen, Pharmaceutical Press, London, Chicago. The composition may further comprise a small quantity of wetting agent, emulsifier, or pH buffer, if desired. The compositions may take the form of a solution, a suspension, an emulsion, a tablet, a pill, a capsule, a powder, a sustained release preparation, and the like. Oral preparations may comprise standard carriers, such as pharmaceutical grade mannitol, lactose, starch, magnesium stearate, and saccharin.

The pharmaceutical preparation comprising the IL-2 mutant protein can be formulated by mixing the IL-2 mutant protein, the fusion or the immunoconjugate disclosed herein of a desired purity with one or more optional pharmaceutical excipients (*Remington's Pharmaceutical Sciences*, 16 th edition, Osol. A. eds. (1980)), preferably in the form of a lyophilized preparation or an aqueous solution. An exemplary lyophilized antibody preparation is described in U.S. Pat. No. 6,267,958. The aqueous antibody preparation includes those described in U.S. Pat. No. 6,171,586 and WO 2006/044908, and the latter preparation comprises a histidine-acetate buffer. In addition, a sustained release preparation can be prepared. Suitable examples of the sustained release preparation include a semipermeable matrix of a solid hydrophobic polymer comprising a protein. The matrix is in the form of a shaped article, such as a film or a microcapsule.

The pharmaceutical composition or preparation disclosed herein can further comprise one or more other active ingredients which are required for a specific indication being treated, preferably active ingredients having complementary activities that do not adversely affect one another. For example, it may be desirable to further provide other anticancer active ingredients, such as a chemotherapeutic agent and a PD-1 axis binding antagonist (e.g., an anti-PD-1 antibody, an anti-PD-L1 antibody or an anti-PD-L2 antibody). The active ingredients are suitably combined in an amount effective for an intended purpose.

Thus, in one embodiment, the composition further comprises a second therapeutic agent. For example, the second therapeutic agent can be an immune checkpoint inhibitor. For example, the second therapeutic agent may be one or more selected from the group including but not limited to, for example, an anti-CTLA-4 antibody, an anti-CD47 antibody, an anti-PD-1 antibody, an anti-PD-L1 antibody, an anti-CD40 antibody, an anti-OX40 (also referred to as CD134, TNFRSF4, ACT35, and/or TXGP1L) antibody, an anti-LAG-3 antibody, an anti-CD73 antibody, an anti-CD137 antibody, an anti-CD27 antibody, an anti-CSF-1R antibody, a TLR agonist, and a small molecule antagonist of IDO or TGFβ. Preferably, the second therapeutic agent is a PD-1 antagonist, particularly an anti-PD-1 antibody, an anti-PD-L1 antibody, an anti-LAG-3 antibody, and an anti-CD47 antibody.

In addition to be an immunotherapeutic agent, the second therapeutic agent may also be another radiotherapeutic or chemotherapeutic agent.

8. Combination Product

In one aspect, the present invention further provides a combination product comprising the mutant protein or the fusion or immunoconjugate thereof disclosed herein, and one or more other therapeutic agents (e.g., a chemotherapeutic agent, other antibodies, a cytotoxic agent, a vaccine, and an anti-infective active agent). The combination product disclosed herein can be used in a therapeutic method disclosed herein.

In some embodiments, the present invention provides a combination product, wherein the aforementioned other therapeutic agents refer to, for example, a therapeutic agent, such as an antibody, which is effective to stimulate an immune response and thus further enhance, stimulate or upregulate the immune response in a subject. In some embodiments, the aforementioned other antibodies refer to, e.g., an anti-PD-1 antibody, an anti-PD-L1 antibody, an anti-PD-L2 antibody, an anti-LAG-3 antibody, an anti-CTLA-4 antibody or an anti-TIM-3 antibody.

In some embodiments, the combination product is used for preventing or treating a tumor. In some embodiments, the tumor is cancer, e.g., gastrointestinal cancer (such as gastric cancer, rectal cancer, colon cancer, and colorectal cancer), skin cancer (such as melanoma), renal cell carcinoma, bladder cancer, or non-small cell lung cancer. In some embodiments, the combination product is used for preventing or treating an infection, such as bacterial infection, viral infection, fungal infection, protozoal infection, and the like.

9. Therapeutic Method and Use

As used herein, the terms "individual" and "subject" can be used interchangeably and refer to a mammal. The mammals include, but are not limited to, domesticated animals (e.g., cows, sheep, cats, dogs, and horses), primates (e.g., human and non-human primates such as monkeys), rabbits and rodents (e.g., mice and rats). In particular, a subject is a human.

As used herein, the term "treating" refers to a clinical intervention intending to alter the natural progress of a disease in an individual being treated. Desired therapeutic effects include, but are not limited to, preventing the occurrence or recurrence of diseases, alleviating symptoms, reducing any direct or indirect pathological outcomes of diseases, preventing metastasis, delaying disease progression, improving or alleviating conditions, and improving prognosis.

In one aspect, the present invention provides a method for stimulating the immune system of a subject, comprising administering to the subject an effective amount of a pharmaceutical composition comprising the IL-2 mutant protein, the fusion or the immunoconjugate disclosed herein. The IL-2 mutant protein disclosed herein has high activity and selectivity for CD25$^-$ CD122$^+$ effector cells (cytotoxic CD8$^+$ T cells and NK cells), and has a reduced stimulation effect on CD25$^+$ Treg cells. The IL-2 mutant protein disclosed herein can be used at a low dose to stimulate the immune system of the subject.

Thus, in some embodiments, the present invention relates to a method for enhancing the immune response of the body of a subject, comprising administering to the subject an effective amount of any of the IL-2 mutant proteins or the fusions or immunoconjugates thereof described herein. In some embodiments, the IL-2 mutant protein or the fusion or immunoconjugate thereof disclosed herein is administered to a subject with a tumor to stimulate an anti-tumor immune response. In other embodiments, the antibodies or the antigen-binding fragments thereof disclosed herein are administered to a subject with an infection to stimulate an anti-infection immune response. In one embodiment, the IL-2 mutant protein disclosed herein can be used in combination with a Treg-depleting antibody (e.g., FcγR-mediated Treg depletion) to further reduce the immunosuppressive effect caused by Treg. In one embodiment, the IL-2 mutant protein disclosed herein can be administered in combination with an immune checkpoint inhibitor (e.g., in combination with anti-PD-1 and anti-CTLA-4 antibodies) to, for example, enhance cancer immunotherapy effect.

In another aspect, the present invention relates to a method for treating a disease, such as tumor, cancer and infection, in a subject, wherein the method comprises administering to the subject an effective amount of any of the IL-2 mutant proteins or the fusions or immunoconjugates thereof described herein.

The cancer may be at an early, intermediate or advanced stage, or may be a metastatic cancer. In some embodiments, the tumor or tumor cell can be selected from colorectal tumor, ovarian tumor, pancreatic tumor, lung tumor, liver tumor, breast tumor, renal tumor, prostate tumor, gastrointestinal tumor, melanoma, cervical tumor, bladder tumor, glioblastoma, and head and neck tumor. In some embodiments, the cancer can be selected from colorectal cancer, ovarian cancer, pancreatic cancer, lung cancer, liver cancer, breast cancer, renal cancer, prostate cancer, gastrointestinal cancer, melanoma, cervical cancer, bladder cancer, glioblastoma, and head and neck cancer. In some embodiments, the tumor is melanoma, renal cell carcinoma, colorectal cancer, bladder cancer, or non-small cell lung cancer.

In another aspect, the present invention relates to a method for treating an infectious disease, e.g., chronic infection, in a subject, wherein the method comprises administering to the subject an effective amount of any of the IL-2 mutant proteins or the fragments thereof, or an immunoconjugate, a multispecific antibody, or a pharmaceutical composition comprising the antibodies or the fragments described herein. In one embodiment, the infection is virus infection.

In some embodiments, the method disclosed herein further comprises administering to the subject one or more therapies in combination (e.g., therapeutic modalities and/or other therapeutic agents), in addition to administering the IL-2 mutant protein or the fusion or conjugate thereof disclosed herein. In some embodiments, the therapeutic modality includes a surgical treatment and/or a radiation therapy. In some embodiments, the method disclosed herein further comprises administering at least one additional immunostimulatory antibody, e.g., an anti-PD-1 antibody, an anti-PD-L1 antibody, an anti-LAG-3 antibody, an anti-CD43 antibody, and/or an anti-CTLA-4 antibody, which can be, e.g., a fully human, chimeric, or humanized antibody.

In some embodiments, the anti-PD-1 antibody is selected from IBI308 (sintilimab, WO2017/025016A1), MDX-1106 (nivolumab, OPDIVO), Merck 3475 (MK-3475, pembrolizumab, KEYTRUDA) and CT-011 (pidilizumab). In some embodiments, the anti-PD-1 antibody is MDX-1106. In some embodiments, the anti-PD-1 antibody is nivolumab (CAS Registry Number: 946414-94-4). In some further embodiments, the IL-2 mutant protein or the fragment thereof used alone or in combination with a PD-1 antagonist can also be administered in combination with one or more other therapies. e.g., therapeutic modalities and/or other therapeutic agents. In some embodiments, the therapeutic modalities include a surgery (e.g., a tumor resection), a radiation therapy (e.g., an external beam therapy that involves a three-dimensional conformal radiation therapy in which an irradiation region is designed), a partial irradiation (e.g., an irradiation directed to a preselected target or an organ), a focused irradiations, and the like.

In some embodiments, a method for treating a disease (e.g., a tumor) is provided herein, comprising administering to a subject the mutant protein disclosed herein and a CTLA-4 antagonist antibody. The anti-CTLA-4 antibody may be, for example, an antibody selected from YERVOY9 (ipilimumab or antibody 10DI, as described in PCT publication No. WO 01/14424), tremelimumab (formerly known as ticilimumab, CP-675,206), and anti-CTLA-4 antibodies described in the following publications: WO 98/42752; WO 00/37504; U.S. Pat. No. 6,207,156: Hurwitz et al. (1998), *Proc. Natl. Acad Sci. USA* 95(17):10067-10071; Camacho et al. (2004), *J. Clin. Oncology* 22(145): Abstract No. 2505 (antibody CP-675206); and Mokyr et al. (1998), *Cancer Res.* 58:5301-5304.

In some embodiments, a method for treating a disease (e.g., a tumor) is provided, comprising administering to a subject the anti-mutant protein described herein and an anti-LAG-3 antagonist antibody. The anti-LAG-3 antibody may be, for example, an antibody selected from: antibodies 25F7, 26H10, 25E3, 8B7, 11F2 and 17E5 described in U.S. Pat. No. US 2011/0150892 and WO 2014/008218, antibodies comprising CDRs or variable regions of the above antibodies: BMS-986016; and IMP731 described in US 2011/007023.

In some embodiments, the IL-2 mutant protein disclosed herein can be administered in combination with a chemotherapy or a chemotherapeutic agent. In some embodiments, the IL-2 mutant protein disclosed herein can be administered in combination with a radiation therapy or a radiotherapeutic agent. In some embodiments, the IL-2 mutant protein disclosed herein can be administered in combination with a targeted therapy or a targeted therapeutic agent. In some embodiments, the IL-2 mutant protein disclosed herein can be administered in combination with an immunotherapy or an immunotherapeutic agent, such as a monoclonal antibody.

The mutant protein disclosed herein (or the pharmaceutical composition comprising the same, or the fusion or immunoconjugate thereof, and optionally an additional therapeutic agent) can be administered by any suitable method, including parenteral administration, intrapulmonary administration, intranasal administration, and, if required by local treatment, intralesional administration. Parenteral infusion includes intramuscular, intravenous, intra-arterial, intraperitoneal, or subcutaneous administration. The medicaments may be administered by any suitable means, such as injection, e.g., intravenous or subcutaneous injection, to some extent depending on short-term or long-term treatment. Various administration schedules are encompassed herein, including, but not limited to, single administration or multiple administrations at multiple time points, bolus injection, and pulse infusion.

In order to prevent or treat a disease, the appropriate dosage of the mutant protein disclosed herein (used alone or in combination with one or more additional therapeutic agents) will depend on the type of the disease to be treated, the type of the antibody, severity and progression of the disease, the purpose for which the antibody is administered (prevention or treatment), previous treatments, clinical history of a patient, responses to the antibody, and the discretion of an attending physician. The antibody is suitably administered to a patient through a single treatment or through a series of treatments.

In a further aspect, the present invention also provides use of the IL-2 mutant protein, composition, immunoconjugate, and fusion disclosed herein in preparation of a drug for use in the aforementioned method (e.g., for treatment).

The following examples are described to assist in understanding the present invention. The examples are not intended and should not be interpreted in any way as limiting the protection scope of the present invention.

Example 1: Design of an Interleukin-2 Mutant

Design of an Interleukin-2 Glycosylated Protein

According to the crystal structure (PDB:1Z92) (FIG. 1A) of interleukin-2 (IL-2 for short) and its α receptor CD25 (IL-2Rα for short) in a PDB database, an N-X-S/T motif (X can be any amino acid except P (proline)) was artificially engineered at the binding interface of the IL-2 and the IL-2Rα by a site-directed mutation of an amino acid, so that the IL-2 formed a polysaccharide chain on its surface through post-translational modification of cells when expressed in HEK293 or CHO cells, and thus the binding of the IL-2 to the IL-2Rα was blocked (as shown in the structural schematic diagram of FIG. 1B).

Design of an IL-2 glycosylation site: The amino acids in the IL-2 that are 3.6 Å away from the IL-2Rα and have side chains exposed in a solution were found out and mutated to asparagine, and the third amino acid was mutated to serine or threonine, resulting in an N-X-S/T motif (X can be any amino acid except P). See Table 1.

TABLE 1

Mutation sites of IL-2 glycosylated proteins

| Name | Mutant amino acids and N-X-S/T motifs |
|---|---|
| L007 (IL-2$^{glycan1}$) | K35N-L36-T37 |
| L 008 (IL-2$^{glycan2}$) | R38N-M39-L40S |
| L 009 (IL-2$^{glycan3}$) | E68N-V69-L70S |
| L 010 (IL-2$^{glycan4}$) | Y45N-M46-P47S |
| L 011 (IL-2$^{glycan5}$) | K43N-F44-Y4ST |
| L 012 (IL-2$^{glycan6}$) | E62N-L63-K64T |
| L 013 (IL-2$^{glycan7}$) | L72N-A73-Q74T |
| L 014 (IL-2$^{glycan8}$) | Q74N-S75-K76T |
| L 015 (IL-2$^{glycan9}$) | T41N-F42-K43S |

B'C' loop: The linker sequence (FIG. 2A) of the B helix and C helix of the IL-2, comprising 11 amino acids, namely A73-R83.

By comparing the crystal structures of an IL-2 monomer (PDB:1M47) and a complex (PDB:2ERJ), it was found that the B'C' loop was absent from the crystal structure of the IL-2 monomer since it was very active in a solution and could not form a relatively stable conformation.

By genetically engineering the B'C' loop, the stability of the B'C' loop was increased, thus increasing the stability of the IL-2 and the affinity of the IL-2 for the IL-2R10. We therefore observed the crystal structure of the human IL-15 (PDB:2Z3Q) and found that its B'C' loop was relatively short and stable (FIG. 2B). Therefore, we designed an IL-2 chimeric molecule (L017) and 4 truncated molecules (L057-L060) (see Table 2).

TABLE 2

Optimized sequences of IL-2 B'C' loop

| Name | Sequences of B'C' loop |
|---|---|
| L 001(IL-2$^{WT}$) | AQSKNFHLRPR |
| L 017(IL-2$^{hyb15BCL}$) | SGDASIH |
| L 057(IL-2$^{truncate1}$) | AQSKNFH |
| L 058(IL-2$^{truncate2}$) | AGSKNFH |
| L 059(IL-2$^{truncate3}$) | AQSANFH |
| L 060(IL-2$^{truncate4}$) | AQSANIH |

Example 2: Expression and Purification of IL-2 Mutant-Fc Fusion Proteins and IL-2 Receptors Construction of Expression Plasmids The wild-type IL-2 (uniprot: P60568, aa21-153, C125S, IL-2$^{WT}$ for short), the IL-2 mutant IL-2$^{3X}$ (R38D, K43E, E61R), the IL-2$^{glycans}$ and the B'C' loop chimeras and truncates were linked to the Fc of human IgG1 (L234A, L235A, FcLALA for short, SEQ ID NO: 28) via a GSGS linker sequence and constructed into TT5 vectors to express the following proteins:

| Protein | Structure | SEQ ID NOs |
|---|---|---|
| Y001 | IL-2$^{WT}$-GSGS-FcLALA | SEQ ID NO: 1 |
| Y002 | IL-2$^{3X}$-GSGS-FcLALA | SEQ ID NO: 2 |
| Y007 | IL-2$^{glycan1}$-GSGS-FcLALA | SEQ ID NO: 3 |

-continued

| Protein | Structure | SEQ ID NOs |
|---|---|---|
| Y008 | IL-2$^{glycan2}$-GSGS-FcLALA | SEQ ID NO: 4 |
| Y009 | IL-2$^{glycan3}$-GSGS-FcLALA | SEQ ID NO: 5 |
| Y010 | IL-2$^{glycan4}$-GSGS-FcLALA | SEQ ID NO: 6 |
| Y011 | IL-2$^{glycan5}$-GSGS-FcLALA | SEQ ID NO: 7 |
| Y012 | IL-2$^{glycan6}$-GSGS-FcLALA | SEQ ID NO: 8 |
| Y013 | IL-2$^{glycan7}$-GSGS-FcLALA | SEQ ID NO: 9 |
| Y014 | IL-2$^{glycan8}$-GSGS-FcLALA | SEQ ID NO: 10 |
| Y015 | IL-2$^{glycan9}$-GSGS-FcLALA | SEQ ID NO: 11 |
| Y017 | IL-2$^{hyb15BCL}$-GSGS-FcLALA | SEQ ID NO: 12 |
| Y057 | IL-2$^{truncate1}$-GSGS-FcLALA | SEQ ID NO: 20 |
| Y058 | IL-2$^{truncate2}$-GSGS-FcLALA | SEQ ID NO: 21 |
| Y059 | IL-2$^{truncate3}$-GSGS-FcLALA | SEQ ID NO: 22 |
| Y060 | IL-2$^{truncate4}$-GSGS-FcLALA | SEQ ID NO: 23 |

The IL-2$^{WT}$, the IL-2$^{3X}$ and the L011 (IL-2$^{glycan5}$) were linked to FcLALA via two GGGGS and constructed into pCDNA3.1 vectors to express the following proteins:

| Protein | Structure | SEQ ID NOs |
|---|---|---|
| Y038 | IL-2$^{glycan5}$-2*(G4S)-FcLALA | SEQ ID NO: 13 |
| Y040 | IL-2$^{3X}$-2*(G4S)-FcLALA | SEQ ID NO: 14 |
| Y045 | IL-2$^{WT}$-2*(G4S)-FcLALA | SEQ ID NO: 15 |

One glycosylation site or a K35Q mutation site (the K35Q mutation was designed on the basis of the mutant protein Y007 and the protein 3D structure) was added relative to the L011 (IL-2$^{glycan5}$). Then the resulting product was linked to FcLALA through a GSGS linker sequence and constructed into pTT5 vectors to express the following proteins:

| Protein | Structure | SEQ ID NOs |
|---|---|---|
| Y048 | IL-2$^{glycan5 \cdot glycan8}$-GSGS-FcLALA | SEQ ID NO: 16 |
| Y049 | IL-2$^{glycan5 \cdot glycan1}$-GSGS-FcLALA | SEQ ID NO: 17 |
| Y050 | IL-2$^{glycan5 \cdot K35Q}$-GSGS-FcLALA | SEQ ID NO: 18 |

The B'C' loop chimera (L017) and truncate (L057/058), combined with the glycosylated IL-2 (L011), were linked to FcLALA through two GGGGS and constructed into pCDNA3.1 vectors to express the following proteins:

| Protein | Structure | SEQ ID NOs |
|---|---|---|
| Y056 | IL-2$^{glycan5 \cdot 15BCL}$-2*(G4S)-FcLALA | SEQ ID NO: 19 |
| Y081 | IL-2$^{glycan5 \cdot truncate1}$-2*(G4S)-FcLALA | SEQ ID NO: 24 |
| Y082 | IL-2$^{glycan5 \cdot truncate2}$-2*(G4S)-FcLALA | SEQ ID NO: 25 |

The specific sequence information of the protein molecules is shown in the sequence listing.

The sequence of the wild-type IL-2$^{WT}$ used to construct the above molecules is shown in SEQ ID NO: 26, which has a C125S mutation at position 125 to avoid formation of a disulfide-bridged IL-2 dimer. The IL-2$^{3X}$ is an IL-2 mutant as reported in the previous literature (Rodrigo Vazquez-Lombardi et al., Nature Communications, 8:15373, DOI: 10.1038/ncomms15373), and, like the IL-2$^{WT}$, also comprises a C125S mutation. It further comprises mutations R38D, K43E and E61R and its sequence is shown in SEQ ID NO: 27. As reported in the literature, the IL-2$^{WT}$ does not bind to the IL-2Rα and maintains an IL-2Rβ binding capacity equivalent to that of the wild-type IL-2.

Expression and Purification of IL-2 Fusion Proteins

Expi293 cells (Invitrogen) were passaged according to a desired transfection volume. The cell density was adjusted to 1.5×10$^6$ cells/mL the day before transfection. The cell density on the day of transfection was approximately 3×10$^6$ cells/mL. 1/10 (v/v) of the final volume of Opti-MEM medium (Gibco, Catalog No. 31985-070) was taken as a buffer, added with expression plasmids constructed as described above, mixed well, and filtered with a 0.22 μm filter for later use. An appropriate amount of polyethylenimine (PEI) (Polysciences, 23966) was added to the plasmids from the previous step (the mass ratio of plasmids to PEI was 1:3), mixed and incubated at room temperature for 10 min to give a DNAPEI mixture. The DNA/PEI mixture was gently poured into HEK293 cells, mixed well, and cultured at 37° C. 8% CO$_2$ for 24 h, followed by the addition of VPA (Sigma, Catalog No. P4543-100G) to reach a final concentration of 2 mM. Then 2% (v/v) Feed (1 g/L Phytone Peptone+1 g/L Difco Select Phytone) was added and the resulting mixture was cultivated for 6 days.

The cell culture medium was centrifuged at 13000 rpm for 20 min, and the supernatant was collected and purified by a pre-packed column Hitrap Mabselect Sure (GE, 11-0034-95). The procedures were as follows: the packing column was equilibrated with 5-fold column volume of equilibration buffer (20 mM Tris, 150 mM NaCl, pH7.2) before purification; the collected supernatant was passed through the column, and then the column was washed with 10-fold column volume of equilibration buffer to remove non-specific binding proteins: the packing was washed with 5-fold column volume of elution buffer (100 mM sodium citrate, pH 3.5), and the eluent was collected. 80 μL of Tris (2M Tris) was added per 1 mL of eluent, and the mixture was buffer-exchanged into PBS (Gibco, Catalog No. UFC901096) using a ultrafiltration concentration tube (MILLIPORE, Catalog No. 70011-044), and then the concentration was determined. 100 μg of purified protein was taken with its concentration adjusted to 1 mg/mL. The protein purity was determined by gel filtration column SW3000 (TOSOH Catalog No. 18675).

The glycosylation mutants Y007, Y008, and Y014 had obviously improved expression level and purity relative to the Y001 by mutating one or two amino acids on the surface. The Y048, Y049 and Y050 had the expression level increased from 7.77 mg/L to more than 50 mg/L (the Y048 and the Y049) or 40 mg/L (the Y050) and purity increased from 31.35% to more than 80% by adding 1 glycosylation site or one K35Q mutation site relative to the Y011, thus remarkably improving the druggability of the molecules.

The B'C' loop chimera (Y017) and truncate (Y057/058/059) had greatly improved expression level and one-step affinity chromatography purity relative to the Y001.

After combining the optimized sequence of B'C' loop with the glycosylation mutation L011, the Y056, Y081 and Y082 were all improved in expression level and purity relative to the mutant protein Y011 with the L011 (Table 3).

TABLE 3

Expression level and purity of IL-2 mutants in HEK293

| Protein | Structure | Expression level mg/L | Purity (SEC-HPLC) |
|---|---|---|---|
| Y001 | IL-2$^{WT}$-GSGS-FcLALA | 16.35 | 44.74% |
| Y002 | IL-2$^{-3X}$-GSGS-FcLALA | 23.92 | 69.85% |
| Y007 | IL-2$^{-glycan1}$-GSGS-FcLALA | 66.57 | 79.70% |
| Y008 | IL-2$^{-glycan2}$-GSGS-FcLALA | 26.65 | 75.04% |
| Y009 | IL-2$^{-glycan3}$-GSGS-FcLALA | 0.81 | 5.95% |
| Y010 | IL-2$^{-glycan4}$-GSGS-FcLALA | 0.88 | 13.00% |
| Y011 | IL-2$^{-glycan5}$-GSGS-FcLALA | 7.77 | 31.35% |
| Y012 | IL-2$^{-glycan6}$-GSGS-FcLALA | 13.48 | 41.06% |
| Y013 | IL-2$^{-glycan7}$-GSGS-FcLALA | 3.53 | 9.12% |
| Y014 | IL-2$^{-glycan8}$-GSGS-FcLALA | 32.75 | 70.11% |
| Y015 | IL-2$^{-glycan9}$-GSGS-FcLALA | 2.96 | 17.38% |
| Y017 | IL-2$^{hyb15BCL}$-GSGS-FcLALA | 54.47 | 93.45% |
| Y048 | IL-2$^{glycan5 \cdot glycan8}$-GSGS-FcLALA | 50.92 | 80.06% |
| Y049 | IL-2$^{glycan5 \cdot glycan1}$-GSGS-FcLALA | 57.50 | 84.07% |
| Y050 | IL-2$^{glycan5 \cdot K35Q}$-GSGS-FcLALA | 41.05 | 80.49% |
| Y057 | IL-2$^{truncate1}$-GSGS-FcLALA | 52.36 | 92.77% |
| Y058 | IL-2$^{truncate2}$-GSGS-FcLALA | 49.86 | 99.09% |
| Y059 | IL-2$^{truncate3}$-GSGS-FcLALA | 36.52 | 86.95% |
| Y060 | IL-2$^{truncate4}$-GSGS-FcLALA | 21.20 | 66.33% |
| Y038 | IL-2$^{-glycan5}$-2*(G4S)-FcLALA | 13.87 | 47.56% |
| Y040 | IL-2$^{-3X}$-2*(G4S)-FcLALA | 20.28 | 40.75% |
| Y045 | IL-2$^{WT}$-2*(G4S)-FcLALA | 2.44 | 50.85% |
| Y056 | IL-2$^{glycan5 \cdot 15BCL}$-2*(G4S)-FcLALA | 39.7 | 96.74% |
| Y081 | IL-2$^{glycan5 \cdot truncate1}$-2*(G4S)-FcLALA | 39.41 | 91.29% |
| Y082 | IL-2$^{glycan5 \cdot truncate2}$-2*(G4S)-FcLALA | 54.13 | 90.97% |

Expression and Purification of IL-2 Receptors

An avi tag (a polypeptide: GLNDIFEAQKIEWHE, able to be biotinylated by BirA enzyme catalysis) and a six-histidine tag (HHHHHH) were linked to the C-terminus of the sequences of Human IL-2 receptors α (Uiprot: P01589, aa22-217) and β(Uiprot: P14784, aa27-240), which were constructed separately into pTT5 vectors. The method of plasmid transfection into 293F cells (Invitrogen) was the same as the expression method of the IL-2Fc fusion protein.

Before purification, the collected cultures were centrifuged at 4500 rpm for 30 min, and the cells were discarded. The supernatant was filtered through a 0.22 μL filter. A nickel column (5 mL Histrap excel, GE, 17-3712-06) used for purification was soaked with 0.1 M NaOH for 2 h, and then washed with 5-fold to 10-fold column volume of ultra-pure water to remove alkali liquor. The column was equilibrated with 5-fold column volume of binding buffer (20 mM Tris pH7.4, 300 mM NaCl) prior to purification. The cell supernatant was passed through the equilibrated column and then 10-fold column volume of wash buffer (20 mM Tris 7.4, 300 mM NaCl, 10 mM imidazole) was loaded on the column to remove non-specific binding heteroproteins. The target protein was then eluted with 3-5-fold column volume of eluent (20 mM Tris 7.4, 300 mM NaCl, 100 mM imidazole). The collected protein was buffer-exchanged into PBS (Gibco, 70011-044) by ultrafiltration/diafiltration, and further separated and purified using superdex200 increase (GE, 10/300GL, 10245605). The elution peak of the monomer was collected, and the equilibration buffer and eluent for the column were PBS (Gibco, 70011-044). 100 μg of the purified protein sample was taken and the protein purity was determined using a gel filtration column SW3000 (TOSOH Catalog No. 18675) (FIG. 3 and FIG. 4).

Example 3: Affinity Assay of IL-2$^{mutant}$-Fc Fusion Proteins (IL-2$^{mutant}$-FC for Short) and Their Receptors The equilibrium dissociation constant ($K_D$) of the IL-2$^{mutant}$-FC disclosed herein for binding to the human IL-2Rα and IL-2Rβ were determined using the bio-layer interferometry (BLI). The BLI affinity assay was performed according to the existing methods (Estep, P et al., High throughput solution based measurement of antibody-antigen affinity and epitope binding. MAbs, 2013.5(2): p 270-8).

Half an hour before the experiment, an appropriate number of AHC (ForteBio, 18-5060) (for positive control detection) sensors depending on the number of samples were soaked in SD buffer (PBS 1 x, BSA 0.1%, Tween-20 0.05%).

The SD buffer, the IL-2$^{mutant}$-FC, and the IL-2 receptor α or β, each of 100 μL, were added to 96-well black polystyrene half area microplates (Greiner, 675076). The sensors were arranged according to the positions of the samples. The instrument settings were as follows: the operation procedures were Baseline, Loading –1 nm, Baseline, Association, and Dissociation: the run time of each procedure was dependent on the rates of association and dissociation: the rotation speed was 400 rpm, and the temperature was 30° C. The $K_D$ values were analyzed by ForteBio analysis software.

TABLE 4a

Affinity $K_D$ values of IL-2$^{glycan}$-FC for IL-2Rα

| Protein | Affinity for IL-2Rα (M) |
|---|---|
| Y001 | 1.12E−08 |
| Y002 | N.B. |
| Y007 | 2.55E−09 |
| Y008 | 4.23E−08 |
| Y009 | N.B. |
| Y010 | N.B. |
| Y011 | N.B. |
| Y012 | 9.22E−08 |
| Y013 | N.B. |
| Y014 | 1.03E−08 |
| Y015 | N.B. |

TABLE 4b

Affinity $K_D$ values of IL-2B'C' loop mutants for IL-2Rβ

| Protein | Affinity for IL-2R (M) |
|---|---|
| Y001 | N.B. |
| Y017 | 8.87E−08 |
| Y057 | 2.34E−07 |
| Y058 | 3.44E−07 |
| Y059 | 1.46E−07 |
| Y060 | 7.63E−07 |

TABLE 4c

Affinity $K_D$ values of IL-2 with combinatorial mutation for receptors

| Protein | Affinity for IL-2Rα (M) | Affinity for IL-2Rβ (M) |
|---|---|---|
| Y038 | N.B | N.B |
| Y040 | N.B | N.B |
| Y045 | 5.03E−08 | N.B |
| Y056 | N.B | 1.20E−07 |

TABLE 4c-continued

Affinity $K_D$ values of IL-2 with combinatorial mutation for receptors

| Protein | Affinity for IL-2Rα (M) | Affinity for IL-2Rβ (M) |
|---|---|---|
| Y081 | N.B | 2.60E−07 |
| Y082 | N.B | P.F |

N.B: the IL-2 did not bind to the receptor;
P.F: binding was very weak and the fit was poor;

from the above affinity data, it can be seen that: 1) binding of the Y009, Y010, Y011, Y013, and Y015 to the IL-2Rα can be blocked (Table 4a); 2) B'C' loop chimeric molecules and truncated molecules have not only increased expression level, but also increased affinity for the IL-2Rβ (Table 4b); and 3) compared to the Y045 (IL-2$^{WT}$-2*(G4S)-FcLALA), Y040 (IL-2$^{3X}$-2*(G4S)-FcLALA) and Y038 (IL-2$^{glycan5}$-2*(G4S)-FcLALA), the combinations Y056 and Y081 subjected to IL-2 glycosylation and B'C' loop engineering do not bind to IL-2Rα and have enhanced affinity for the IL-2Rβ.

Example 4: In Vitro Functional Assay for IL-2$^{mutant}$-FC

Due to higher affinity for IL-2Rα than IL-2Rβ and IL-2Rγ, IL-2$^{WT}$ will preferentially bind to IL-2Rα on the cell surface, then recruit IL-2Rβγ. The downstream p-STAT5 signals are released by IL-2Rβγ to stimulate the proliferation of T cells and NK cells. As the IL-2Rα is present on the surface of Treg cells but absent on the surface of effector T cells and NK cells, normally the IL-2$^{WT}$ will preferentially stimulate the Treg cell proliferation and down regulate the immune response. Since the IL-2$^{mutant}$ does not bind to the IL-2Rα, the preference of the IL-2$^{mutant}$ for preferentially stimulating Treg cell proliferation is eliminated and meanwhile the number of effector T cells and NK cells is effectively increased by stimulating T cells and NK cells proliferation, thus improving the anti-tumor effect.

In this example, the elimination of the activation preference of each mutant for CD25$^+$ cells was verified by detecting the activation effect of each IL-2$^{mutant}$-FC on p-STAT5 signals of primary human CD8$^+$ T cells, and the mutant with a high activation effect on CD25$^-$ cells was screened. The specific steps are as follows;

1. Thawing PBMC Cells:
    a) PBMC cells (Allcells, Catalog No. PB005F, 100M package) were taken out from liquid nitrogen, and then rapidly placed in a 37° C. water bath for thawing;
    b) the cells were added to 10 mL of pre-warmed X-VIVO15 (Lonza, Catalog No. 04-418Q) culture medium containing 5% human AB serum (GemCell, Catalog No. 100-512) and 1‰ DNase (STRMCELL, Catalog No. 07900), centrifuged at 400 G and 25° C. for 10 min (the subsequent centrifugation was under the same condition) and washed once;
    c) 20 mL of culture medium was added to resuspend the cells, and the cells were cultured overnight in a 37° C. carbon dioxide incubator.
2. Purifying Human CD8$^+$ T Cells:
    a) the cell suspension obtained in step 1 was pipetted, and after centrifugation, the supernatant was discarded,
    b) a mixture of 1 mL of Robosep buffer (STEMCELL, Catalog No. 20104), 100 μL of human AB serum, and 100 μL of negative screening antibody in human CD8$^+$ T cell purification kit (Invitrogen, Catalog No. 11348D) was added to resuspend the cells;
    c) after mixing well, the cells were incubated for 20 min at 4° C. and shaken every 5 min;

d) after incubation, 10 mL of Robosep buffer was added, and the cells were centrifuged and washed twice;
e) meanwhile, 1 mL of magnetic microspheres (human CD8$^+$ T cell purification kit) was taken, and 7 mL of Robosep buffer was added; the mixture was placed on a magnetic frame for 1 min to discard the supernatant, and the magnetic microspheres were pre-washed;
f) the microspheres and the cells were resuspended with 1 mL of Robosep buffer, and after mixing well, the mixture was subjected to rotary incubation for 30 min at room temperature;
g) after incubation, 6 mL of Robosep buffer was added and the mixture was placed on a magnetic frame for 1 min, followed by the collection of the supernatant;
h) the collected liquid was placed on the magnetic frame for 1 min, and the supernatant was collected;
i) centrifugation was performed to discard the supernatant, the cells were resuspended using a preheated T culture medium, and the cell density was adjusted to 1×10$^6$/mL;
j) ⅓ of the cells were taken to stimulate the expression of CD25 later, and the remaining cells were placed in a 37° C. carbon dioxide incubator for static culture overnight.

3. Stimulating CD8$^+$ T Cells to Express CD25:
   a) ⅓ of the CD8$^+$ T cells purified in step 2 were taken, into which magnetic microspheres of an anti-human CD3/CD28 antibody (GIBCO, Catalog No. 11131D) were added (the ratio of cells to microspheres was 3:1);
   b) the mixture was placed in a 37° C. carbon dioxide incubator for static culture for three days;
   c) 10 mL of culture medium was added to wash the cells twice;
   d) the culture medium was added to adjust the cell density to 1×10$^6$/mL, and the cells were placed in a 37° C. carbon dioxide incubator for static culture for 2 days.

4. Detecting the Purity and Expression Level of the Cells:
   a) an anti-human CD8-PE antibody (Invitrogen, Catalog No. 12-0086-42), an anti-human CD25-PE antibody (eBioscience, Catalog No. 12-0259-42), and an isotype control antibody (BD, Catalog No. 556653) were adopted to detect CD8 and CD25 of the cells;
   b) the cells in step 2 were CD8$^+$ CD25$^-$ T cells, and the cells in step 3 were CD8$^+$ CD25$^+$ T cells.

5. Detecting the EC$_{50}$ Value of Each IL-2$^{mutant}$-FC in Activating p-STAT5 Signals in CD8$^+$ CD25$^-$ T Cells:
   a) CD8$^+$ CD25$^-$ T cells were added to 96-well U-bottom plates (Costar, Catalog No. CLS3799-50EA) at 1×10$^5$ cells per well;
   b) the IL-2$^{mutant}$-FC, the commercialized IL-2 (R&D Catalog No. 202-IL-500), the IL-2$^{WT}$-FC, and the IL-2$^{3X}$-FC, each of 100 μL, were added and 4-fold diluted in gradient from a maximum concentration of 266.7 nM, for a total of 12 dilution gradients, and the cells were incubated in a 37° C. incubator for 20 min;
   c) 55.5 μL of 4.2% formaldehyde solution was added to immobilize the above cells at room temperature for 10 min;
   d) centrifugation was performed to discard the supernatant, and 200 μL of ice methanol (Fisher, Catalog No. A452-4) was added to resuspend the cells, which were then incubated in a 4° C. refrigerator for 30 min;
   e) centrifugation was performed to discard the supernatant, and the residue was washed 3 times with 200 μL of staining buffer (BD, Catalog No. 554657);
   f) 200 μL of permeabilization/fixation buffer (BD, Catalog No. 51-2091KZ) containing anti-p-STAT5-AlexFlour647 (BD, Catalog No. 562076, 1:200 dilution) was added, and the cells were incubated away from light for 3 h at room temperature;
   g) the cells were washed with staining buffer for three times, resuspended with 1(0 μL of staining buffer, and detected using a flow cytometer;
   h) the EC$_{50}$ values to activate p-STAT5 signals were plotted using the IL-2 molecule concentration as the abscissa and the AlexFlour647 median fluorescence value as the ordinate, and the results are shown in FIG. 5 and Table 5.

6. Detecting the EC$_{50}$ Value of Each IL-2$^{mutant}$-FC in Activating p-STAT5 Signals in CD8$^+$ CD25$^+$ T Cells:
   a) CD8$^+$ CD25$^+$ T cells were added to 96-well U-bottom plates at 1×10$^5$ cells per well;
   b) the EC$_{50}$ values to activate p-STAT5 signals were plotted through steps same as b-h in step 5, and the results are shown in FIG. 5 and Table 5.

TABLE 5

The EC$_{50}$ values of IL-2 mutants in activating p-STAT5 signals in CD25$^{+/-}$ T cells and the ratios thereof (donor2)

| Donor2 | R&D IL2 | Y045 | Y040 | Y056 | Y081 |
| --- | --- | --- | --- | --- | --- |
| CD25$^+$ pSTAT5 EC$_{50}$ | 0.005086 | 0.0282 | 4.12 | 0.06085 | 2.186 |
| CD25− pSTAT5 EC$_{50}$ | 0.5945 | 13.17 | 34.61 | 2.856 | 7.203 |
| CD25$^-$ EC$_{50}$/CD25$^+$ EC$_{50}$ multiple | 116.8895 | 467.0213 | 8.4005 | 46.9351 | 3.2951 |

Figure 5C:
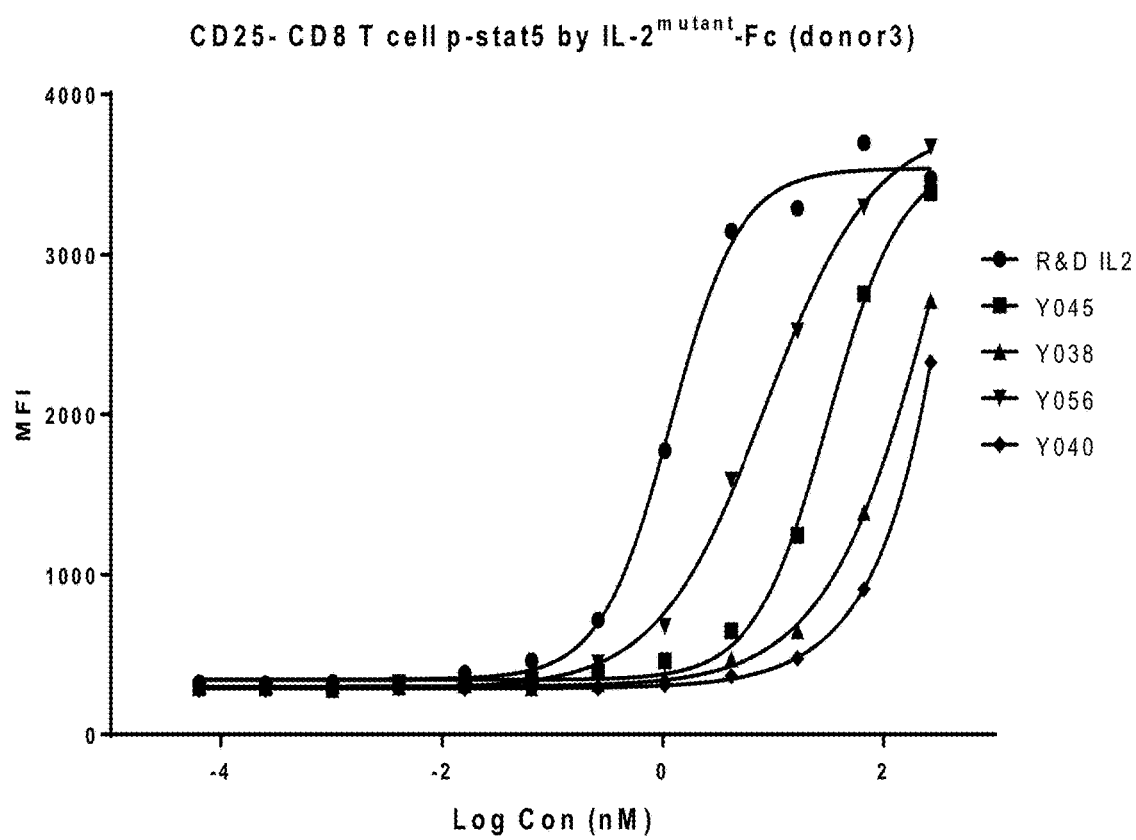

The Experiment Results Show that (by Comparison Under the Same Donor):
1) by comparing the curve positions of the Y001 (IL-2$^{WT}$-GSGS-FcLALA) and the Y045 (IL-2$^{WT}$-2*(G4S)-FcLALA), the curve positions of the Y002 (IL-2$^{3X}$-GSGS-FcLALA) and the Y040 (IL-2$^{3X}$-2*(G4S)-FcLALA), and the curve positions of the Y011 (IL-2$^{-gylcan5}$-GSGS-FcLALA) and the Y038 (IL-2$^{-gylcan5}$-2*(G4S)-FcLALA), it is found that the long linker sequence (GGGGSGGGGS) is superior to the short linker sequence (GSGS) for the activation of CD25$^-$ CD8$^+$ T cells (FIG. 5A).
2) After addition of a chimeric B'C' loop of the human IL-15, the activation effect of the Y017 (IL-2$^{hyb15BCL}$-GSGS-FcLALA) on CD25$^-$ CD8$^+$ T cells (the EC$_{50}$ value of Y017 is 0.9902) is 10.79-fold higher than that of the Y001 (with an EC$_{50}$ value of 10.69) (FIG. 5A), whereas the activation effect of Y017 on CD25$^+$ CD8$^+$ T cells (the EC$_{50}$ value of Y017 is 0.0018) is comparable to that of the Y001 (with an EC$_{50}$ value of 0.0020) (FIG. 5B).
3) After addition of an N-glycan at the IL-2 interface (Y038), the activation effect of the Y038 on CD25$^-$ CD8$^+$ T cells (the EC$_{50}$ value of Y038 is 369.0) is 11.63-fold lower than that of the wild-type IL-2 (Y045, with an EC$_{50}$ value of 31.73), but better than that of the IL-2$^{3X}$ (Y040) reported in the literature. Meanwhile, by adding the B'C' chimeric loop of the human IL-15 (Y056, with an EC$_{50}$ value of 8.571), the activation effect of the Y056 on CD25$^-$ CD8$^+$ T cells is 3.7-fold higher than that of the Y045 and 43.05-fold higher than that of the Y038 (FIG. 5C).

Figure 5D:
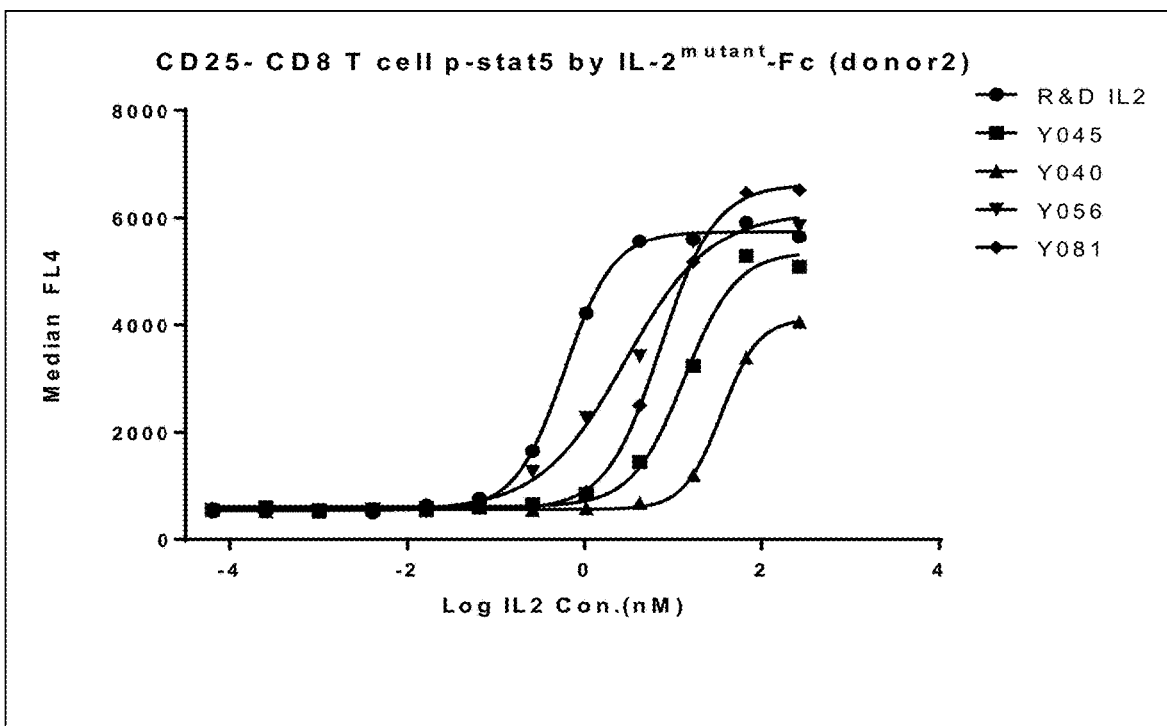

4) Under the same donor, by comparing the number of CD8⁺ T cells before and after stimulation, it is shown that the Y056 and the Y081 have enhanced the activation of CD25⁻ CD8⁺ T cells while reducing the preference for CD25⁺ cell activation (FIGS. 5D-E and Table 5).

| SEQUENCE LISITNG ||||
|---|---|---|---|
| SEQ ID NO | Name | Description | Sequence |
| 1 | Y001 | IL-2-GSGS-FcLALA | APTSSSTKKTQLQLEHLLLDLQMILNGINNYKNPKLT RMLTFKFYMPKKATELKHLQCLEEEELKPLEEVLNLA QSKNFHLRPRDLISNINVIVLELKGSETTFMCEYADET ATIVEFLNRWITFSQSIISTLTGSGSDKTHTCPPCPAPE AAGGPSVFLFPPKPKDTLMISRTPEVTCVVVDVSHED PEVKFNWYVDGVEVHNAKTKPREEQYNSTYRVVSV LTVLHQDWLNGKEYKCKVSNKALPAPIEKTISKAKG QPREPQVYTLPPSREEMTKNQVSLTCLVKGFYPSDIA VEWESNGQPENNYKTTPPVLDSDGSFFLYSKLTVDK SRWQQGNVFSCSVMHEALHNHYTQKSLSLSPGK |
| 2 | Y002 | IL-2⁻³ˣ-GSGS-FcLALA | APTSSSTKKTQLQLEHLLLDLQMILNGINNYKNPKLT DMLTFEFYMPKKATELKHLQCLERELKPLEEVLNLA QSKNFHLRPRDLISNINVIVLELKGSETTFMCEYADET ATIVEFLNRWITFSQSIISTLIGSGSDKTHTCPPCPAPE AAGGPSVFLFPPKPKDTLMISRTPEVTCVVVDVSHED PEVKFNWYVDGVEVHNAKTKPREEQYNSTYRVVSV LTVLHQDWLNGKEYKCKVSNKALPAPIEKTISKAKG QPREPQVYTLPPSREEMTKNQVSLTCLVKGFYPSDIA VEWESNGQPENNYKTTPPVLDSDGSFFLYSKLTVDK SRWQQGNVFSCSVMHEALHNHYTQKSLSLSPGK |
| 3 | Y007 | IL-2⁻ᵍˡʸᶜᵃⁿ¹-GSGS-FcLALA | APTSSSTKKTQLQLEHLLLDLQMILNGINNYKNPNLT RMLTFKFYMPKKATELKHLQCLEEEELKPLEEVLNLA QSKNFHLRPRDLISNINVIVLELKGSETTFMCEYADET ATIVEFLNRWITFSQSIISTLTGSGSDKTHTCPPCPAPE AAGGPSVFLFPPKPKDTLMISRTPEVTCVVVDVSHED PEVKFNWYVDGVEVHNAKTKPREEQYNSTYRVVSV LTVLHQDWLNGKEYKCKVSNKALPAPIEKTISKAKG QPREPQVYTLPPSREEMTKNQVSLTCLVKGFYPSDIA VEWESNGQPENNYKTTPPVLDSDGSFFLYSKLTVDK SRWQQGNVFSCSVMHEALHNHYTQKSLSLSPGK |
| 4 | Y008 | IL-2⁻ᵍˡʸᶜᵃⁿ²-GSGS-FcLALA | APTSSSTKKTQLQLEHLLLDLQMILNGINNYKNPKLT NMSTFKFYMPKKATELKHLQCLEEEELKPLEEVLNLA QSKNFHLRPRDLISNINVIVLELKGSETTFMCEYADET ATIVEFLNRWITFSQSIISTLTGSGSDKTHTCPPCPAPE AAGGPSVFLFPPKPKDTLMISRTPEVTCVVVDVSHED PEVKFNWYVDGVEVHNAKTKPREEQYNSTYRVVSV LTVLHQDWLNGKEYKCKVSNKALPAPIEKTISKAKG QPREPQVYTLPPSREEMTKNQVSLTCLVKGFYPSDIA VEWESNGQPENNYKTTPPVLDSDGSFFLYSKLTVDK SRWQQGNVFSCSVMHEALHNHYTQKSLSLSPGK |
| 5 | Y009 | IL-2⁻ᵍˡʸᶜᵃⁿ³-GSGS-FcLALA | APTSSSTKKTQLQLEHLLLDLQMILNGINNYKNPKLT RMLTFKFYMPKKATELKHLQCLEEEELKPLENVSNLA QSKNFHLRPRDLISNINVIVLELKGSETTFMCEYADET ATIVEFLNRWITFSQSIISTLTGSGSDKTHTCPPCPAPE AAGGPSVFLFPPKPKDTLMISRTPEVTCVVVDVSHED PEVKFNWYVDGVEVHNAKTKPREEQYNSTYRVVSV LTVLHQDWLNGKEYKCKVSNKALPAPIEKTISKAKG QPREPQVYTLPPSREEMTKNQVSLTCLVKGFYPSDIA VEWESNGQPENNYKTTPPVLDSDGSFFLYSKLTVDK SRWQQGNVFSCSVMHEALHNHYTQKSLSLSPGK |
| 6 | Y010 | IL-2⁻ᵍˡʸᶜᵃⁿ⁴-GSGS-FcLALA | APTSSSTKKTQLQLEHLLLDLQMILNGINNYKNPKLT RMLTFKFNMSKKATELKHLQCLEEEELKPLEEVLNLA QSKNFHLRPRDLISNINVIVLELKGSETTFMCEYADET ATIVEFLNRWITFSQSIISTLTGSGSDKTHTCPPCPAPE AAGGPSVFLFPPKPKDTLMISRTPEVTCVVVDVSHED PEVKFNWYVDGVEVHNAKTKPREEQYNSTYRVVSV LTVLHQDWLNGKEYKCKVSNKALPAPIEKTISKAKG QPREPQVYTLPPSREEMTKNQVSLTCLVKGFYPSDIA VEWESNGQPENNYKTTPPVLDSDGSFFLYSKLTVDK SRWQQGNVFSCSVMHEALHNHYTQKSLSLSPGK |

SEQUENCE LISITNG

| SEQ ID NO | Name | Description | Sequence |
|---|---|---|---|
| 7 | Y011 | IL-2<sup>glycan5</sup>-GSGS-FcLALA | APTSSSTKKTQLQLEHLLLDLQMILNGINNYKNPKLT RMLTFNFTMPKKATELKHLQCLEEELKPLEEVLNLA QSKNFHLRPRDLISNINVIVLELKGSETTFMCEYADET ATIVEFLNRWITFSQSIISTLTGSGSDKTHTCPPCPAPE AAGGPSVFLFPPKPKDTLMISRTPEVTCVVVDVSHED PEVKFNWYVDGVEVHNAKTKPREEQYNSTYRVVSV LTVLHQDWLNGKEYKCKVSNKALPAPIEKTISKAKG QPREPQVYTLPPSREEMTKNQVSLTCLVKGFYPSDIA VEWESNGQPENNYKTTPPVLDSDGSFFLYSKLTVDK SRWQQGNVFSCSVMHEALHNHYTQKSLSLSPGK |
| 8 | Y012 | IL-2<sup>glycan6</sup>-GSGS-FcLALA | APTSSSTKKTQLQLEHLLLDLQMILNGINNYKNPKLT RMLTFKFYMPKKATELKHLQCLEENLTPLEEVLNLA QSKNFHLRPRDLISNINVIVLELKGSETTFMCEYADET ATIVEFLNRWITFSQSIISTLTGSGSDKTHTCPPCPAPE AAGGPSVFLFPPKPKDTLMISRTPEVTCVVVDVSHED PEVKFNWYVDGVEVHNAKTKPREEQYNSTYRVVSV LTVLHQDWLNGKEYKCKVSNKALPAPIEKTISKAKG QPREPQVYTLPPSREEMTKNQVSLTCLVKGFYPSDIA VEWESNGQPENNYKTTPPVLDSDGSFFLYSKLTVDK SRWQQGNVFSCSVMHEALHNHYTQKSLSLSPGK |
| 9 | Y013 | IL-2<sup>glycan7</sup>-GSGS-FcLALA | APTSSSTKKTQLQLEHLLLDLQMILNGINNYKNPKLT RMLTFKFYMPKKATELKHLQCLEEELKPLEEVLNNA TSKNFHLRPRDLISNINVIVLELKGSETTFMCEYADET ATIVEFLNRWITFSQSIISTLTGSGSDKTHTCPPCPAPE AAGGPSVFLFPPKPKDTLMISRTPEVTCVVVDVSHED PEVKFNWYVDGVEVHNAKTKPREEQYNSTYRVVSV LTVLHQDWLNGKEYKCKVSNKALPAPIEKTISKAKG QPREPQVYTLPPSREEMTKNQVSLTCLVKGFYPSDIA VEWESNGQPENNYKTTPPVLDSDGSFFLYSKLTVDK SRWQQGNVFSCSVMHEALHNHYTQKSLSLSPGK |
| 10 | Y014 | IL-2<sup>glycan8</sup>-GSGS-FcLALA | APTSSSTKKTQLQLEHLLLDLQMILNGINNYKNPKLT RMLTFKFYMPKKATELKHLQCLEEELKPLEEVLNLA NSTNFHLRPRDLISNINVIVLELKGSETTFMCEYADET ATIVEFLNRWITFSQSIISTLTGSGSDKTHTCPPCPAPE AAGGPSVFLFPPKPKDTLMISRTPEVTCVVVDVSHED PEVKFNWYVDGVEVHNAKTKPREEQYNSTYRVVSV LTVLHQDWLNGKEYKCKVSNKALPAPIEKTISKAKG QPREPQVYTLPPSREEMTKNQVSLTCLVKGFYPSDIA VEWESNGQPENNYKTTPPVLDSDGSFFLYSKLTVDK SRWQQGNVFSCSVMHEALHNHYTQKSLSLSPGK |
| 11 | Y015 | IL-2<sup>glycan9</sup>-GSGS-FcLALA | APTSSSTKKTQLQLEHLLLDLQMILNGINNYKNPKLT RMLNFSFYMPKKATELKHLQCLEEELKPLEEVLNLA QSKNFHLRPRDLISNINVIVLELKGSETTFMCEYADET ATIVEFLNRWITFSQSIISTLTGSGSDKTHTCPPCPAPE AAGGPSVFLFPPKPKDTLMISRTPEVTCVVVDVSHED PEVKFNWYVDGVEVHNAKTKPREEQYNSTYRVVSV LTVLHQDWLNGKEYKCKVSNKALPAPIEKTISKAKG QPREPQVYTLPPSREEMTKNQVSLTCLVKGFYPSDIA VEWESNGQPENNYKTTPPVLDSDGSFFLYSKLTVDK SRWQQGNVFSCSVMHEALHNHYTQKSLSLSPGK |
| 12 | Y017 | IL-2<sup>hyb15BCL</sup>-GSGS-FcLALA | APTSSSTKKTQLQLEHLLLDLQMILNGINNYKNPKLT RMLTFKFYMPKKATELKHLQCLEEELKPLEEVLNLS GDASIHDLISNINVIVLELKGSETTFMCEYADETATIV EFLNRWITFSQSIISTLTGSGSDKTHTCPPCPAPEAAGG PSVFLFPPKPKDTLMISRTPEVTCVVVDVSHEDPEVKF NWYVDGVEVHNAKTKPREEQYNSTYRVVSVLTVLH QDWLNGKEYKCKVSNKALPAPIEKTISKAKGQPREP QVYTLPPSREEMTKNQVSLTCLVKGFYPSDIAVEWES NGQPENNYKTTPPVLDSDGSFFLYSKLTVDKSRWQQ GNVFSCSVMHEALHNHYTQKSLSLSPGK |
| 13 | Y038 | IL-2<sup>glycan5</sup>-2*(G4S)-FcLALA | APTSSSTKKTQLQLEHLLLDLQMILNGINNYKNPKLT RMLTFNFTMPKKATELKHLQCLEEELKPLEEVLNLA QSKNFHLRPRDLISNINVIVLELKGSETTFMCEYADET ATIVEFLNRWITFSQSIISTLTGGGSGGGGSDKTHTC PPCPAPEAAGGPSVFLFPPKPKDTLMISRTPEVTCVVV DVSHEDPEVKFNWYVDGVEVHNAKTKPREEQYNST YRVVSVLTVLHQDWLNGKEYKCKVSNKALPAPIEKT ISKAKGQPREPQVYTLPPSREEMTKNQVSLTCLVKGF |

| SEQ ID NO | Name | Description | Sequence |
|---|---|---|---|
| | | | YPSDIAVEWESNGQPENNYKTTPPVLDSDGSFFLYSK<br>LTVDKSRWQQGNVFSCSVMHEALHNHYTQKSLSLSP<br>GK |
| 14 | Y040 | IL-2·3X-<br>2*(G4S)-<br>FcLALA | APTSSSTKKTQLQLEHLLLDLQMILNGINNYKNPKLT<br>DMLTFEFYMPKKATELKHLQCLERELKPLEEVLNLA<br>QSKNFHLRPRDLISNINVIVLELKGSETTFMCEYADET<br>ATIVEFLNRWITFSQSIISTLTGGGGSGGGGSDKTHTC<br>PPCPAPEAAGGPSVFLFPPKPKDTLMISRTPEVTCVVV<br>DVSHEDPEVKFNWYVDGVEVHNAKTKPREEQYNST<br>YRVVSVLTVLHQDWLNGKEYKCKVSNKALPAPIEKT<br>ISKAKGQPREPQVYTLPPSREEMTKNQVSLTCLVKGF<br>YPSDIAVEWESNGQPENNYKTTPPVLDSDGSFFLYSK<br>LTVDKSRWQQGNVFSCSVMHEALHNHYTQKSLSLSP<br>GK |
| 15 | Y045 | IL-2<sup>WT</sup>-<br>2*(G4S)-<br>FcLALA | APTSSSTKKTQLQLEHLLLDLQMILNGINNYKNPKLT<br>RMLTFKFYMPKKATELKHLQCLEEELKPLEEVLNLA<br>QSKNFHLRPRDLISNINVIVLELKGSETTFMCEYADET<br>ATIVEFLNRWITFSQSIISTLTGGGGSGGGGSDKTHTC<br>PPCPAPEAAGGPSVFLFPPKPKDTLMISRTPEVTCVVV<br>DVSHEDPEVKFNWYVDGVEVHNAKTKPREEQYNST<br>YRVVSVLTVLHQDWLNGKEYKCKVSNKALPAPIEKT<br>ISKAKGQPREPQVYTLPPSREEMTKNQVSLTCLVKGF<br>YPSDIAVEWESNGQPENNYKTTPPVLDSDGSFFLYSK<br>LTVDKSRWQQGNVFSCSVMHEALHNHYTQKSLSLSP<br>GK |
| 16 | Y048 | IL-2<sup>glycan5·glycan8</sup>-<br>GSGS-<br>FcLALA | APTSSSTKKTQLQLEHLLLDLQMILNGINNYKNPKLT<br>RMLTFNFTMPKKATELKHLQCLEEELKPLEEVLNLA<br>NSTNFHLRPRDLISNINVIVLELKGSETTFMCEYADET<br>ATIVEFLNRWITFSQSIISTLTGSGSDKTHTCPPCPAPE<br>AAGGPSVFLFPPKPKDTLMISRTPEVTCVVVDVSHED<br>PEVKFNWYVDGVEVHNAKTKPREEQYNSTYRVVSV<br>LTVLHQDWLNGKEYKCKVSNKALPAPIEKTISKAKG<br>QPREPQVYTLPPSREEMTKNQVSLTCLVKGFYPSDIA<br>VEWESNGQPENNYKTTPPVLDSDGSFFLYSKLTVDK<br>SRWQQGNVFSCSVMHEALHNHYTQKSLSLSPGK |
| 17 | Y049 | IL-2<sup>glycan5·glycan1</sup>-<br>GSGS-<br>FcLALA | APTSSSTKKTQLQLEHLLLDLQMILNGINNYKNPNLT<br>RMLTFNFTMPKKATELKHLQCLEEELKPLEEVLNLA<br>QSKNFHLRPRDLISNINVIVLELKGSETTFMCEYADET<br>ATIVEFLNRWITFSQSIISTLTGSGSDKTHTCPPCPAPE<br>AAGGPSVFLFPPKPKDTLMISRTPEVTCVVVDVSHED<br>PEVKFNWYVDGVEVHNAKTKPREEQYNSTYRVVSV<br>LTVLHQDWLNGKEYKCKVSNKALPAPIEKTISKAKG<br>QPREPQVYTLPPSREEMTKNQVSLTCLVKGFYPSDIA<br>VEWESNGQPENNYKTTPPVLDSDGSFFLYSKLTVDK<br>SRWQQGNVFSCSVMHEALHNHYTQKSLSLSPGK |
| 18 | Y050 | IL-2<sup>glycan5·K35Q</sup>-<br>GSGS-<br>FcLALA | APTSSSTKKTQLQLEHLLLDLQMILNGINNYKNPQLT<br>RMLTFNFTMPKKATELKHLQCLEEELKPLEEVLNLA<br>QSKNFHLRPRDLISNINVIVLELKGSETTFMCEYADET<br>ATIVEFLNRWITFSQSIISTLTGSGSDKTHTCPPCPAPE<br>AAGGPSVFLFPPKPKDTLMISRTPEVTCVVVDVSHED<br>PEVKFNWYVDGVEVHNAKTKPREEQYNSTYRVVSV<br>LTVLHQDWLNGKEYKCKVSNKALPAPIEKTISKAKG<br>QPREPQVYTLPPSREEMTKNQVSLTCLVKGFYPSDIA<br>VEWESNGQPENNYKTTPPVLDSDGSFFLYSKLTVDK<br>SRWQQGNVFSCSVMHEALHNHYTQKSLSLSPGK |
| 19 | Y056 | IL-2<sup>glycan5·15BCL</sup>-<br>2*(G4S)-<br>FcLALA | APTSSSTKKTQLQLEHLLLDLQMILNGINNYKNPKLT<br>RMLTFNFTMPKKATELKHLQCLEEELKPLEEVLNLSG<br>DASIHDLISNINVIVLELKGSETTFMCEYADETATIVEF<br>LNRWITFSQSIISTLTGGGGSGGGGSDKTHTCPPCPAP<br>EAAGGPSVFLFPPKPKDTLMISRTPEVTCVVVDVSHE<br>DPEVKFNWYVDGVEVHNAKTKPREEQYNSTYRVVS<br>VLTVLHQDWLNGKEYKCKVSNKALPAPIEKTISKAK<br>GQPREPQVYTLPPSREEMTKNQVSLTCLVKGFYPSDI<br>AVEWESNGQPENNYKTTPPVLDSDGSFFLYSKLTVD<br>KSRWQQGNVFSCSVMHEALHNHYTQKSLSLSPGK |
| 20 | Y057 | IL-2<sup>truncate1</sup>-<br>GSGS- | APTSSSTKKTQLQLEHLLLDLQMILNGINNYKNPKLT<br>RMLTFKFYMPKKATELKHLQCLEEELKPLEEVLNLA |

-continued

SEQUENCE LISITNG

| SEQ ID NO | Name | Description | Sequence |
|---|---|---|---|
| | | FcLALA | QSKNFHDLISNINVIVLELKGSETTFMCEYADETATIV EFLNRWITFSQSIISTLTGSGSDKTHTCPPCPAPEAAGG PSVFLFPPKPKDTLMISRTPEVTCVVVDVSHEDPEVKF NWYVDGVEVHNAKTKPREEQYNSTYRVVSVLTVLH QDWLNGKEYKCKVSNKALPAPIEKTISKAKGQPREP QVYTLPPSREEMTKNQVSLTCLVKGFYPSDIAVEWES NGQPENNYKTTPPVLDSDGSFFLYSKLTVDKSRWQQ GNVFSCSVMHEALHNHYTQKSLSLSPGK |
| 21 | Y058 | IL-2$^{truncate2}$- GSGS- FcLALA | APTSSSTKKTQLQLEHLLLDLQMILNGINNYKNPKLT RMLTFKFYMPKKATELKHLQCLEEELKPLEEVLNLA GSKNFHDLISNINVIVLELKGSETTFMCEYADETATIV EFLNRWITFSQSIISTLTGSGSDKTHTCPPCPAPEAAGG PSVFLFPPKPKDTLMISRTPEVTCVVVDVSHEDPEVKF NWYVDGVEVHNAKTKPREEQYNSTYRVVSVLTVLH QDWLNGKEYKCKVSNKALPAPIEKTISKAKGQPREP QVYTLPPSREEMTKNQVSLTCLVKGFYPSDIAVEWES NGQPENNYKTTPPVLDSDGSFFLYSKLTVDKSRWQQ GNVFSCSVMHEALHNHYTQKSLSLSPGK |
| 22 | Y059 | IL-2$^{truncate3}$- GSGS- FcLALA | APTSSSTKKTQLQLEHLLLDLQMILNGINNYKNPKLT RMLTFKFYMPKKATELKHLQCLEEELKPLEEVLNLA QSANFHDLISNINVIVLELKGSETTFMCEYADETATIV EFLNRWITFSQSIISTLTGSGSDKTHTCPPCPAPEAAGG PSVFLFPPKPKDTLMISRTPEVTCVVVDVSHEDPEVKF NWYVDGVEVHNAKTKPREEQYNSTYRVVSVLTVLH QDWLNGKEYKCKVSNKALPAPIEKTISKAKGQPREP QVYTLPPSREEMTKNQVSLTCLVKGFYPSDIAVEWES NGQPENNYKTTPPVLDSDGSFFLYSKLTVDKSRWQQ GNVFSCSVMHEALHNHYTQKSLSLSPGK |
| 23 | Y060 | IL-2$^{truncate4}$- GSGS- FcLALA | APTSSSTKKTQLQLEHLLLDLQMILNGINNYKNPKLT RMLTFKFYMPKKATELKHLQCLEEELKPLEEVLNLA QSANIHDLISNINVIVLELKGSETTFMCEYADETATIV EFLNRWITFSQSIISTLTGSGSDKTHTCPPCPAPEAAGG PSVFLFPPKPKDTLMISRTPEVTCVVVDVSHEDPEVKF NWYVDGVEVHNAKTKPREEQYNSTYRVVSVLTVLH QDWLNGKEYKCKVSNKALPAPIEKTISKAKGQPREP QVYTLPPSREEMTKNQVSLTCLVKGFYPSDIAVEWES NGQPENNYKTTPPVLDSDGSFFLYSKLTVDKSRWQQ GNVFSCSVMHEALHNHYTQKSLSLSPGK |
| 24 | Y081 | IL- 2$^{glycan5 \cdot truncate1}$- 2*(G4S)- FcLALA | APTSSSTKKTQLQLEHLLLDLQMILNGINNYKNPKLT RMLTFNFTMPKKATELKHLQCLEEELKPLEEVLNLA QSKNFHDLISNINVIVLELKGSETTFMCEYADETATIV EFLNRWITFSQSIISTLTGGGGSGGGGSDKTHTCPPCP APEAAGGPSVFLFPPKPKDTLMISRTPEVTCVVVDVS HEDPEVKFNWYVDGVEVHNAKTKPREEQYNSTYRV VSVLTVLHQDWLNGKEYKCKVSNKALPAPIEKTISK AKGQPREPQVYTLPPSREEMTKNQVSLTCLVKGFYPS DIAVEWESNGQPENNYKTTPPVLDSDGSFFLYSKLTV DKSRWQQGNVFSCSVMHEALHNHYTQKSLSLSPGK |
| 25 | Y082 | IL- 2$^{glycan5 \cdot truncate2}$- 2*(G4S)- FcLALA | APTSSSTKKTQLQLEHLLLDLQMILNGINNYKNPKLT RMLTFNFTMPKKATELKHLQCLEEELKPLEEVLNLA GSKNFHDLISNINVIVLELKGSETTFMCEYADETATIV EFLNRWITFSQSIISTLTGGGGSGGGGSDKTHTCPPCP APEAAGGPSVFLFPPKPKDTLMISRTPEVTCVVVDVS HEDPEVKFNWYVDGVEVHNAKTKPREEQYNSTYRV VSVLTVLHQDWLNGKEYKCKVSNKALPAPIEKTISK AKGQPREPQVYTLPPSREEMTKNQVSLTCLVKGFYPS DIAVEWESNGQPENNYKTTPPVLDSDGSFFLYSKLTV DKSRWQQGNVFSCSVMHEALHNHYTQKSLSLSPGK |
| 26 | Wild-type IL-2 | IL-2wt | APTSSSTKKTQLQLEHLLLDLQMILNGINNYKNPKLT RMLTFKFYMPKKATELKHLQCLEEELKPLEEVLNLA QSKNFHLRPRDLISNINVIVLELKGSETTFMCEYADET ATIVEFLNRWITFSQSIISTLT |
| 27 | IL-2 mutant | IL-2$^{3X}$ | APTSSSTKKTQLQLEHLLLDLQMILNGINNYKNPKLT DMLTFEFYMPKKATELKHLQCLERELKPLEEVLNLA QSKNFHLRPRDLISNINVIVLELKGSETTFMCEYADET ATIVEFLNRWITFSQSIISTLT |

-continued

| SEQ ID NO | Name | Description | Sequence |
|---|---|---|---|
| 28 | Mutant Fc region | FcLALA | DKTHTCPPCPAPEAAGGPSVFLFPPKPKDTLMISRTPE VTCVVVDVSHEDPEVKFNWYVDGVEVHNAKTKPRE EQYNSTYRVVSVLTVLHQDWLNGKEYKCKVSNKAL PAPIEKTISKAKGQPREPQVYTLPPSREEMTKNQVSLT CLVKGFYPSDIAVEWESNGQPENNYKTTPPVLDSDGS FFLYSKLTVDKSRWQQGNVFSCSVMHEALHNHYTQ KSLSLSPGK |
| 29 | Full-length human IL-2 | hIL-2 | MYRMQLLSCIALSLALVTNSAPTSSSTKKTQLQLEHL LLDLQMILNGINNYKNPKLTRMLTFKFYMPKKATEL KHLQCLEEELKPLEEVLNLAQSKNFHLRPRDLISNINV IVLELKGSETTFMCEYADETATIVEFLNRWITFCQSIIS TLT |
| 30 | Mature human IL-2 | Mature hIL-2 | APTSSSTKKTQLQLEHLLLDLQMILNGINNYKNPKLT RMLTFKFYMPKKATELKHLQCLEEELKPLEEVLNLA QSKNFHLRPRDLISNINVIVLELKGSETTFMCEYADET ATIVEFLNRWITFCQSIISTLT |
| 31 | L007 | IL-2<sup>-glycan1</sup> | APTSSSTKKTQLQLEHLLLDLQMILNGINNYKNPNLT RMLTFKFYMPKKATELKHLQCLEEELKPLEEVLNLA QSKNFHLRPRDLISNINVIVLELKGSETTFMCEYADET ATIVEFLNRWITFSQSIISTLT |
| 32 | L008 | IL-2<sup>-glycan2</sup> | APTSSSTKKTQLQLEHLLLDLQMILNGINNYKNPKLT NMSTFKFYMPKKATELKHLQCLEEELKPLEEVLNLA QSKNFHLRPRDLISNINVIVLELKGSETTFMCEYADET ATIVEFLNRWITFSQSIISTLT |
| 33 | L009 | IL-2<sup>-glycan3</sup> | APTSSSTKKTQLQLEHLLLDLQMILNGINNYKNPKLT RMLTFKFYMPKKATELKHLQCLEEELKPLENVSNLA QSKNFHLRPRDLISNINVIVLELKGSETTFMCEYADET ATIVEFLNRWITFSQSIISTLT |
| 34 | L010 | IL-2<sup>-glycan4</sup> | APTSSSTKKTQLQLEHLLLDLQMILNGINNYKNPKLT RMLTFKFNMSKKATELKHLQCLEEELKPLEEVLNLA QSKNFHLRPRDLISNINVIVLELKGSETTFMCEYADET ATIVEFLNRWITFSQSIISTLT |
| 35 | L011 | IL-2<sup>-glycan5</sup> | APTSSSTKKTQLQLEHLLLDLQMILNGINNYKNPKLT RMLTFNFTMPKKATELKHLQCLEEELKPLEEVLNLA QSKNFHLRPRDLISNINVIVLELKGSETTFMCEYADET ATIVEFLNRWITFSQSIISTLT |
| 36 | L012 | IL-2<sup>-glycan6</sup> | APTSSSTKKTQLQLEHLLLDLQMILNGINNYKNPKLT RMLTFKFYMPKKATELKHLQCLEENLTPLEEVLNLA QSKNFHLRPRDLISNINVIVLELKGSETTFMCEYADET ATIVEFLNRWITFSQSIISTLT |
| 37 | L013 | IL-2<sup>-glycan7</sup> | APTSSSTKKTQLQLEHLLLDLQMILNGINNYKNPKLT RMLTFKFYMPKKATELKHLQCLEEELKPLEEVLNNA TSKNFHLRPRDLISNINVIVLELKGSETTFMCEYADET ATIVEFLNRWITFSQSIISTLT |
| 38 | L014 | IL-2<sup>-glycan8</sup> | APTSSSTKKTQLQLEHLLLDLQMILNGINNYKNPKLT RMLTFKFYMPKKATELKHLQCLEEELKPLEEVLNLA NSTNFHLRPRDLISNINVIVLELKGSETTFMCEYADET ATIVEFLNRWITFSQSIISTLT |
| 39 | L015 | IL-2<sup>-glycan9</sup> | APTSSSTKKTQLQLEHLLLDLQMILNGINNYKNPKLT RMLNFSFYMPKKATELKHLQCLEEELKPLEEVLNLA QSKNFHLRPRDLISNINVIVLELKGSETTFMCEYADET ATIVEFLNRWITFSQSIISTLT |
| 40 | L017 | IL-2<sup>hyb15BCL</sup> | APTSSSTKKTQLQLEHLLLDLQMILNGINNYKNPKLT RMLTFKFYMPKKATELKHLQCLEEELKPLEEVLNLS GDASIHDLISNINVIVLELKGSETTFMCEYADETATIV EFLNRWITFSQSIISTLT |
| 41 | L057 | IL-2<sup>truncate1</sup> | APTSSSTKKTQLQLEHLLLDLQMILNGINNYKNPKLT RMLTFKFYMPKKATELKHLQCLEEELKPLEEVLNLA QSKNFHDLISNINVIVLELKGSETTFMCEYADETATIV EFLNRWITFSQSIISTLT |

SEQUENCE LISITNG

| SEQ ID NO | Name | Description | Sequence |
|---|---|---|---|
| 42 | L058 | IL-2$^{truncate2}$ | APTSSSTKKTQLQLEHLLLDLQMILNGINNYKNPKLT RMLTFKFYMPKKATELKHLQCLEEELKPLEEVLNLA GSKNFHDLISNINVIVLELKGSETTFMCEYADETATIV EFLNRWITFSQSIISTLT |
| 43 | L059 | IL-2$^{truncate3}$ | APTSSSTKKTQLQLEHLLLDLQMILNGINNYKNPKLT RMLTFKFYMPKKATELKHLQCLEEELKPLEEVLNLA QSANFHDLISNINVIVLELKGSETTFMCEYADETATIV EFLNRWITFSQSIISTLT |
| 44 | L060 | IL-2$^{truncate4}$ | APTSSSTKKTQLQLEHLLLDLQMILNGINNYKNPKLT RMLTFKFYMPKKATELKHLQCLEEELKPLEEVLNLA QSANIHDLISNINVIVLELKGSETTFMCEYADETATIV EFLNRWITFSQSIISTLT |
| 45 | Combinatorial mutation | IL-2$^{glycan5\cdot glycan8}$ | APTSSSTKKTQLQLEHLLLDLQMILNGINNYKNPKLT RMLTFNFTMPKKATELKHLQCLEEELKPLEEVLNLA NSTNFHLRPRDLISNINVIVLELKGSETTFMCEYADET ATIVEFLNRWITFSQSIISTLT |
| 46 | Combinatorial mutation | IL-2$^{glycan5\cdot glycan1}$ | APTSSSTKKTQLQLEHLLLDLQMILNGINNYKNPNLT RMLTFNFTMPKKATELKHLQCLEEELKPLEEVLNLA QSKNFHLRPRDLISNINVIVLELKGSETTFMCEYADET ATIVEFLNRWITFSQSIISTLT |
| 47 | Combinatorial mutation | IL-2$^{glycan5\cdot K35Q}$ | APTSSSTKKTQLQLEHLLLDLQMILNGINNYKNPQLT RMLTFNFTMPKKATELKHLQCLEEELKPLEEVLNLA QSKNFHLRPRDLISNINVIVLELKGSETTFMCEYADET ATIVEFLNRWITFSQSIISTLT |
| 48 | Combinatorial mutation | IL-2$^{\cdot glycan5\cdot 15BCL}$ | APTSSSTKKTQLQLEHLLLDLQMILNGINNYKNPKLT RMLTFNFTMPKKATELKHLQCLEEELKPLEEVLNLSG DASIHDLISNINVIVLELKGSETTFMCEYADETATIVEF LNRWITFSQSIISTLT |
| 49 | Combinatorial mutation | IL-2$^{\cdot glycan5\cdot truncate1}$ | APTSSSTKKTQLQLEHLLLDLQMILNGINNYKNPKLT RMLTFNFTMPKKATELKHLQCLEEELKPLEEVLNLA QSKNFHDLISNINVIVLELKGSETTFMCEYADETATIV EFLNRWITFSQSIISTLT |
| 50 | Combinatorial mutation | IL-2$^{\cdot glycan5\cdot truncate2}$ | APTSSSTKKTQLQLEHLLLDLQMILNGINNYKNPKLT RMLTFNFTMPKKATELKHLQCLEEELKPLEEVLNLA GSKNFHDLISNINVIVLELKGSETTFMCEYADETATIV EFLNRWITFSQSIISTLT |

The invention claimed is:

1. An IL-2 mutant protein, comprising, as compared to a wild-type IL-2,
   (i) a shortened B'C' loop region, or
   (ii) a shortened B'C' loop region and a mutated glycosylation motif,
   wherein the shortened B'C' loop region has the sequence of A(Q/G)S(K/A) N(F/I)H or SGDASIH positioned between amino acid residues aa72 and aa84;
   wherein the mutated glycosylation motif is a glycosylation motif N-X-S/T introduced by a mutation at amino acid positions selected from the group consisting of: 38N-39X-40T/S, 41N-42X-43T/S, 43N-44X-45T/S, 45N-46X-47T/S, 62N-63X-64T/S, 68N-69X-70T/S, 72N-73X-74T/S, and 74N-75X-76T/S, wherein X is any amino acid other than proline, or X is an amino acid same as the amino acid at the corresponding position in the wild-type IL-2 or a conservatively substituted residue thereof;
   wherein the wild-type IL-2 is a human IL-2 comprising the sequence of SEQ ID NO: 26;

and wherein the amino acid positions are numbered according to SEQ ID NO: 26.

2. The mutant protein of claim 1, wherein, compared to the wild-type IL-2, the mutant protein comprises a mutated glycosylation motif, selected from the group consisting of:

(i) R38N-M39-L40S, and (ii) Q74N-S75-K76T, wherein, compared to the wild-type IL-2, the mutant protein has improved expression and/or purity, when expressed in the form of an Fc fusion protein in a mammalian cell.

3. The mutant protein of claim 1, wherein, compared to the wild-type IL-2, the mutant protein comprises a mutated glycosylation motif, selected from the group consisting of:

(i) T41N-F42-K43S, (ii) K43N-F44-Y45T, (iii) Y45N-M46-P47S, (iv) E68N-V69-L70S, and (v) L72N-A73-Q74T, optionally, further comprising:
(i) a mutated glycosylation motif selected from the group consisting of 35N-36X-37T/S, 38N-39X-40T/S, and 74N-75X-76T/S; and/or
(ii) a K35Q mutation,
further optionally wherein, compared to the wild-type IL-2, the mutant protein has reduced or eliminated binding to IL-2Rα, and/or has improved expression and purity when expressed in a mammalian cell in the form of an Fc fusion protein.

4. The mutant protein of claim 1, wherein, compared to the wild-type IL-2, the mutant protein comprises:
a loop region having a sequence of A(Q/G)S(K/A) N(F/I)H positioned between amino acid residues aa72 and aa84.

5. The mutant protein of claim 1, wherein compared to the wild-type IL-2, the mutant protein comprises:
(i) a B'C' loop region having the sequence SGDASIH positioned between amino acid residues aa72 and aa84; or
(ii) a B'C' loop region having the sequence AQSKNFH or AGSKNFH positioned between amino acid residues aa72 and aa84.

6. The mutant protein of claim 1, wherein, as compared to the wild-type IL-2, the mutant protein has an enhanced binding to IL-2Rβ, and/or an improved expression yield and/or purity.

7. The mutant protein of claim 1, wherein the mutant protein comprises an amino acid sequence selected from the group consisting of SEQ ID NOs: 40-44, or a sequence having at least 90%, 92%, 93%, 94%, 95%, 96%, 97%, or 98% identity thereto.

8. An IL-2 mutant protein according to claim 1, comprising, as compared to a wild-type IL-2, a combinatorial mutation of: (i) a mutated glycosylation motif selected from the group consisting of 41N-42X-43T/S, 43N-44X-45T/S, 45N-46X-47T/S, 68N-69X-70T/S, and 72N-73X-74T/S; and (ii) a shortened B'C' loop region sequence positioned between amino acid positions aa72 and aa84, selected from the group consisting of SGDASIH and A(Q/G)S(K/A)N(F/I)H, wherein the amino acid positions are numbered according to SEQ ID NO:26.

9. The IL-2 mutant protein of claim 8, having, as compared to the wild-type IL-2, a reduced preference for preferentially stimulating p-STATA5 signaling in CD25$^+$ T cells and an enhanced ability to stimulate signaling in CD25$^-$ T cells.

10. The IL-2 mutant protein of claim 8, wherein the mutant protein comprises combinatorial mutation:
(i) a mutated glycosylation motif of K43N-F44-Y45T and a shortened B'C' loop region having the sequence SGDASIH between amino acid positions aa72 and aa84; or
(ii) a mutated glycosylation motif K43N-F44-Y45T and a shortened B'C' loop region having the sequence AQSKNFH between amino acid positions aa72 and aa84.

11. The mutant protein of claim 10, wherein the mutant protein comprises an amino acid sequence selected from the group consisting of SEQ ID NOs: 48, 49, and 50 or a sequence having at least 90%, 92%, 93%, 94%, 95%, 96%, 97%, or 98% identity thereto.

12. The IL-2 mutant protein of claim 1, wherein the wild-type IL-2 comprises a sequence of SEQ ID NO: 26, and wherein the IL-2 mutant protein has at least 85%, 86%, 87%, 88%, 89%, 90% or 95% identity to the wild-type human IL-2.

13. A pharmaceutical composition, comprising the IL-2 mutant protein of claim 1, or a fusion comprising the IL-2 mutant protein fused to an Fc antibody fragment, and a pharmaceutically acceptable carrier.

* * * * *

SEQUENCE LISTING

<160> NUMBER OF SEQ ID NOS: 50

<210> SEQ ID NO 1
<211> LENGTH: 364
<212> TYPE: PRT
<213> ORGANISM: artificial sequence
<220> FEATURE:
<223> OTHER INFORMATION: Y001 : IL-2-GSGS-FcLALA

<400> SEQUENCE: 1

```
Ala Pro Thr Ser Ser Ser Thr Lys Lys Thr Gln Leu Gln Leu Glu His
1               5                   10                  15

Leu Leu Leu Asp Leu Gln Met Ile Leu Asn Gly Ile Asn Asn Tyr Lys
            20                  25                  30

Asn Pro Lys Leu Thr Arg Met Leu Thr Phe Lys Phe Tyr Met Pro Lys
        35                  40                  45

Lys Ala Thr Glu Leu Lys His Leu Gln Cys Leu Glu Glu Glu Leu Lys
    50                  55                  60
```

-continued

```
Pro Leu Glu Glu Val Leu Asn Leu Ala Gln Ser Lys Asn Phe His Leu
 65                  70                  75                  80

Arg Pro Arg Asp Leu Ile Ser Asn Ile Asn Val Ile Val Leu Glu Leu
                 85                  90                  95

Lys Gly Ser Glu Thr Thr Phe Met Cys Glu Tyr Ala Asp Glu Thr Ala
            100                 105                 110

Thr Ile Val Glu Phe Leu Asn Arg Trp Ile Thr Phe Ser Gln Ser Ile
        115                 120                 125

Ile Ser Thr Leu Thr Gly Ser Gly Ser Asp Lys Thr His Thr Cys Pro
130                 135                 140

Pro Cys Pro Ala Pro Glu Ala Ala Gly Gly Pro Ser Val Phe Leu Phe
145                 150                 155                 160

Pro Pro Lys Pro Lys Asp Thr Leu Met Ile Ser Arg Thr Pro Glu Val
                165                 170                 175

Thr Cys Val Val Val Asp Val Ser His Glu Asp Pro Glu Val Lys Phe
            180                 185                 190

Asn Trp Tyr Val Asp Gly Val Glu Val His Asn Ala Lys Thr Lys Pro
        195                 200                 205

Arg Glu Glu Gln Tyr Asn Ser Thr Tyr Arg Val Val Ser Val Leu Thr
210                 215                 220

Val Leu His Gln Asp Trp Leu Asn Gly Lys Glu Tyr Lys Cys Lys Val
225                 230                 235                 240

Ser Asn Lys Ala Leu Pro Ala Pro Ile Glu Lys Thr Ile Ser Lys Ala
                245                 250                 255

Lys Gly Gln Pro Arg Glu Pro Gln Val Tyr Thr Leu Pro Pro Ser Arg
            260                 265                 270

Glu Glu Met Thr Lys Asn Gln Val Ser Leu Thr Cys Leu Val Lys Gly
        275                 280                 285

Phe Tyr Pro Ser Asp Ile Ala Val Glu Trp Glu Ser Asn Gly Gln Pro
290                 295                 300

Glu Asn Asn Tyr Lys Thr Thr Pro Pro Val Leu Asp Ser Asp Gly Ser
305                 310                 315                 320

Phe Phe Leu Tyr Ser Lys Leu Thr Val Asp Lys Ser Arg Trp Gln Gln
                325                 330                 335

Gly Asn Val Phe Ser Cys Ser Val Met His Glu Ala Leu His Asn His
            340                 345                 350

Tyr Thr Gln Lys Ser Leu Ser Leu Ser Pro Gly Lys
        355                 360

<210> SEQ ID NO 2
<211> LENGTH: 364
<212> TYPE: PRT
<213> ORGANISM: artificial sequence
<220> FEATURE:
<223> OTHER INFORMATION: Y002 : IL-2.3X-GSGS-FcLALA

<400> SEQUENCE: 2

Ala Pro Thr Ser Ser Ser Thr Lys Lys Thr Gln Leu Gln Leu Glu His
  1               5                  10                  15

Leu Leu Leu Asp Leu Gln Met Ile Leu Asn Gly Ile Asn Asn Tyr Lys
                 20                  25                  30

Asn Pro Lys Leu Thr Asp Met Leu Thr Phe Glu Phe Tyr Met Pro Lys
            35                  40                  45

Lys Ala Thr Glu Leu Lys His Leu Gln Cys Leu Glu Arg Glu Leu Lys
        50                  55                  60
```

```
Pro Leu Glu Glu Val Leu Asn Leu Ala Gln Ser Lys Asn Phe His Leu
 65                  70                  75                  80

Arg Pro Arg Asp Leu Ile Ser Asn Ile Asn Val Ile Val Leu Glu Leu
                 85                  90                  95

Lys Gly Ser Glu Thr Thr Phe Met Cys Glu Tyr Ala Asp Glu Thr Ala
            100                 105                 110

Thr Ile Val Glu Phe Leu Asn Arg Trp Ile Thr Phe Ser Gln Ser Ile
        115                 120                 125

Ile Ser Thr Leu Thr Gly Ser Gly Ser Asp Lys Thr His Thr Cys Pro
    130                 135                 140

Pro Cys Pro Ala Pro Glu Ala Ala Gly Gly Pro Ser Val Phe Leu Phe
145                 150                 155                 160

Pro Pro Lys Pro Lys Asp Thr Leu Met Ile Ser Arg Thr Pro Glu Val
                165                 170                 175

Thr Cys Val Val Val Asp Val Ser His Glu Asp Pro Glu Val Lys Phe
            180                 185                 190

Asn Trp Tyr Val Asp Gly Val Glu Val His Asn Ala Lys Thr Lys Pro
        195                 200                 205

Arg Glu Glu Gln Tyr Asn Ser Thr Tyr Arg Val Val Ser Val Leu Thr
    210                 215                 220

Val Leu His Gln Asp Trp Leu Asn Gly Lys Glu Tyr Lys Cys Lys Val
225                 230                 235                 240

Ser Asn Lys Ala Leu Pro Ala Pro Ile Glu Lys Thr Ile Ser Lys Ala
                245                 250                 255

Lys Gly Gln Pro Arg Glu Pro Gln Val Tyr Thr Leu Pro Pro Ser Arg
            260                 265                 270

Glu Glu Met Thr Lys Asn Gln Val Ser Leu Thr Cys Leu Val Lys Gly
        275                 280                 285

Phe Tyr Pro Ser Asp Ile Ala Val Glu Trp Glu Ser Asn Gly Gln Pro
    290                 295                 300

Glu Asn Asn Tyr Lys Thr Thr Pro Pro Val Leu Asp Ser Asp Gly Ser
305                 310                 315                 320

Phe Phe Leu Tyr Ser Lys Leu Thr Val Asp Lys Ser Arg Trp Gln Gln
                325                 330                 335

Gly Asn Val Phe Ser Cys Ser Val Met His Glu Ala Leu His Asn His
            340                 345                 350

Tyr Thr Gln Lys Ser Leu Ser Leu Ser Pro Gly Lys
        355                 360

<210> SEQ ID NO 3
<211> LENGTH: 364
<212> TYPE: PRT
<213> ORGANISM: artificial sequence
<220> FEATURE:
<223> OTHER INFORMATION: Y007 : IL-2.glycan1-GSGS-FcLALA

<400> SEQUENCE: 3

Ala Pro Thr Ser Ser Ser Thr Lys Lys Thr Gln Leu Gln Leu Glu His
 1               5                  10                  15

Leu Leu Leu Asp Leu Gln Met Ile Leu Asn Gly Ile Asn Asn Tyr Lys
                 20                  25                  30

Asn Pro Asn Leu Thr Arg Met Leu Thr Phe Lys Phe Tyr Met Pro Lys
             35                  40                  45

Lys Ala Thr Glu Leu Lys His Leu Gln Cys Leu Glu Glu Glu Leu Lys
         50                  55                  60
```

```
Pro Leu Glu Glu Val Leu Asn Leu Ala Gln Ser Lys Asn Phe His Leu
 65                  70                  75                  80

Arg Pro Arg Asp Leu Ile Ser Asn Ile Asn Val Ile Val Leu Glu Leu
             85                  90                  95

Lys Gly Ser Glu Thr Thr Phe Met Cys Glu Tyr Ala Asp Glu Thr Ala
            100                 105                 110

Thr Ile Val Glu Phe Leu Asn Arg Trp Ile Thr Phe Ser Gln Ser Ile
            115                 120                 125

Ile Ser Thr Leu Thr Gly Ser Gly Asp Lys Thr His Thr Cys Pro
130                 135                 140

Pro Cys Pro Ala Pro Glu Ala Ala Gly Gly Pro Ser Val Phe Leu Phe
145                 150                 155                 160

Pro Pro Lys Pro Lys Asp Thr Leu Met Ile Ser Arg Thr Pro Glu Val
                165                 170                 175

Thr Cys Val Val Val Asp Val Ser His Glu Asp Pro Glu Val Lys Phe
            180                 185                 190

Asn Trp Tyr Val Asp Gly Val Glu Val His Asn Ala Lys Thr Lys Pro
            195                 200                 205

Arg Glu Glu Gln Tyr Asn Ser Thr Tyr Arg Val Val Ser Val Leu Thr
210                 215                 220

Val Leu His Gln Asp Trp Leu Asn Gly Lys Glu Tyr Lys Cys Lys Val
225                 230                 235                 240

Ser Asn Lys Ala Leu Pro Ala Pro Ile Glu Lys Thr Ile Ser Lys Ala
                245                 250                 255

Lys Gly Gln Pro Arg Glu Pro Gln Val Tyr Thr Leu Pro Pro Ser Arg
            260                 265                 270

Glu Glu Met Thr Lys Asn Gln Val Ser Leu Thr Cys Leu Val Lys Gly
            275                 280                 285

Phe Tyr Pro Ser Asp Ile Ala Val Glu Trp Glu Ser Asn Gly Gln Pro
            290                 295                 300

Glu Asn Asn Tyr Lys Thr Thr Pro Pro Val Leu Asp Ser Asp Gly Ser
305                 310                 315                 320

Phe Phe Leu Tyr Ser Lys Leu Thr Val Asp Lys Ser Arg Trp Gln Gln
                325                 330                 335

Gly Asn Val Phe Ser Cys Ser Val Met His Glu Ala Leu His Asn His
            340                 345                 350

Tyr Thr Gln Lys Ser Leu Ser Leu Ser Pro Gly Lys
            355                 360

<210> SEQ ID NO 4
<211> LENGTH: 364
<212> TYPE: PRT
<213> ORGANISM: artificial sequence
<220> FEATURE:
<223> OTHER INFORMATION: Y008 : IL-2.glycan2-GSGS-FcLALA

<400> SEQUENCE: 4

Ala Pro Thr Ser Ser Ser Thr Lys Lys Thr Gln Leu Gln Leu Glu His
 1               5                  10                  15

Leu Leu Leu Asp Leu Gln Met Ile Leu Asn Gly Ile Asn Asn Tyr Lys
             20                  25                  30

Asn Pro Lys Leu Thr Asn Met Ser Thr Phe Lys Phe Tyr Met Pro Lys
         35                  40                  45

Lys Ala Thr Glu Leu Lys His Leu Gln Cys Leu Glu Glu Glu Leu Lys
 50                  55                  60
```

-continued

Pro Leu Glu Glu Val Leu Asn Leu Ala Gln Ser Lys Asn Phe His Leu
65                  70                  75                  80

Arg Pro Arg Asp Leu Ile Ser Asn Ile Asn Val Ile Val Leu Glu Leu
            85                  90                  95

Lys Gly Ser Glu Thr Thr Phe Met Cys Glu Tyr Ala Asp Glu Thr Ala
            100                 105                 110

Thr Ile Val Glu Phe Leu Asn Arg Trp Ile Thr Phe Ser Gln Ser Ile
            115                 120                 125

Ile Ser Thr Leu Thr Gly Ser Gly Ser Asp Lys Thr His Thr Cys Pro
130                 135                 140

Pro Cys Pro Ala Pro Glu Ala Ala Gly Gly Pro Ser Val Phe Leu Phe
145                 150                 155                 160

Pro Pro Lys Pro Lys Asp Thr Leu Met Ile Ser Arg Thr Pro Glu Val
            165                 170                 175

Thr Cys Val Val Val Asp Val Ser His Glu Asp Pro Glu Val Lys Phe
            180                 185                 190

Asn Trp Tyr Val Asp Gly Val Glu Val His Asn Ala Lys Thr Lys Pro
            195                 200                 205

Arg Glu Glu Gln Tyr Asn Ser Thr Tyr Arg Val Val Ser Val Leu Thr
210                 215                 220

Val Leu His Gln Asp Trp Leu Asn Gly Lys Glu Tyr Lys Cys Lys Val
225                 230                 235                 240

Ser Asn Lys Ala Leu Pro Ala Pro Ile Glu Lys Thr Ile Ser Lys Ala
            245                 250                 255

Lys Gly Gln Pro Arg Glu Pro Gln Val Tyr Thr Leu Pro Pro Ser Arg
            260                 265                 270

Glu Glu Met Thr Lys Asn Gln Val Ser Leu Thr Cys Leu Val Lys Gly
            275                 280                 285

Phe Tyr Pro Ser Asp Ile Ala Val Glu Trp Glu Ser Asn Gly Gln Pro
            290                 295                 300

Glu Asn Asn Tyr Lys Thr Thr Pro Pro Val Leu Asp Ser Asp Gly Ser
305                 310                 315                 320

Phe Phe Leu Tyr Ser Lys Leu Thr Val Asp Lys Ser Arg Trp Gln Gln
            325                 330                 335

Gly Asn Val Phe Ser Cys Ser Val Met His Glu Ala Leu His Asn His
            340                 345                 350

Tyr Thr Gln Lys Ser Leu Ser Leu Ser Pro Gly Lys
            355                 360

<210> SEQ ID NO 5
<211> LENGTH: 364
<212> TYPE: PRT
<213> ORGANISM: artificial sequence
<220> FEATURE:
<223> OTHER INFORMATION: Y009 : IL-2.glycan3-GSGS-FcLALA

<400> SEQUENCE: 5

Ala Pro Thr Ser Ser Ser Thr Lys Lys Thr Gln Leu Gln Leu Glu His
1               5                   10                  15

Leu Leu Leu Asp Leu Gln Met Ile Leu Asn Gly Ile Asn Asn Tyr Lys
            20                  25                  30

Asn Pro Lys Leu Thr Arg Met Leu Thr Phe Lys Phe Tyr Met Pro Lys
            35                  40                  45

Lys Ala Thr Glu Leu Lys His Leu Gln Cys Leu Glu Glu Glu Leu Lys
50                  55                  60

-continued

```
Pro Leu Glu Asn Val Ser Asn Leu Ala Gln Ser Lys Asn Phe His Leu
 65                  70                  75                  80

Arg Pro Arg Asp Leu Ile Ser Asn Ile Asn Val Ile Val Leu Glu Leu
                 85                  90                  95

Lys Gly Ser Glu Thr Thr Phe Met Cys Glu Tyr Ala Asp Glu Thr Ala
            100                 105                 110

Thr Ile Val Glu Phe Leu Asn Arg Trp Ile Thr Phe Ser Gln Ser Ile
        115                 120                 125

Ile Ser Thr Leu Thr Gly Ser Gly Ser Asp Lys Thr His Thr Cys Pro
    130                 135                 140

Pro Cys Pro Ala Pro Glu Ala Ala Gly Gly Pro Ser Val Phe Leu Phe
145                 150                 155                 160

Pro Pro Lys Pro Lys Asp Thr Leu Met Ile Ser Arg Thr Pro Glu Val
                165                 170                 175

Thr Cys Val Val Val Asp Val Ser His Glu Asp Pro Glu Val Lys Phe
            180                 185                 190

Asn Trp Tyr Val Asp Gly Val Glu Val His Asn Ala Lys Thr Lys Pro
        195                 200                 205

Arg Glu Glu Gln Tyr Asn Ser Thr Tyr Arg Val Val Ser Val Leu Thr
    210                 215                 220

Val Leu His Gln Asp Trp Leu Asn Gly Lys Glu Tyr Lys Cys Lys Val
225                 230                 235                 240

Ser Asn Lys Ala Leu Pro Ala Pro Ile Glu Lys Thr Ile Ser Lys Ala
                245                 250                 255

Lys Gly Gln Pro Arg Glu Pro Gln Val Tyr Thr Leu Pro Pro Ser Arg
            260                 265                 270

Glu Glu Met Thr Lys Asn Gln Val Ser Leu Thr Cys Leu Val Lys Gly
        275                 280                 285

Phe Tyr Pro Ser Asp Ile Ala Val Glu Trp Glu Ser Asn Gly Gln Pro
    290                 295                 300

Glu Asn Asn Tyr Lys Thr Thr Pro Pro Val Leu Asp Ser Asp Gly Ser
305                 310                 315                 320

Phe Phe Leu Tyr Ser Lys Leu Thr Val Asp Lys Ser Arg Trp Gln Gln
                325                 330                 335

Gly Asn Val Phe Ser Cys Ser Val Met His Glu Ala Leu His Asn His
            340                 345                 350

Tyr Thr Gln Lys Ser Leu Ser Leu Ser Pro Gly Lys
    355                 360
```

<210> SEQ ID NO 6
<211> LENGTH: 364
<212> TYPE: PRT
<213> ORGANISM: artificial sequence
<220> FEATURE:
<223> OTHER INFORMATION: Y010 : IL-2.glycan4-GSGS-FcLALA

<400> SEQUENCE: 6

```
Ala Pro Thr Ser Ser Ser Thr Lys Lys Thr Gln Leu Gln Leu Glu His
  1               5                  10                  15

Leu Leu Leu Asp Leu Gln Met Ile Leu Asn Gly Ile Asn Asn Tyr Lys
                 20                  25                  30

Asn Pro Lys Leu Thr Arg Met Leu Thr Phe Lys Phe Asn Met Ser Lys
             35                  40                  45

Lys Ala Thr Glu Leu Lys His Leu Gln Cys Leu Glu Glu Glu Leu Lys
         50                  55                  60
```

```
Pro Leu Glu Glu Val Leu Asn Leu Ala Gln Ser Lys Asn Phe His Leu
 65                  70                  75                  80

Arg Pro Arg Asp Leu Ile Ser Asn Ile Asn Val Ile Val Leu Glu Leu
                 85                  90                  95

Lys Gly Ser Glu Thr Thr Phe Met Cys Glu Tyr Ala Asp Glu Thr Ala
            100                 105                 110

Thr Ile Val Glu Phe Leu Asn Arg Trp Ile Thr Phe Ser Gln Ser Ile
        115                 120                 125

Ile Ser Thr Leu Thr Gly Ser Gly Ser Asp Lys Thr His Thr Cys Pro
    130                 135                 140

Pro Cys Pro Ala Pro Glu Ala Ala Gly Gly Pro Ser Val Phe Leu Phe
145                 150                 155                 160

Pro Pro Lys Pro Lys Asp Thr Leu Met Ile Ser Arg Thr Pro Glu Val
                165                 170                 175

Thr Cys Val Val Val Asp Val Ser His Glu Asp Pro Glu Val Lys Phe
            180                 185                 190

Asn Trp Tyr Val Asp Gly Val Glu Val His Asn Ala Lys Thr Lys Pro
        195                 200                 205

Arg Glu Glu Gln Tyr Asn Ser Thr Tyr Arg Val Val Ser Val Leu Thr
    210                 215                 220

Val Leu His Gln Asp Trp Leu Asn Gly Lys Glu Tyr Lys Cys Lys Val
225                 230                 235                 240

Ser Asn Lys Ala Leu Pro Ala Pro Ile Glu Lys Thr Ile Ser Lys Ala
                245                 250                 255

Lys Gly Gln Pro Arg Glu Pro Gln Val Tyr Thr Leu Pro Pro Ser Arg
            260                 265                 270

Glu Glu Met Thr Lys Asn Gln Val Ser Leu Thr Cys Leu Val Lys Gly
        275                 280                 285

Phe Tyr Pro Ser Asp Ile Ala Val Glu Trp Glu Ser Asn Gly Gln Pro
    290                 295                 300

Glu Asn Asn Tyr Lys Thr Thr Pro Pro Val Leu Asp Ser Asp Gly Ser
305                 310                 315                 320

Phe Phe Leu Tyr Ser Lys Leu Thr Val Asp Lys Ser Arg Trp Gln Gln
                325                 330                 335

Gly Asn Val Phe Ser Cys Ser Val Met His Glu Ala Leu His Asn His
            340                 345                 350

Tyr Thr Gln Lys Ser Leu Ser Leu Ser Pro Gly Lys
        355                 360

<210> SEQ ID NO 7
<211> LENGTH: 364
<212> TYPE: PRT
<213> ORGANISM: artificial sequence
<220> FEATURE:
<223> OTHER INFORMATION: Y011 : IL-2.glycan5-GSGS-FcLALA

<400> SEQUENCE: 7

Ala Pro Thr Ser Ser Ser Thr Lys Lys Thr Gln Leu Gln Leu Glu His
 1               5                  10                  15

Leu Leu Leu Asp Leu Gln Met Ile Leu Asn Gly Ile Asn Asn Tyr Lys
                20                  25                  30

Asn Pro Lys Leu Thr Arg Met Leu Thr Phe Asn Phe Thr Met Pro Lys
            35                  40                  45

Lys Ala Thr Glu Leu Lys His Leu Gln Cys Leu Glu Glu Glu Leu Lys
        50                  55                  60
```

```
Pro Leu Glu Glu Val Leu Asn Leu Ala Gln Ser Lys Asn Phe His Leu
 65                  70                  75                  80

Arg Pro Arg Asp Leu Ile Ser Asn Ile Asn Val Ile Val Leu Glu Leu
                 85                  90                  95

Lys Gly Ser Glu Thr Thr Phe Met Cys Glu Tyr Ala Asp Glu Thr Ala
            100                 105                 110

Thr Ile Val Glu Phe Leu Asn Arg Trp Ile Thr Phe Ser Gln Ser Ile
        115                 120                 125

Ile Ser Thr Leu Thr Gly Ser Gly Ser Asp Lys Thr His Thr Cys Pro
    130                 135                 140

Pro Cys Pro Ala Pro Glu Ala Ala Gly Gly Pro Ser Val Phe Leu Phe
145                 150                 155                 160

Pro Pro Lys Pro Lys Asp Thr Leu Met Ile Ser Arg Thr Pro Glu Val
                165                 170                 175

Thr Cys Val Val Val Asp Val Ser His Glu Asp Pro Glu Val Lys Phe
            180                 185                 190

Asn Trp Tyr Val Asp Gly Val Glu Val His Asn Ala Lys Thr Lys Pro
        195                 200                 205

Arg Glu Glu Gln Tyr Asn Ser Thr Tyr Arg Val Val Ser Val Leu Thr
    210                 215                 220

Val Leu His Gln Asp Trp Leu Asn Gly Lys Glu Tyr Lys Cys Lys Val
225                 230                 235                 240

Ser Asn Lys Ala Leu Pro Ala Pro Ile Glu Lys Thr Ile Ser Lys Ala
                245                 250                 255

Lys Gly Gln Pro Arg Glu Pro Gln Val Tyr Thr Leu Pro Pro Ser Arg
            260                 265                 270

Glu Glu Met Thr Lys Asn Gln Val Ser Leu Thr Cys Leu Val Lys Gly
        275                 280                 285

Phe Tyr Pro Ser Asp Ile Ala Val Glu Trp Glu Ser Asn Gly Gln Pro
    290                 295                 300

Glu Asn Asn Tyr Lys Thr Thr Pro Pro Val Leu Asp Ser Asp Gly Ser
305                 310                 315                 320

Phe Phe Leu Tyr Ser Lys Leu Thr Val Asp Lys Ser Arg Trp Gln Gln
                325                 330                 335

Gly Asn Val Phe Ser Cys Ser Val Met His Glu Ala Leu His Asn His
            340                 345                 350

Tyr Thr Gln Lys Ser Leu Ser Leu Ser Pro Gly Lys
    355                 360

<210> SEQ ID NO 8
<211> LENGTH: 364
<212> TYPE: PRT
<213> ORGANISM: artificial sequence
<220> FEATURE:
<223> OTHER INFORMATION: Y012 : IL-2.glycan6-GSGS-FcLALA

<400> SEQUENCE: 8

Ala Pro Thr Ser Ser Ser Thr Lys Lys Thr Gln Leu Gln Leu Glu His
 1               5                  10                  15

Leu Leu Leu Asp Leu Gln Met Ile Leu Asn Gly Ile Asn Asn Tyr Lys
                 20                  25                  30

Asn Pro Lys Leu Thr Arg Met Leu Thr Phe Lys Phe Tyr Met Pro Lys
            35                  40                  45

Lys Ala Thr Glu Leu Lys His Leu Gln Cys Leu Glu Glu Asn Leu Thr
        50                  55                  60
```

```
Pro Leu Glu Glu Val Leu Asn Leu Ala Gln Ser Lys Asn Phe His Leu
 65                  70                  75                  80

Arg Pro Arg Asp Leu Ile Ser Asn Ile Asn Val Ile Val Leu Glu Leu
                 85                  90                  95

Lys Gly Ser Glu Thr Thr Phe Met Cys Glu Tyr Ala Asp Glu Thr Ala
            100                 105                 110

Thr Ile Val Glu Phe Leu Asn Arg Trp Ile Thr Phe Ser Gln Ser Ile
        115                 120                 125

Ile Ser Thr Leu Thr Gly Ser Gly Ser Asp Lys Thr His Thr Cys Pro
    130                 135                 140

Pro Cys Pro Ala Pro Glu Ala Ala Gly Gly Pro Ser Val Phe Leu Phe
145                 150                 155                 160

Pro Pro Lys Pro Lys Asp Thr Leu Met Ile Ser Arg Thr Pro Glu Val
                165                 170                 175

Thr Cys Val Val Val Asp Val Ser His Glu Asp Pro Glu Val Lys Phe
            180                 185                 190

Asn Trp Tyr Val Asp Gly Val Glu Val His Asn Ala Lys Thr Lys Pro
        195                 200                 205

Arg Glu Glu Gln Tyr Asn Ser Thr Tyr Arg Val Val Ser Val Leu Thr
    210                 215                 220

Val Leu His Gln Asp Trp Leu Asn Gly Lys Glu Tyr Lys Cys Lys Val
225                 230                 235                 240

Ser Asn Lys Ala Leu Pro Ala Pro Ile Glu Lys Thr Ile Ser Lys Ala
                245                 250                 255

Lys Gly Gln Pro Arg Glu Pro Gln Val Tyr Thr Leu Pro Pro Ser Arg
            260                 265                 270

Glu Glu Met Thr Lys Asn Gln Val Ser Leu Thr Cys Leu Val Lys Gly
        275                 280                 285

Phe Tyr Pro Ser Asp Ile Ala Val Glu Trp Glu Ser Asn Gly Gln Pro
    290                 295                 300

Glu Asn Asn Tyr Lys Thr Thr Pro Pro Val Leu Asp Ser Asp Gly Ser
305                 310                 315                 320

Phe Phe Leu Tyr Ser Lys Leu Thr Val Asp Lys Ser Arg Trp Gln Gln
                325                 330                 335

Gly Asn Val Phe Ser Cys Ser Val Met His Glu Ala Leu His Asn His
            340                 345                 350

Tyr Thr Gln Lys Ser Leu Ser Leu Ser Pro Gly Lys
        355                 360

<210> SEQ ID NO 9
<211> LENGTH: 364
<212> TYPE: PRT
<213> ORGANISM: artificial sequence
<220> FEATURE:
<223> OTHER INFORMATION: Y013 : IL-2.glycan7-GSGS-FcLALA

<400> SEQUENCE: 9

Ala Pro Thr Ser Ser Ser Thr Lys Lys Thr Gln Leu Gln Leu Glu His
 1               5                  10                  15

Leu Leu Leu Asp Leu Gln Met Ile Leu Asn Gly Ile Asn Asn Tyr Lys
                 20                  25                  30

Asn Pro Lys Leu Thr Arg Met Leu Thr Phe Lys Phe Tyr Met Pro Lys
             35                  40                  45

Lys Ala Thr Glu Leu Lys His Leu Gln Cys Leu Glu Glu Glu Leu Lys
 50                  55                  60
```

Pro Leu Glu Glu Val Leu Asn Asn Ala Thr Ser Lys Asn Phe His Leu
 65                  70                  75                  80

Arg Pro Arg Asp Leu Ile Ser Asn Ile Asn Val Ile Val Leu Glu Leu
                 85                  90                  95

Lys Gly Ser Glu Thr Thr Phe Met Cys Glu Tyr Ala Asp Glu Thr Ala
            100                 105                 110

Thr Ile Val Glu Phe Leu Asn Arg Trp Ile Thr Phe Ser Gln Ser Ile
        115                 120                 125

Ile Ser Thr Leu Thr Gly Ser Gly Ser Asp Lys Thr His Thr Cys Pro
    130                 135                 140

Pro Cys Pro Ala Pro Glu Ala Ala Gly Gly Pro Ser Val Phe Leu Phe
145                 150                 155                 160

Pro Pro Lys Pro Lys Asp Thr Leu Met Ile Ser Arg Thr Pro Glu Val
                165                 170                 175

Thr Cys Val Val Val Asp Val Ser His Glu Asp Pro Glu Val Lys Phe
            180                 185                 190

Asn Trp Tyr Val Asp Gly Val Glu Val His Asn Ala Lys Thr Lys Pro
        195                 200                 205

Arg Glu Glu Gln Tyr Asn Ser Thr Tyr Arg Val Val Ser Val Leu Thr
    210                 215                 220

Val Leu His Gln Asp Trp Leu Asn Gly Lys Glu Tyr Lys Cys Lys Val
225                 230                 235                 240

Ser Asn Lys Ala Leu Pro Ala Pro Ile Glu Lys Thr Ile Ser Lys Ala
                245                 250                 255

Lys Gly Gln Pro Arg Glu Pro Gln Val Tyr Thr Leu Pro Pro Ser Arg
            260                 265                 270

Glu Glu Met Thr Lys Asn Gln Val Ser Leu Thr Cys Leu Val Lys Gly
        275                 280                 285

Phe Tyr Pro Ser Asp Ile Ala Val Glu Trp Glu Ser Asn Gly Gln Pro
    290                 295                 300

Glu Asn Asn Tyr Lys Thr Thr Pro Pro Val Leu Asp Ser Asp Gly Ser
305                 310                 315                 320

Phe Phe Leu Tyr Ser Lys Leu Thr Val Asp Lys Ser Arg Trp Gln Gln
                325                 330                 335

Gly Asn Val Phe Ser Cys Ser Val Met His Glu Ala Leu His Asn His
            340                 345                 350

Tyr Thr Gln Lys Ser Leu Ser Leu Ser Pro Gly Lys
    355                 360

<210> SEQ ID NO 10
<211> LENGTH: 364
<212> TYPE: PRT
<213> ORGANISM: artificial sequence
<220> FEATURE:
<223> OTHER INFORMATION: Y014 : IL-2.glycan8-GSGS-FcLALA

<400> SEQUENCE: 10

Ala Pro Thr Ser Ser Ser Thr Lys Lys Thr Gln Leu Gln Leu Glu His
 1               5                  10                  15

Leu Leu Leu Asp Leu Gln Met Ile Leu Asn Gly Ile Asn Asn Tyr Lys
                 20                  25                  30

Asn Pro Lys Leu Thr Arg Met Leu Thr Phe Lys Phe Tyr Met Pro Lys
             35                  40                  45

Lys Ala Thr Glu Leu Lys His Leu Gln Cys Leu Glu Glu Glu Leu Lys
 50                  55                  60

```
Pro Leu Glu Glu Val Leu Asn Leu Ala Asn Ser Thr Asn Phe His Leu
 65                  70                  75                  80

Arg Pro Arg Asp Leu Ile Ser Asn Ile Asn Val Ile Val Leu Glu Leu
             85                  90                  95

Lys Gly Ser Glu Thr Thr Phe Met Cys Glu Tyr Ala Asp Glu Thr Ala
            100                 105                 110

Thr Ile Val Glu Phe Leu Asn Arg Trp Ile Thr Phe Ser Gln Ser Ile
            115                 120                 125

Ile Ser Thr Leu Thr Gly Ser Gly Ser Asp Lys Thr His Thr Cys Pro
130                 135                 140

Pro Cys Pro Ala Pro Glu Ala Ala Gly Gly Pro Ser Val Phe Leu Phe
145                 150                 155                 160

Pro Pro Lys Pro Lys Asp Thr Leu Met Ile Ser Arg Thr Pro Glu Val
            165                 170                 175

Thr Cys Val Val Val Asp Val Ser His Glu Asp Pro Glu Val Lys Phe
            180                 185                 190

Asn Trp Tyr Val Asp Gly Val Glu Val His Asn Ala Lys Thr Lys Pro
            195                 200                 205

Arg Glu Glu Gln Tyr Asn Ser Thr Tyr Arg Val Val Ser Val Leu Thr
210                 215                 220

Val Leu His Gln Asp Trp Leu Asn Gly Lys Glu Tyr Lys Cys Lys Val
225                 230                 235                 240

Ser Asn Lys Ala Leu Pro Ala Pro Ile Glu Lys Thr Ile Ser Lys Ala
            245                 250                 255

Lys Gly Gln Pro Arg Glu Pro Gln Val Tyr Thr Leu Pro Pro Ser Arg
            260                 265                 270

Glu Glu Met Thr Lys Asn Gln Val Ser Leu Thr Cys Leu Val Lys Gly
            275                 280                 285

Phe Tyr Pro Ser Asp Ile Ala Val Glu Trp Glu Ser Asn Gly Gln Pro
            290                 295                 300

Glu Asn Asn Tyr Lys Thr Thr Pro Pro Val Leu Asp Ser Asp Gly Ser
305                 310                 315                 320

Phe Phe Leu Tyr Ser Lys Leu Thr Val Asp Lys Ser Arg Trp Gln Gln
            325                 330                 335

Gly Asn Val Phe Ser Cys Ser Val Met His Glu Ala Leu His Asn His
            340                 345                 350

Tyr Thr Gln Lys Ser Leu Ser Leu Ser Pro Gly Lys
            355                 360

<210> SEQ ID NO 11
<211> LENGTH: 364
<212> TYPE: PRT
<213> ORGANISM: artificial sequence
<220> FEATURE:
<223> OTHER INFORMATION: Y015 : IL-2.glycan9-GSGS-FcLALA

<400> SEQUENCE: 11

Ala Pro Thr Ser Ser Ser Thr Lys Lys Thr Gln Leu Gln Leu Glu His
 1               5                  10                  15

Leu Leu Leu Asp Leu Gln Met Ile Leu Asn Gly Ile Asn Asn Tyr Lys
             20                  25                  30

Asn Pro Lys Leu Thr Arg Met Leu Asn Phe Ser Phe Tyr Met Pro Lys
         35                  40                  45

Lys Ala Thr Glu Leu Lys His Leu Gln Cys Leu Glu Glu Glu Leu Lys
 50                  55                  60
```

Pro Leu Glu Glu Val Leu Asn Leu Ala Gln Ser Lys Asn Phe His Leu
65                  70                  75                  80

Arg Pro Arg Asp Leu Ile Ser Asn Ile Asn Val Ile Val Leu Glu Leu
                85                  90                  95

Lys Gly Ser Glu Thr Thr Phe Met Cys Glu Tyr Ala Asp Glu Thr Ala
            100                 105                 110

Thr Ile Val Glu Phe Leu Asn Arg Trp Ile Thr Phe Ser Gln Ser Ile
        115                 120                 125

Ile Ser Thr Leu Thr Gly Ser Gly Ser Asp Lys Thr His Thr Cys Pro
    130                 135                 140

Pro Cys Pro Ala Pro Glu Ala Ala Gly Gly Pro Ser Val Phe Leu Phe
145                 150                 155                 160

Pro Pro Lys Pro Lys Asp Thr Leu Met Ile Ser Arg Thr Pro Glu Val
                165                 170                 175

Thr Cys Val Val Val Asp Val Ser His Glu Asp Pro Glu Val Lys Phe
            180                 185                 190

Asn Trp Tyr Val Asp Gly Val Glu Val His Asn Ala Lys Thr Lys Pro
        195                 200                 205

Arg Glu Glu Gln Tyr Asn Ser Thr Tyr Arg Val Val Ser Val Leu Thr
    210                 215                 220

Val Leu His Gln Asp Trp Leu Asn Gly Lys Glu Tyr Lys Cys Lys Val
225                 230                 235                 240

Ser Asn Lys Ala Leu Pro Ala Pro Ile Glu Lys Thr Ile Ser Lys Ala
                245                 250                 255

Lys Gly Gln Pro Arg Glu Pro Gln Val Tyr Thr Leu Pro Pro Ser Arg
            260                 265                 270

Glu Glu Met Thr Lys Asn Gln Val Ser Leu Thr Cys Leu Val Lys Gly
        275                 280                 285

Phe Tyr Pro Ser Asp Ile Ala Val Glu Trp Glu Ser Asn Gly Gln Pro
    290                 295                 300

Glu Asn Asn Tyr Lys Thr Thr Pro Pro Val Leu Asp Ser Asp Gly Ser
305                 310                 315                 320

Phe Phe Leu Tyr Ser Lys Leu Thr Val Asp Lys Ser Arg Trp Gln Gln
                325                 330                 335

Gly Asn Val Phe Ser Cys Ser Val Met His Glu Ala Leu His Asn His
            340                 345                 350

Tyr Thr Gln Lys Ser Leu Ser Leu Ser Pro Gly Lys
        355                 360

<210> SEQ ID NO 12
<211> LENGTH: 360
<212> TYPE: PRT
<213> ORGANISM: artificial sequence
<220> FEATURE:
<223> OTHER INFORMATION: Y017 : IL-2hyb15BCL-GSGS-FcLALA

<400> SEQUENCE: 12

Ala Pro Thr Ser Ser Ser Thr Lys Lys Thr Gln Leu Gln Leu Glu His
1               5                   10                  15

Leu Leu Leu Asp Leu Gln Met Ile Leu Asn Gly Ile Asn Asn Tyr Lys
            20                  25                  30

Asn Pro Lys Leu Thr Arg Met Leu Thr Phe Lys Phe Tyr Met Pro Lys
        35                  40                  45

Lys Ala Thr Glu Leu Lys His Leu Gln Cys Leu Glu Glu Glu Leu Lys
    50                  55                  60

```
Pro Leu Glu Glu Val Leu Asn Leu Ser Gly Asp Ala Ser Ile His Asp
 65                  70                  75                  80

Leu Ile Ser Asn Ile Asn Val Ile Val Leu Glu Leu Lys Gly Ser Glu
             85                  90                  95

Thr Thr Phe Met Cys Glu Tyr Ala Asp Glu Thr Ala Thr Ile Val Glu
        100                 105                 110

Phe Leu Asn Arg Trp Ile Thr Phe Ser Gln Ser Ile Ile Ser Thr Leu
        115                 120                 125

Thr Gly Ser Gly Ser Asp Lys Thr His Thr Cys Pro Pro Cys Pro Ala
    130                 135                 140

Pro Glu Ala Ala Gly Gly Pro Ser Val Phe Leu Phe Pro Pro Lys Pro
145                 150                 155                 160

Lys Asp Thr Leu Met Ile Ser Arg Thr Pro Glu Val Thr Cys Val Val
            165                 170                 175

Val Asp Val Ser His Glu Asp Pro Glu Val Lys Phe Asn Trp Tyr Val
        180                 185                 190

Asp Gly Val Glu Val His Asn Ala Lys Thr Lys Pro Arg Glu Glu Gln
        195                 200                 205

Tyr Asn Ser Thr Tyr Arg Val Val Ser Val Leu Thr Val Leu His Gln
    210                 215                 220

Asp Trp Leu Asn Gly Lys Glu Tyr Lys Cys Lys Val Ser Asn Lys Ala
225                 230                 235                 240

Leu Pro Ala Pro Ile Glu Lys Thr Ile Ser Lys Ala Lys Gly Gln Pro
            245                 250                 255

Arg Glu Pro Gln Val Tyr Thr Leu Pro Pro Ser Arg Glu Glu Met Thr
        260                 265                 270

Lys Asn Gln Val Ser Leu Thr Cys Leu Val Lys Gly Phe Tyr Pro Ser
    275                 280                 285

Asp Ile Ala Val Glu Trp Glu Ser Asn Gly Gln Pro Glu Asn Asn Tyr
        290                 295                 300

Lys Thr Thr Pro Pro Val Leu Asp Ser Asp Gly Ser Phe Phe Leu Tyr
305                 310                 315                 320

Ser Lys Leu Thr Val Asp Lys Ser Arg Trp Gln Gln Gly Asn Val Phe
            325                 330                 335

Ser Cys Ser Val Met His Glu Ala Leu His Asn His Tyr Thr Gln Lys
        340                 345                 350

Ser Leu Ser Leu Ser Pro Gly Lys
    355                 360

<210> SEQ ID NO 13
<211> LENGTH: 370
<212> TYPE: PRT
<213> ORGANISM: artificial sequence
<220> FEATURE:
<223> OTHER INFORMATION: Y038 : IL-2.glycan5-2*(G4S)-FcLALA

<400> SEQUENCE: 13

Ala Pro Thr Ser Ser Ser Thr Lys Lys Thr Gln Leu Gln Leu Glu His
1               5                   10                  15

Leu Leu Leu Asp Leu Gln Met Ile Leu Asn Gly Ile Asn Asn Tyr Lys
            20                  25                  30

Asn Pro Lys Leu Thr Arg Met Leu Thr Phe Asn Phe Thr Met Pro Lys
        35                  40                  45

Lys Ala Thr Glu Leu Lys His Leu Gln Cys Leu Glu Glu Glu Leu Lys
    50                  55                  60
```

Pro Leu Glu Glu Val Leu Asn Leu Ala Gln Ser Lys Asn Phe His Leu
65                  70                  75                  80

Arg Pro Arg Asp Leu Ile Ser Asn Ile Asn Val Ile Val Leu Glu Leu
            85                  90                  95

Lys Gly Ser Glu Thr Thr Phe Met Cys Glu Tyr Ala Asp Glu Thr Ala
            100                 105                 110

Thr Ile Val Glu Phe Leu Asn Arg Trp Ile Thr Phe Ser Gln Ser Ile
            115                 120                 125

Ile Ser Thr Leu Thr Gly Gly Gly Ser Gly Gly Gly Ser Asp
    130                 135                 140

Lys Thr His Thr Cys Pro Pro Cys Pro Ala Pro Glu Ala Ala Gly Gly
145                 150                 155                 160

Pro Ser Val Phe Leu Phe Pro Pro Lys Pro Lys Asp Thr Leu Met Ile
                165                 170                 175

Ser Arg Thr Pro Glu Val Thr Cys Val Val Val Asp Val Ser His Glu
                180                 185                 190

Asp Pro Glu Val Lys Phe Asn Trp Tyr Val Asp Gly Val Glu Val His
            195                 200                 205

Asn Ala Lys Thr Lys Pro Arg Glu Glu Gln Tyr Asn Ser Thr Tyr Arg
210                 215                 220

Val Val Ser Val Leu Thr Val Leu His Gln Asp Trp Leu Asn Gly Lys
225                 230                 235                 240

Glu Tyr Lys Cys Lys Val Ser Asn Lys Ala Leu Pro Ala Pro Ile Glu
                245                 250                 255

Lys Thr Ile Ser Lys Ala Lys Gly Gln Pro Arg Glu Pro Gln Val Tyr
            260                 265                 270

Thr Leu Pro Pro Ser Arg Glu Glu Met Thr Lys Asn Gln Val Ser Leu
            275                 280                 285

Thr Cys Leu Val Lys Gly Phe Tyr Pro Ser Asp Ile Ala Val Glu Trp
            290                 295                 300

Glu Ser Asn Gly Gln Pro Glu Asn Asn Tyr Lys Thr Thr Pro Pro Val
305                 310                 315                 320

Leu Asp Ser Asp Gly Ser Phe Phe Leu Tyr Ser Lys Leu Thr Val Asp
                325                 330                 335

Lys Ser Arg Trp Gln Gln Gly Asn Val Phe Ser Cys Ser Val Met His
            340                 345                 350

Glu Ala Leu His Asn His Tyr Thr Gln Lys Ser Leu Ser Leu Ser Pro
            355                 360                 365

Gly Lys
    370

<210> SEQ ID NO 14
<211> LENGTH: 370
<212> TYPE: PRT
<213> ORGANISM: artificial sequence
<220> FEATURE:
<223> OTHER INFORMATION: Y040 : IL-2.3X-2*(G4S)-FcLALA

<400> SEQUENCE: 14

Ala Pro Thr Ser Ser Ser Thr Lys Lys Thr Gln Leu Gln Leu Glu His
1               5                   10                  15

Leu Leu Leu Asp Leu Gln Met Ile Leu Asn Gly Ile Asn Asn Tyr Lys
            20                  25                  30

Asn Pro Lys Leu Thr Asp Met Leu Thr Phe Glu Phe Tyr Met Pro Lys
        35                  40                  45

Lys Ala Thr Glu Leu Lys His Leu Gln Cys Leu Glu Arg Glu Leu Lys
            50                  55                  60

Pro Leu Glu Glu Val Leu Asn Leu Ala Gln Ser Lys Asn Phe His Leu
 65                  70                  75                  80

Arg Pro Arg Asp Leu Ile Ser Asn Ile Asn Val Ile Val Leu Glu Leu
                85                  90                  95

Lys Gly Ser Glu Thr Thr Phe Met Cys Glu Tyr Ala Asp Glu Thr Ala
            100                 105                 110

Thr Ile Val Glu Phe Leu Asn Arg Trp Ile Thr Phe Ser Gln Ser Ile
                115                 120                 125

Ile Ser Thr Leu Thr Gly Gly Gly Ser Gly Gly Gly Ser Asp
130                 135                 140

Lys Thr His Thr Cys Pro Pro Cys Pro Ala Pro Glu Ala Ala Gly Gly
145                 150                 155                 160

Pro Ser Val Phe Leu Phe Pro Pro Lys Pro Lys Asp Thr Leu Met Ile
                165                 170                 175

Ser Arg Thr Pro Glu Val Thr Cys Val Val Val Asp Val Ser His Glu
                180                 185                 190

Asp Pro Glu Val Lys Phe Asn Trp Tyr Val Asp Gly Val Glu Val His
                195                 200                 205

Asn Ala Lys Thr Lys Pro Arg Glu Glu Gln Tyr Asn Ser Thr Tyr Arg
210                 215                 220

Val Val Ser Val Leu Thr Val Leu His Gln Asp Trp Leu Asn Gly Lys
225                 230                 235                 240

Glu Tyr Lys Cys Lys Val Ser Asn Lys Ala Leu Pro Ala Pro Ile Glu
                245                 250                 255

Lys Thr Ile Ser Lys Ala Lys Gly Gln Pro Arg Glu Pro Gln Val Tyr
                260                 265                 270

Thr Leu Pro Pro Ser Arg Glu Glu Met Thr Lys Asn Gln Val Ser Leu
                275                 280                 285

Thr Cys Leu Val Lys Gly Phe Tyr Pro Ser Asp Ile Ala Val Glu Trp
                290                 295                 300

Glu Ser Asn Gly Gln Pro Glu Asn Asn Tyr Lys Thr Thr Pro Pro Val
305                 310                 315                 320

Leu Asp Ser Asp Gly Ser Phe Phe Leu Tyr Ser Lys Leu Thr Val Asp
                325                 330                 335

Lys Ser Arg Trp Gln Gln Gly Asn Val Phe Ser Cys Ser Val Met His
                340                 345                 350

Glu Ala Leu His Asn His Tyr Thr Gln Lys Ser Leu Ser Leu Ser Pro
                355                 360                 365

Gly Lys
    370

<210> SEQ ID NO 15
<211> LENGTH: 370
<212> TYPE: PRT
<213> ORGANISM: artificial sequence
<220> FEATURE:
<223> OTHER INFORMATION: Y045 : IL-2WT-2*(G4S)-FcLALA

<400> SEQUENCE: 15

Ala Pro Thr Ser Ser Ser Thr Lys Lys Thr Gln Leu Gln Leu Glu His
 1               5                  10                  15

Leu Leu Leu Asp Leu Gln Met Ile Leu Asn Gly Ile Asn Asn Tyr Lys
                20                  25                  30

```
Asn Pro Lys Leu Thr Arg Met Leu Thr Phe Lys Phe Tyr Met Pro Lys
             35                  40                  45

Lys Ala Thr Glu Leu Lys His Leu Gln Cys Leu Glu Glu Glu Leu Lys
 50                  55                  60

Pro Leu Glu Glu Val Leu Asn Leu Ala Gln Ser Lys Asn Phe His Leu
 65                  70                  75                  80

Arg Pro Arg Asp Leu Ile Ser Asn Ile Asn Val Ile Val Leu Glu Leu
                 85                  90                  95

Lys Gly Ser Glu Thr Thr Phe Met Cys Glu Tyr Ala Asp Glu Thr Ala
            100                 105                 110

Thr Ile Val Glu Phe Leu Asn Arg Trp Ile Thr Phe Ser Gln Ser Ile
            115                 120                 125

Ile Ser Thr Leu Thr Gly Gly Gly Ser Gly Gly Gly Gly Ser Asp
130                 135                 140

Lys Thr His Thr Cys Pro Pro Cys Pro Ala Pro Glu Ala Ala Gly Gly
145                 150                 155                 160

Pro Ser Val Phe Leu Phe Pro Pro Lys Pro Lys Asp Thr Leu Met Ile
                165                 170                 175

Ser Arg Thr Pro Glu Val Thr Cys Val Val Val Asp Val Ser His Glu
            180                 185                 190

Asp Pro Glu Val Lys Phe Asn Trp Tyr Val Asp Gly Val Glu Val His
            195                 200                 205

Asn Ala Lys Thr Lys Pro Arg Glu Glu Gln Tyr Asn Ser Thr Tyr Arg
210                 215                 220

Val Val Ser Val Leu Thr Val Leu His Gln Asp Trp Leu Asn Gly Lys
225                 230                 235                 240

Glu Tyr Lys Cys Lys Val Ser Asn Lys Ala Leu Pro Ala Pro Ile Glu
                245                 250                 255

Lys Thr Ile Ser Lys Ala Lys Gly Gln Pro Arg Glu Pro Gln Val Tyr
            260                 265                 270

Thr Leu Pro Pro Ser Arg Glu Glu Met Thr Lys Asn Gln Val Ser Leu
            275                 280                 285

Thr Cys Leu Val Lys Gly Phe Tyr Pro Ser Asp Ile Ala Val Glu Trp
290                 295                 300

Glu Ser Asn Gly Gln Pro Glu Asn Asn Tyr Lys Thr Thr Pro Pro Val
305                 310                 315                 320

Leu Asp Ser Asp Gly Ser Phe Phe Leu Tyr Ser Lys Leu Thr Val Asp
                325                 330                 335

Lys Ser Arg Trp Gln Gln Gly Asn Val Phe Ser Cys Ser Val Met His
            340                 345                 350

Glu Ala Leu His Asn His Tyr Thr Gln Lys Ser Leu Ser Leu Ser Pro
            355                 360                 365

Gly Lys
370

<210> SEQ ID NO 16
<211> LENGTH: 364
<212> TYPE: PRT
<213> ORGANISM: artificial sequence
<220> FEATURE:
<223> OTHER INFORMATION: Y048 : IL-2 glycan5 glycan8 -GSGS-FcLALA

<400> SEQUENCE: 16

Ala Pro Thr Ser Ser Ser Thr Lys Lys Thr Gln Leu Gln Leu Glu His
 1               5                  10                  15
```

```
Leu Leu Leu Asp Leu Gln Met Ile Leu Asn Gly Ile Asn Asn Tyr Lys
             20                  25                  30

Asn Pro Lys Leu Thr Arg Met Leu Thr Phe Asn Phe Thr Met Pro Lys
         35                  40                  45

Lys Ala Thr Glu Leu Lys His Leu Gln Cys Leu Glu Glu Glu Leu Lys
 50                  55                  60

Pro Leu Glu Glu Val Leu Asn Leu Ala Asn Ser Thr Asn Phe His Leu
 65                  70                  75                  80

Arg Pro Arg Asp Leu Ile Ser Asn Ile Asn Val Ile Val Leu Glu Leu
                 85                  90                  95

Lys Gly Ser Glu Thr Thr Phe Met Cys Glu Tyr Ala Asp Glu Thr Ala
            100                 105                 110

Thr Ile Val Glu Phe Leu Asn Arg Trp Ile Thr Phe Ser Gln Ser Ile
        115                 120                 125

Ile Ser Thr Leu Thr Gly Ser Gly Ser Asp Lys Thr His Thr Cys Pro
    130                 135                 140

Pro Cys Pro Ala Pro Glu Ala Ala Gly Gly Pro Ser Val Phe Leu Phe
145                 150                 155                 160

Pro Pro Lys Pro Lys Asp Thr Leu Met Ile Ser Arg Thr Pro Glu Val
                165                 170                 175

Thr Cys Val Val Val Asp Val Ser His Glu Asp Pro Glu Val Lys Phe
            180                 185                 190

Asn Trp Tyr Val Asp Gly Val Glu Val His Asn Ala Lys Thr Lys Pro
        195                 200                 205

Arg Glu Glu Gln Tyr Asn Ser Thr Tyr Arg Val Val Ser Val Leu Thr
    210                 215                 220

Val Leu His Gln Asp Trp Leu Asn Gly Lys Glu Tyr Lys Cys Lys Val
225                 230                 235                 240

Ser Asn Lys Ala Leu Pro Ala Pro Ile Glu Lys Thr Ile Ser Lys Ala
                245                 250                 255

Lys Gly Gln Pro Arg Glu Pro Gln Val Tyr Thr Leu Pro Pro Ser Arg
            260                 265                 270

Glu Glu Met Thr Lys Asn Gln Val Ser Leu Thr Cys Leu Val Lys Gly
        275                 280                 285

Phe Tyr Pro Ser Asp Ile Ala Val Glu Trp Glu Ser Asn Gly Gln Pro
    290                 295                 300

Glu Asn Asn Tyr Lys Thr Thr Pro Pro Val Leu Asp Ser Asp Gly Ser
305                 310                 315                 320

Phe Phe Leu Tyr Ser Lys Leu Thr Val Asp Lys Ser Arg Trp Gln Gln
                325                 330                 335

Gly Asn Val Phe Ser Cys Ser Val Met His Glu Ala Leu His Asn His
            340                 345                 350

Tyr Thr Gln Lys Ser Leu Ser Leu Ser Pro Gly Lys
        355                 360
```

<210> SEQ ID NO 17
<211> LENGTH: 364
<212> TYPE: PRT
<213> ORGANISM: artificial sequence
<220> FEATURE:
<223> OTHER INFORMATION: Y049 : IL-2 glycan5 glycan1-GSGS-FcLALA

<400> SEQUENCE: 17

```
Ala Pro Thr Ser Ser Ser Thr Lys Lys Thr Gln Leu Gln Leu Glu His
1               5                   10                  15
```

```
Leu Leu Leu Asp Leu Gln Met Ile Leu Asn Gly Ile Asn Asn Tyr Lys
             20                  25                  30

Asn Pro Asn Leu Thr Arg Met Leu Thr Phe Asn Phe Thr Met Pro Lys
         35                  40                  45

Lys Ala Thr Glu Leu Lys His Leu Gln Cys Leu Glu Glu Glu Leu Lys
 50                  55                  60

Pro Leu Glu Glu Val Leu Asn Leu Ala Gln Ser Lys Asn Phe His Leu
 65                  70                  75                  80

Arg Pro Arg Asp Leu Ile Ser Asn Ile Asn Val Ile Val Leu Glu Leu
                 85                  90                  95

Lys Gly Ser Glu Thr Thr Phe Met Cys Glu Tyr Ala Asp Glu Thr Ala
            100                 105                 110

Thr Ile Val Glu Phe Leu Asn Arg Trp Ile Thr Phe Ser Gln Ser Ile
        115                 120                 125

Ile Ser Thr Leu Thr Gly Ser Gly Ser Asp Lys Thr His Thr Cys Pro
    130                 135                 140

Pro Cys Pro Ala Pro Glu Ala Ala Gly Gly Pro Ser Val Phe Leu Phe
145                 150                 155                 160

Pro Pro Lys Pro Lys Asp Thr Leu Met Ile Ser Arg Thr Pro Glu Val
                165                 170                 175

Thr Cys Val Val Val Asp Val Ser His Glu Asp Pro Glu Val Lys Phe
            180                 185                 190

Asn Trp Tyr Val Asp Gly Val Glu Val His Asn Ala Lys Thr Lys Pro
        195                 200                 205

Arg Glu Glu Gln Tyr Asn Ser Thr Tyr Arg Val Val Ser Val Leu Thr
    210                 215                 220

Val Leu His Gln Asp Trp Leu Asn Gly Lys Glu Tyr Lys Cys Lys Val
225                 230                 235                 240

Ser Asn Lys Ala Leu Pro Ala Pro Ile Glu Lys Thr Ile Ser Lys Ala
                245                 250                 255

Lys Gly Gln Pro Arg Glu Pro Gln Val Tyr Thr Leu Pro Pro Ser Arg
            260                 265                 270

Glu Glu Met Thr Lys Asn Gln Val Ser Leu Thr Cys Leu Val Lys Gly
        275                 280                 285

Phe Tyr Pro Ser Asp Ile Ala Val Glu Trp Glu Ser Asn Gly Gln Pro
    290                 295                 300

Glu Asn Asn Tyr Lys Thr Thr Pro Pro Val Leu Asp Ser Asp Gly Ser
305                 310                 315                 320

Phe Phe Leu Tyr Ser Lys Leu Thr Val Asp Lys Ser Arg Trp Gln Gln
                325                 330                 335

Gly Asn Val Phe Ser Cys Ser Val Met His Glu Ala Leu His Asn His
            340                 345                 350

Tyr Thr Gln Lys Ser Leu Ser Leu Ser Pro Gly Lys
        355                 360

<210> SEQ ID NO 18
<211> LENGTH: 364
<212> TYPE: PRT
<213> ORGANISM: artificial sequence
<220> FEATURE:
<223> OTHER INFORMATION: Y050 : IL-2 glycan5.K35Q -GSGS-FcLALA

<400> SEQUENCE: 18

Ala Pro Thr Ser Ser Ser Thr Lys Lys Thr Gln Leu Gln Leu Glu His
1               5                   10                  15
```

```
Leu Leu Leu Asp Leu Gln Met Ile Leu Asn Gly Ile Asn Asn Tyr Lys
            20                  25                  30

Asn Pro Gln Leu Thr Arg Met Leu Thr Phe Asn Phe Thr Met Pro Lys
        35                  40                  45

Lys Ala Thr Glu Leu Lys His Leu Gln Cys Leu Glu Glu Glu Leu Lys
    50                  55                  60

Pro Leu Glu Glu Val Leu Asn Leu Ala Gln Ser Lys Asn Phe His Leu
65                  70                  75                  80

Arg Pro Arg Asp Leu Ile Ser Asn Ile Asn Val Ile Val Leu Glu Leu
                85                  90                  95

Lys Gly Ser Glu Thr Thr Phe Met Cys Glu Tyr Ala Asp Glu Thr Ala
            100                 105                 110

Thr Ile Val Glu Phe Leu Asn Arg Trp Ile Thr Phe Ser Gln Ser Ile
        115                 120                 125

Ile Ser Thr Leu Thr Gly Ser Gly Ser Asp Lys Thr His Thr Cys Pro
    130                 135                 140

Pro Cys Pro Ala Pro Glu Ala Ala Gly Gly Pro Ser Val Phe Leu Phe
145                 150                 155                 160

Pro Pro Lys Pro Lys Asp Thr Leu Met Ile Ser Arg Thr Pro Glu Val
                165                 170                 175

Thr Cys Val Val Val Asp Val Ser His Glu Asp Pro Glu Val Lys Phe
            180                 185                 190

Asn Trp Tyr Val Asp Gly Val Glu Val His Asn Ala Lys Thr Lys Pro
        195                 200                 205

Arg Glu Glu Gln Tyr Asn Ser Thr Tyr Arg Val Val Ser Val Leu Thr
    210                 215                 220

Val Leu His Gln Asp Trp Leu Asn Gly Lys Glu Tyr Lys Cys Lys Val
225                 230                 235                 240

Ser Asn Lys Ala Leu Pro Ala Pro Ile Glu Lys Thr Ile Ser Lys Ala
                245                 250                 255

Lys Gly Gln Pro Arg Glu Pro Gln Val Tyr Thr Leu Pro Pro Ser Arg
            260                 265                 270

Glu Glu Met Thr Lys Asn Gln Val Ser Leu Thr Cys Leu Val Lys Gly
        275                 280                 285

Phe Tyr Pro Ser Asp Ile Ala Val Glu Trp Glu Ser Asn Gly Gln Pro
    290                 295                 300

Glu Asn Asn Tyr Lys Thr Thr Pro Pro Val Leu Asp Ser Asp Gly Ser
305                 310                 315                 320

Phe Phe Leu Tyr Ser Lys Leu Thr Val Asp Lys Ser Arg Trp Gln Gln
                325                 330                 335

Gly Asn Val Phe Ser Cys Ser Val Met His Glu Ala Leu His Asn His
            340                 345                 350

Tyr Thr Gln Lys Ser Leu Ser Leu Ser Pro Gly Lys
        355                 360

<210> SEQ ID NO 19
<211> LENGTH: 366
<212> TYPE: PRT
<213> ORGANISM: artificial sequence
<220> FEATURE:
<223> OTHER INFORMATION: Y056 : IL-2.glycan5.15BCL-2*(G4S)-FcLALA

<400> SEQUENCE: 19

Ala Pro Thr Ser Ser Ser Thr Lys Lys Thr Gln Leu Gln Leu Glu His
1               5                   10                  15
```

```
Leu Leu Leu Asp Leu Gln Met Ile Leu Asn Gly Ile Asn Asn Tyr Lys
            20                  25                  30

Asn Pro Lys Leu Thr Arg Met Leu Thr Phe Asn Phe Thr Met Pro Lys
        35                  40                  45

Lys Ala Thr Glu Leu Lys His Leu Gln Cys Leu Glu Glu Glu Leu Lys
 50                  55                  60

Pro Leu Glu Glu Val Leu Asn Leu Ser Gly Asp Ala Ser Ile His Asp
 65                  70                  75                  80

Leu Ile Ser Asn Ile Asn Val Ile Val Leu Glu Leu Lys Gly Ser Glu
                85                  90                  95

Thr Thr Phe Met Cys Glu Tyr Ala Asp Glu Thr Ala Thr Ile Val Glu
            100                 105                 110

Phe Leu Asn Arg Trp Ile Thr Phe Ser Gln Ser Ile Ile Ser Thr Leu
            115                 120                 125

Thr Gly Gly Gly Gly Ser Gly Gly Gly Ser Asp Lys Thr His Thr
            130                 135                 140

Cys Pro Pro Cys Pro Ala Pro Glu Ala Ala Gly Gly Pro Ser Val Phe
145                 150                 155                 160

Leu Phe Pro Pro Lys Pro Lys Asp Thr Leu Met Ile Ser Arg Thr Pro
                165                 170                 175

Glu Val Thr Cys Val Val Val Asp Val Ser His Glu Asp Pro Glu Val
            180                 185                 190

Lys Phe Asn Trp Tyr Val Asp Gly Val Glu Val His Asn Ala Lys Thr
            195                 200                 205

Lys Pro Arg Glu Glu Gln Tyr Asn Ser Thr Tyr Arg Val Val Ser Val
210                 215                 220

Leu Thr Val Leu His Gln Asp Trp Leu Asn Gly Lys Glu Tyr Lys Cys
225                 230                 235                 240

Lys Val Ser Asn Lys Ala Leu Pro Ala Pro Ile Glu Lys Thr Ile Ser
                245                 250                 255

Lys Ala Lys Gly Gln Pro Arg Glu Pro Gln Val Tyr Thr Leu Pro Pro
            260                 265                 270

Ser Arg Glu Glu Met Thr Lys Asn Gln Val Ser Leu Thr Cys Leu Val
            275                 280                 285

Lys Gly Phe Tyr Pro Ser Asp Ile Ala Val Glu Trp Glu Ser Asn Gly
290                 295                 300

Gln Pro Glu Asn Asn Tyr Lys Thr Thr Pro Pro Val Leu Asp Ser Asp
305                 310                 315                 320

Gly Ser Phe Phe Leu Tyr Ser Lys Leu Thr Val Asp Lys Ser Arg Trp
                325                 330                 335

Gln Gln Gly Asn Val Phe Ser Cys Ser Val Met His Glu Ala Leu His
            340                 345                 350

Asn His Tyr Thr Gln Lys Ser Leu Ser Leu Ser Pro Gly Lys
            355                 360                 365

<210> SEQ ID NO 20
<211> LENGTH: 360
<212> TYPE: PRT
<213> ORGANISM: artificial sequence
<220> FEATURE:
<223> OTHER INFORMATION: Y057 : IL-2truncate1-GSGS-FcLALA

<400> SEQUENCE: 20

Ala Pro Thr Ser Ser Ser Thr Lys Lys Thr Gln Leu Gln Leu Glu His
1               5                   10                  15
```

Leu Leu Leu Asp Leu Gln Met Ile Leu Asn Gly Ile Asn Asn Tyr Lys
            20                  25                  30

Asn Pro Lys Leu Thr Arg Met Leu Thr Phe Lys Phe Tyr Met Pro Lys
        35                  40                  45

Lys Ala Thr Glu Leu Lys His Leu Gln Cys Leu Glu Glu Glu Leu Lys
 50                  55                  60

Pro Leu Glu Glu Val Leu Asn Leu Ala Gln Ser Lys Asn Phe His Asp
 65                  70                  75                  80

Leu Ile Ser Asn Ile Asn Val Ile Val Leu Glu Leu Lys Gly Ser Glu
                 85                  90                  95

Thr Thr Phe Met Cys Glu Tyr Ala Asp Glu Thr Ala Thr Ile Val Glu
            100                 105                 110

Phe Leu Asn Arg Trp Ile Thr Phe Ser Gln Ser Ile Ile Ser Thr Leu
        115                 120                 125

Thr Gly Ser Gly Ser Asp Lys Thr His Thr Cys Pro Pro Cys Pro Ala
130                 135                 140

Pro Glu Ala Ala Gly Gly Pro Ser Val Phe Leu Phe Pro Pro Lys Pro
145                 150                 155                 160

Lys Asp Thr Leu Met Ile Ser Arg Thr Pro Glu Val Thr Cys Val Val
                165                 170                 175

Val Asp Val Ser His Glu Asp Pro Glu Val Lys Phe Asn Trp Tyr Val
            180                 185                 190

Asp Gly Val Glu Val His Asn Ala Lys Thr Lys Pro Arg Glu Glu Gln
        195                 200                 205

Tyr Asn Ser Thr Tyr Arg Val Val Ser Val Leu Thr Val Leu His Gln
210                 215                 220

Asp Trp Leu Asn Gly Lys Glu Tyr Lys Cys Lys Val Ser Asn Lys Ala
225                 230                 235                 240

Leu Pro Ala Pro Ile Glu Lys Thr Ile Ser Lys Ala Lys Gly Gln Pro
                245                 250                 255

Arg Glu Pro Gln Val Tyr Thr Leu Pro Pro Ser Arg Glu Glu Met Thr
            260                 265                 270

Lys Asn Gln Val Ser Leu Thr Cys Leu Val Lys Gly Phe Tyr Pro Ser
        275                 280                 285

Asp Ile Ala Val Glu Trp Glu Ser Asn Gly Gln Pro Glu Asn Asn Tyr
290                 295                 300

Lys Thr Thr Pro Pro Val Leu Asp Ser Asp Gly Ser Phe Phe Leu Tyr
305                 310                 315                 320

Ser Lys Leu Thr Val Asp Lys Ser Arg Trp Gln Gln Gly Asn Val Phe
                325                 330                 335

Ser Cys Ser Val Met His Glu Ala Leu His Asn His Tyr Thr Gln Lys
            340                 345                 350

Ser Leu Ser Leu Ser Pro Gly Lys
        355                 360

<210> SEQ ID NO 21
<211> LENGTH: 360
<212> TYPE: PRT
<213> ORGANISM: artificial sequence
<220> FEATURE:
<223> OTHER INFORMATION: Y058 : IL-2truncate2-GSGS-FcLALA

<400> SEQUENCE: 21

Ala Pro Thr Ser Ser Ser Thr Lys Lys Thr Gln Leu Gln Leu Glu His
1               5                   10                  15

```
Leu Leu Leu Asp Leu Gln Met Ile Leu Asn Gly Ile Asn Asn Tyr Lys
            20                  25                  30

Asn Pro Lys Leu Thr Arg Met Leu Thr Phe Lys Phe Tyr Met Pro Lys
        35                  40                  45

Lys Ala Thr Glu Leu Lys His Leu Gln Cys Leu Glu Glu Glu Leu Lys
    50                  55                  60

Pro Leu Glu Glu Val Leu Asn Leu Ala Gly Ser Lys Asn Phe His Asp
65                  70                  75                  80

Leu Ile Ser Asn Ile Asn Val Ile Val Leu Glu Leu Lys Gly Ser Glu
                85                  90                  95

Thr Thr Phe Met Cys Glu Tyr Ala Asp Glu Thr Ala Thr Ile Val Glu
                100                 105                 110

Phe Leu Asn Arg Trp Ile Thr Phe Ser Gln Ser Ile Ile Ser Thr Leu
            115                 120                 125

Thr Gly Ser Gly Ser Asp Lys Thr His Thr Cys Pro Pro Cys Pro Ala
        130                 135                 140

Pro Glu Ala Ala Gly Gly Pro Ser Val Phe Leu Phe Pro Pro Lys Pro
145                 150                 155                 160

Lys Asp Thr Leu Met Ile Ser Arg Thr Pro Glu Val Thr Cys Val Val
                165                 170                 175

Val Asp Val Ser His Glu Asp Pro Glu Val Lys Phe Asn Trp Tyr Val
                180                 185                 190

Asp Gly Val Glu Val His Asn Ala Lys Thr Lys Pro Arg Glu Glu Gln
            195                 200                 205

Tyr Asn Ser Thr Tyr Arg Val Val Ser Val Leu Thr Val Leu His Gln
        210                 215                 220

Asp Trp Leu Asn Gly Lys Glu Tyr Lys Cys Lys Val Ser Asn Lys Ala
225                 230                 235                 240

Leu Pro Ala Pro Ile Glu Lys Thr Ile Ser Lys Ala Lys Gly Gln Pro
                245                 250                 255

Arg Glu Pro Gln Val Tyr Thr Leu Pro Pro Ser Arg Glu Glu Met Thr
                260                 265                 270

Lys Asn Gln Val Ser Leu Thr Cys Leu Val Lys Gly Phe Tyr Pro Ser
            275                 280                 285

Asp Ile Ala Val Glu Trp Glu Ser Asn Gly Gln Pro Glu Asn Asn Tyr
        290                 295                 300

Lys Thr Thr Pro Pro Val Leu Asp Ser Asp Gly Ser Phe Phe Leu Tyr
305                 310                 315                 320

Ser Lys Leu Thr Val Asp Lys Ser Arg Trp Gln Gln Gly Asn Val Phe
                325                 330                 335

Ser Cys Ser Val Met His Glu Ala Leu His Asn His Tyr Thr Gln Lys
                340                 345                 350

Ser Leu Ser Leu Ser Pro Gly Lys
        355                 360

<210> SEQ ID NO 22
<211> LENGTH: 360
<212> TYPE: PRT
<213> ORGANISM: artificial sequence
<220> FEATURE:
<223> OTHER INFORMATION: Y059 : IL-2 truncate3-GSGS-FcLALA

<400> SEQUENCE: 22

Ala Pro Thr Ser Ser Ser Thr Lys Lys Thr Gln Leu Gln Leu Glu His
1               5                   10                  15
```

```
Leu Leu Leu Asp Leu Gln Met Ile Leu Asn Gly Ile Asn Asn Tyr Lys
            20                  25                  30

Asn Pro Lys Leu Thr Arg Met Leu Thr Phe Lys Phe Tyr Met Pro Lys
        35                  40                  45

Lys Ala Thr Glu Leu Lys His Leu Gln Cys Leu Glu Glu Glu Leu Lys
50                  55                  60

Pro Leu Glu Glu Val Leu Asn Leu Ala Gln Ser Ala Asn Phe His Asp
65                  70                  75                  80

Leu Ile Ser Asn Ile Asn Val Ile Val Leu Glu Leu Lys Gly Ser Glu
                85                  90                  95

Thr Thr Phe Met Cys Glu Tyr Ala Asp Glu Thr Ala Thr Ile Val Glu
            100                 105                 110

Phe Leu Asn Arg Trp Ile Thr Phe Ser Gln Ser Ile Ile Ser Thr Leu
        115                 120                 125

Thr Gly Ser Gly Ser Asp Lys Thr His Thr Cys Pro Pro Cys Pro Ala
130                 135                 140

Pro Glu Ala Ala Gly Gly Pro Ser Val Phe Leu Phe Pro Pro Lys Pro
145                 150                 155                 160

Lys Asp Thr Leu Met Ile Ser Arg Thr Pro Glu Val Thr Cys Val Val
                165                 170                 175

Val Asp Val Ser His Glu Asp Pro Glu Val Lys Phe Asn Trp Tyr Val
            180                 185                 190

Asp Gly Val Glu Val His Asn Ala Lys Thr Lys Pro Arg Glu Glu Gln
        195                 200                 205

Tyr Asn Ser Thr Tyr Arg Val Val Ser Val Leu Thr Val Leu His Gln
210                 215                 220

Asp Trp Leu Asn Gly Lys Glu Tyr Lys Cys Lys Val Ser Asn Lys Ala
225                 230                 235                 240

Leu Pro Ala Pro Ile Glu Lys Thr Ile Ser Lys Ala Lys Gly Gln Pro
                245                 250                 255

Arg Glu Pro Gln Val Tyr Thr Leu Pro Pro Ser Arg Glu Glu Met Thr
            260                 265                 270

Lys Asn Gln Val Ser Leu Thr Cys Leu Val Lys Gly Phe Tyr Pro Ser
        275                 280                 285

Asp Ile Ala Val Glu Trp Glu Ser Asn Gly Gln Pro Glu Asn Asn Tyr
290                 295                 300

Lys Thr Thr Pro Pro Val Leu Asp Ser Asp Gly Ser Phe Phe Leu Tyr
305                 310                 315                 320

Ser Lys Leu Thr Val Asp Lys Ser Arg Trp Gln Gln Gly Asn Val Phe
                325                 330                 335

Ser Cys Ser Val Met His Glu Ala Leu His Asn His Tyr Thr Gln Lys
            340                 345                 350

Ser Leu Ser Leu Ser Pro Gly Lys
        355                 360

<210> SEQ ID NO 23
<211> LENGTH: 360
<212> TYPE: PRT
<213> ORGANISM: artificial sequence
<220> FEATURE:
<223> OTHER INFORMATION: Y060 : IL-2 truncate4-GSGS-FcLALA

<400> SEQUENCE: 23

Ala Pro Thr Ser Ser Ser Thr Lys Lys Thr Gln Leu Gln Leu Glu His
1               5                   10                  15
```

Leu Leu Leu Asp Leu Gln Met Ile Leu Asn Gly Ile Asn Asn Tyr Lys
                20                  25                  30

Asn Pro Lys Leu Thr Arg Met Leu Thr Phe Lys Phe Tyr Met Pro Lys
            35                  40                  45

Lys Ala Thr Glu Leu Lys His Leu Gln Cys Leu Glu Glu Glu Leu Lys
        50                  55                  60

Pro Leu Glu Glu Val Leu Asn Leu Ala Gln Ser Ala Asn Ile His Asp
65                  70                  75                  80

Leu Ile Ser Asn Ile Asn Val Ile Val Leu Glu Leu Lys Gly Ser Glu
                85                  90                  95

Thr Thr Phe Met Cys Glu Tyr Ala Asp Glu Thr Ala Thr Ile Val Glu
            100                 105                 110

Phe Leu Asn Arg Trp Ile Thr Phe Ser Gln Ser Ile Ile Ser Thr Leu
        115                 120                 125

Thr Gly Ser Gly Ser Asp Lys Thr His Thr Cys Pro Pro Cys Pro Ala
130                 135                 140

Pro Glu Ala Ala Gly Gly Pro Ser Val Phe Leu Phe Pro Pro Lys Pro
145                 150                 155                 160

Lys Asp Thr Leu Met Ile Ser Arg Thr Pro Glu Val Thr Cys Val Val
                165                 170                 175

Val Asp Val Ser His Glu Asp Pro Glu Val Lys Phe Asn Trp Tyr Val
            180                 185                 190

Asp Gly Val Glu Val His Asn Ala Lys Thr Lys Pro Arg Glu Glu Gln
        195                 200                 205

Tyr Asn Ser Thr Tyr Arg Val Val Ser Val Leu Thr Val Leu His Gln
210                 215                 220

Asp Trp Leu Asn Gly Lys Glu Tyr Lys Cys Lys Val Ser Asn Lys Ala
225                 230                 235                 240

Leu Pro Ala Pro Ile Glu Lys Thr Ile Ser Lys Ala Lys Gly Gln Pro
                245                 250                 255

Arg Glu Pro Gln Val Tyr Thr Leu Pro Pro Ser Arg Glu Glu Met Thr
            260                 265                 270

Lys Asn Gln Val Ser Leu Thr Cys Leu Val Lys Gly Phe Tyr Pro Ser
        275                 280                 285

Asp Ile Ala Val Glu Trp Glu Ser Asn Gly Gln Pro Glu Asn Asn Tyr
290                 295                 300

Lys Thr Thr Pro Pro Val Leu Asp Ser Asp Gly Ser Phe Phe Leu Tyr
305                 310                 315                 320

Ser Lys Leu Thr Val Asp Lys Ser Arg Trp Gln Gln Gly Asn Val Phe
                325                 330                 335

Ser Cys Ser Val Met His Glu Ala Leu His Asn His Tyr Thr Gln Lys
            340                 345                 350

Ser Leu Ser Leu Ser Pro Gly Lys
        355                 360

<210> SEQ ID NO 24
<211> LENGTH: 366
<212> TYPE: PRT
<213> ORGANISM: artificial sequence
<220> FEATURE:
<223> OTHER INFORMATION: Y081 : IL-2.glycan5.truncate1-2*(G4S)-FcLALA

<400> SEQUENCE: 24

Ala Pro Thr Ser Ser Ser Thr Lys Lys Thr Gln Leu Gln Leu Glu His
1               5                   10                  15

-continued

Leu Leu Leu Asp Leu Gln Met Ile Leu Asn Gly Ile Asn Asn Tyr Lys
            20                  25                  30

Asn Pro Lys Leu Thr Arg Met Leu Thr Phe Asn Phe Thr Met Pro Lys
            35                  40                  45

Lys Ala Thr Glu Leu Lys His Leu Gln Cys Leu Glu Glu Glu Leu Lys
 50                  55                  60

Pro Leu Glu Glu Val Leu Asn Leu Ala Gln Ser Lys Asn Phe His Asp
 65                  70                  75                  80

Leu Ile Ser Asn Ile Asn Val Ile Val Leu Glu Leu Lys Gly Ser Glu
                85                  90                  95

Thr Thr Phe Met Cys Glu Tyr Ala Asp Glu Thr Ala Thr Ile Val Glu
            100                 105                 110

Phe Leu Asn Arg Trp Ile Thr Phe Ser Gln Ser Ile Ile Ser Thr Leu
        115                 120                 125

Thr Gly Gly Gly Gly Ser Gly Gly Gly Ser Asp Lys Thr His Thr
    130                 135                 140

Cys Pro Pro Cys Pro Ala Pro Glu Ala Ala Gly Gly Pro Ser Val Phe
145                 150                 155                 160

Leu Phe Pro Pro Lys Pro Lys Asp Thr Leu Met Ile Ser Arg Thr Pro
                165                 170                 175

Glu Val Thr Cys Val Val Val Asp Val Ser His Glu Asp Pro Glu Val
            180                 185                 190

Lys Phe Asn Trp Tyr Val Asp Gly Val Glu Val His Asn Ala Lys Thr
        195                 200                 205

Lys Pro Arg Glu Glu Gln Tyr Asn Ser Thr Tyr Arg Val Val Ser Val
    210                 215                 220

Leu Thr Val Leu His Gln Asp Trp Leu Asn Gly Lys Glu Tyr Lys Cys
225                 230                 235                 240

Lys Val Ser Asn Lys Ala Leu Pro Ala Pro Ile Glu Lys Thr Ile Ser
                245                 250                 255

Lys Ala Lys Gly Gln Pro Arg Glu Pro Gln Val Tyr Thr Leu Pro Pro
            260                 265                 270

Ser Arg Glu Glu Met Thr Lys Asn Gln Val Ser Leu Thr Cys Leu Val
        275                 280                 285

Lys Gly Phe Tyr Pro Ser Asp Ile Ala Val Glu Trp Glu Ser Asn Gly
    290                 295                 300

Gln Pro Glu Asn Asn Tyr Lys Thr Thr Pro Pro Val Leu Asp Ser Asp
305                 310                 315                 320

Gly Ser Phe Phe Leu Tyr Ser Lys Leu Thr Val Asp Lys Ser Arg Trp
                325                 330                 335

Gln Gln Gly Asn Val Phe Ser Cys Ser Val Met His Glu Ala Leu His
            340                 345                 350

Asn His Tyr Thr Gln Lys Ser Leu Ser Leu Ser Pro Gly Lys
        355                 360                 365

<210> SEQ ID NO 25
<211> LENGTH: 366
<212> TYPE: PRT
<213> ORGANISM: artificial sequence
<220> FEATURE:
<223> OTHER INFORMATION: Y082 : IL-2.glycan5.truncate2-2*(G4S)-FcLALA

<400> SEQUENCE: 25

Ala Pro Thr Ser Ser Ser Thr Lys Lys Thr Gln Leu Gln Leu Glu His
1               5                   10                  15

```
Leu Leu Leu Asp Leu Gln Met Ile Leu Asn Gly Ile Asn Asn Tyr Lys
            20                  25                  30

Asn Pro Lys Leu Thr Arg Met Leu Thr Phe Asn Phe Thr Met Pro Lys
         35                  40                  45

Lys Ala Thr Glu Leu Lys His Leu Gln Cys Leu Glu Glu Glu Leu Lys
 50                  55                  60

Pro Leu Glu Glu Val Leu Asn Leu Ala Gly Ser Lys Asn Phe His Asp
 65                  70                  75                  80

Leu Ile Ser Asn Ile Asn Val Ile Val Leu Glu Leu Lys Gly Ser Glu
                 85                  90                  95

Thr Thr Phe Met Cys Glu Tyr Ala Asp Glu Thr Ala Thr Ile Val Glu
             100                 105                 110

Phe Leu Asn Arg Trp Ile Thr Phe Ser Gln Ser Ile Ile Ser Thr Leu
         115                 120                 125

Thr Gly Gly Gly Gly Ser Gly Gly Gly Gly Ser Asp Lys Thr His Thr
130                 135                 140

Cys Pro Pro Cys Pro Ala Pro Glu Ala Ala Gly Gly Pro Ser Val Phe
145                 150                 155                 160

Leu Phe Pro Pro Lys Pro Lys Asp Thr Leu Met Ile Ser Arg Thr Pro
                 165                 170                 175

Glu Val Thr Cys Val Val Val Asp Val Ser His Glu Asp Pro Glu Val
             180                 185                 190

Lys Phe Asn Trp Tyr Val Asp Gly Val Glu Val His Asn Ala Lys Thr
         195                 200                 205

Lys Pro Arg Glu Glu Gln Tyr Asn Ser Thr Tyr Arg Val Val Ser Val
210                 215                 220

Leu Thr Val Leu His Gln Asp Trp Leu Asn Gly Lys Glu Tyr Lys Cys
225                 230                 235                 240

Lys Val Ser Asn Lys Ala Leu Pro Ala Pro Ile Glu Lys Thr Ile Ser
                 245                 250                 255

Lys Ala Lys Gly Gln Pro Arg Glu Pro Gln Val Tyr Thr Leu Pro Pro
             260                 265                 270

Ser Arg Glu Glu Met Thr Lys Asn Gln Val Ser Leu Thr Cys Leu Val
         275                 280                 285

Lys Gly Phe Tyr Pro Ser Asp Ile Ala Val Glu Trp Glu Ser Asn Gly
290                 295                 300

Gln Pro Glu Asn Asn Tyr Lys Thr Thr Pro Pro Val Leu Asp Ser Asp
305                 310                 315                 320

Gly Ser Phe Phe Leu Tyr Ser Lys Leu Thr Val Asp Lys Ser Arg Trp
                 325                 330                 335

Gln Gln Gly Asn Val Phe Ser Cys Ser Val Met His Glu Ala Leu His
             340                 345                 350

Asn His Tyr Thr Gln Lys Ser Leu Ser Leu Ser Pro Gly Lys
         355                 360                 365

<210> SEQ ID NO 26
<211> LENGTH: 133
<212> TYPE: PRT
<213> ORGANISM: artificial sequence
<220> FEATURE:
<223> OTHER INFORMATION: Wild-type IL-2 : IL-2wt

<400> SEQUENCE: 26

Ala Pro Thr Ser Ser Ser Thr Lys Lys Thr Gln Leu Gln Leu Glu His
1               5                   10                  15
```

```
Leu Leu Leu Asp Leu Gln Met Ile Leu Asn Gly Ile Asn Asn Tyr Lys
             20                  25                  30

Asn Pro Lys Leu Thr Arg Met Leu Thr Phe Lys Phe Tyr Met Pro Lys
         35                  40                  45

Lys Ala Thr Glu Leu Lys His Leu Gln Cys Leu Glu Glu Glu Leu Lys
 50                  55                  60

Pro Leu Glu Glu Val Leu Asn Leu Ala Gln Ser Lys Asn Phe His Leu
 65                  70                  75                  80

Arg Pro Arg Asp Leu Ile Ser Asn Ile Asn Val Ile Val Leu Glu Leu
                 85                  90                  95

Lys Gly Ser Glu Thr Thr Phe Met Cys Glu Tyr Ala Asp Glu Thr Ala
            100                 105                 110

Thr Ile Val Glu Phe Leu Asn Arg Trp Ile Thr Phe Ser Gln Ser Ile
            115                 120                 125

Ile Ser Thr Leu Thr
        130
```

<210> SEQ ID NO 27
<211> LENGTH: 133
<212> TYPE: PRT
<213> ORGANISM: artificial sequence
<220> FEATURE:
<223> OTHER INFORMATION: IL-2 mutant : IL-2.3X

<400> SEQUENCE: 27

```
Ala Pro Thr Ser Ser Ser Thr Lys Lys Thr Gln Leu Gln Leu Glu His
 1               5                  10                  15

Leu Leu Leu Asp Leu Gln Met Ile Leu Asn Gly Ile Asn Asn Tyr Lys
             20                  25                  30

Asn Pro Lys Leu Thr Asp Met Leu Thr Phe Glu Phe Tyr Met Pro Lys
         35                  40                  45

Lys Ala Thr Glu Leu Lys His Leu Gln Cys Leu Glu Arg Glu Leu Lys
 50                  55                  60

Pro Leu Glu Glu Val Leu Asn Leu Ala Gln Ser Lys Asn Phe His Leu
 65                  70                  75                  80

Arg Pro Arg Asp Leu Ile Ser Asn Ile Asn Val Ile Val Leu Glu Leu
                 85                  90                  95

Lys Gly Ser Glu Thr Thr Phe Met Cys Glu Tyr Ala Asp Glu Thr Ala
            100                 105                 110

Thr Ile Val Glu Phe Leu Asn Arg Trp Ile Thr Phe Ser Gln Ser Ile
            115                 120                 125

Ile Ser Thr Leu Thr
        130
```

<210> SEQ ID NO 28
<211> LENGTH: 227
<212> TYPE: PRT
<213> ORGANISM: artificial sequence
<220> FEATURE:
<223> OTHER INFORMATION: Mutant Fc region : FcLALA

<400> SEQUENCE: 28

```
Asp Lys Thr His Thr Cys Pro Pro Cys Pro Ala Pro Glu Ala Ala Gly
 1               5                  10                  15

Gly Pro Ser Val Phe Leu Phe Pro Pro Lys Pro Lys Asp Thr Leu Met
             20                  25                  30

Ile Ser Arg Thr Pro Glu Val Thr Cys Val Val Val Asp Val Ser His
         35                  40                  45
```

Glu Asp Pro Glu Val Lys Phe Asn Trp Tyr Val Asp Gly Val Glu Val
 50                  55                  60

His Asn Ala Lys Thr Lys Pro Arg Glu Glu Gln Tyr Asn Ser Thr Tyr
 65                  70                  75                  80

Arg Val Val Ser Val Leu Thr Val Leu His Gln Asp Trp Leu Asn Gly
                 85                  90                  95

Lys Glu Tyr Lys Cys Lys Val Ser Asn Lys Ala Leu Pro Ala Pro Ile
            100                 105                 110

Glu Lys Thr Ile Ser Lys Ala Lys Gly Gln Pro Arg Glu Pro Gln Val
        115                 120                 125

Tyr Thr Leu Pro Pro Ser Arg Glu Glu Met Thr Lys Asn Gln Val Ser
    130                 135                 140

Leu Thr Cys Leu Val Lys Gly Phe Tyr Pro Ser Asp Ile Ala Val Glu
145                 150                 155                 160

Trp Glu Ser Asn Gly Gln Pro Glu Asn Asn Tyr Lys Thr Thr Pro Pro
                165                 170                 175

Val Leu Asp Ser Asp Gly Ser Phe Phe Leu Tyr Ser Lys Leu Thr Val
            180                 185                 190

Asp Lys Ser Arg Trp Gln Gln Gly Asn Val Phe Ser Cys Ser Val Met
        195                 200                 205

His Glu Ala Leu His Asn His Tyr Thr Gln Lys Ser Leu Ser Leu Ser
    210                 215                 220

Pro Gly Lys
225

<210> SEQ ID NO 29
<211> LENGTH: 153
<212> TYPE: PRT
<213> ORGANISM: human

<400> SEQUENCE: 29

Met Tyr Arg Met Gln Leu Leu Ser Cys Ile Ala Leu Ser Leu Ala Leu
 1                   5                  10                  15

Val Thr Asn Ser Ala Pro Thr Ser Ser Ser Thr Lys Lys Thr Gln Leu
                 20                  25                  30

Gln Leu Glu His Leu Leu Leu Asp Leu Gln Met Ile Leu Asn Gly Ile
            35                  40                  45

Asn Asn Tyr Lys Asn Pro Lys Leu Thr Arg Met Leu Thr Phe Lys Phe
 50                  55                  60

Tyr Met Pro Lys Lys Ala Thr Glu Leu Lys His Leu Gln Cys Leu Glu
 65                  70                  75                  80

Glu Glu Leu Lys Pro Leu Glu Glu Val Leu Asn Leu Ala Gln Ser Lys
                 85                  90                  95

Asn Phe His Leu Arg Pro Arg Asp Leu Ile Ser Asn Ile Asn Val Ile
            100                 105                 110

Val Leu Glu Leu Lys Gly Ser Glu Thr Thr Phe Met Cys Glu Tyr Ala
        115                 120                 125

Asp Glu Thr Ala Thr Ile Val Glu Phe Leu Asn Arg Trp Ile Thr Phe
    130                 135                 140

Cys Gln Ser Ile Ile Ser Thr Leu Thr
145                 150

<210> SEQ ID NO 30
<211> LENGTH: 133
<212> TYPE: PRT

<213> ORGANISM: human

<400> SEQUENCE: 30

Ala Pro Thr Ser Ser Ser Thr Lys Lys Thr Gln Leu Gln Leu Glu His
1               5                   10                  15

Leu Leu Leu Asp Leu Gln Met Ile Leu Asn Gly Ile Asn Asn Tyr Lys
            20                  25                  30

Asn Pro Lys Leu Thr Arg Met Leu Thr Phe Lys Phe Tyr Met Pro Lys
        35                  40                  45

Lys Ala Thr Glu Leu Lys His Leu Gln Cys Leu Glu Glu Glu Leu Lys
    50                  55                  60

Pro Leu Glu Glu Val Leu Asn Leu Ala Gln Ser Lys Asn Phe His Leu
65                  70                  75                  80

Arg Pro Arg Asp Leu Ile Ser Asn Ile Asn Val Ile Val Leu Glu Leu
                85                  90                  95

Lys Gly Ser Glu Thr Thr Phe Met Cys Glu Tyr Ala Asp Glu Thr Ala
            100                 105                 110

Thr Ile Val Glu Phe Leu Asn Arg Trp Ile Thr Phe Cys Gln Ser Ile
        115                 120                 125

Ile Ser Thr Leu Thr
        130

<210> SEQ ID NO 31
<211> LENGTH: 133
<212> TYPE: PRT
<213> ORGANISM: artificial sequence
<220> FEATURE:
<223> OTHER INFORMATION: L007 : IL-2.glycan1

<400> SEQUENCE: 31

Ala Pro Thr Ser Ser Ser Thr Lys Lys Thr Gln Leu Gln Leu Glu His
1               5                   10                  15

Leu Leu Leu Asp Leu Gln Met Ile Leu Asn Gly Ile Asn Asn Tyr Lys
            20                  25                  30

Asn Pro Asn Leu Thr Arg Met Leu Thr Phe Lys Phe Tyr Met Pro Lys
        35                  40                  45

Lys Ala Thr Glu Leu Lys His Leu Gln Cys Leu Glu Glu Glu Leu Lys
    50                  55                  60

Pro Leu Glu Glu Val Leu Asn Leu Ala Gln Ser Lys Asn Phe His Leu
65                  70                  75                  80

Arg Pro Arg Asp Leu Ile Ser Asn Ile Asn Val Ile Val Leu Glu Leu
                85                  90                  95

Lys Gly Ser Glu Thr Thr Phe Met Cys Glu Tyr Ala Asp Glu Thr Ala
            100                 105                 110

Thr Ile Val Glu Phe Leu Asn Arg Trp Ile Thr Phe Ser Gln Ser Ile
        115                 120                 125

Ile Ser Thr Leu Thr
        130

<210> SEQ ID NO 32
<211> LENGTH: 133
<212> TYPE: PRT
<213> ORGANISM: artificial sequence
<220> FEATURE:
<223> OTHER INFORMATION: L008 : IL-2.glycan2

<400> SEQUENCE: 32

Ala Pro Thr Ser Ser Ser Thr Lys Lys Thr Gln Leu Gln Leu Glu His

```
                1               5                  10                 15
Leu Leu Leu Asp Leu Gln Met Ile Leu Asn Gly Ile Asn Asn Tyr Lys
                20                 25                 30
Asn Pro Lys Leu Thr Asn Met Ser Thr Phe Lys Phe Tyr Met Pro Lys
                35                 40                 45
Lys Ala Thr Glu Leu Lys His Leu Gln Cys Leu Glu Glu Leu Lys
        50                 55                 60
Pro Leu Glu Glu Val Leu Asn Leu Ala Gln Ser Lys Asn Phe His Leu
65                 70                 75                 80
Arg Pro Arg Asp Leu Ile Ser Asn Ile Asn Val Ile Val Leu Glu Leu
                85                 90                 95
Lys Gly Ser Glu Thr Thr Phe Met Cys Glu Tyr Ala Asp Glu Thr Ala
                100                105                110
Thr Ile Val Glu Phe Leu Asn Arg Trp Ile Thr Phe Ser Gln Ser Ile
                115                120                125
Ile Ser Thr Leu Thr
        130

<210> SEQ ID NO 33
<211> LENGTH: 133
<212> TYPE: PRT
<213> ORGANISM: artificial sequence
<220> FEATURE:
<223> OTHER INFORMATION: L009 : IL-2.glycan3

<400> SEQUENCE: 33

Ala Pro Thr Ser Ser Ser Thr Lys Lys Thr Gln Leu Gln Leu Glu His
1               5                  10                 15
Leu Leu Leu Asp Leu Gln Met Ile Leu Asn Gly Ile Asn Asn Tyr Lys
                20                 25                 30
Asn Pro Lys Leu Thr Arg Met Leu Thr Phe Lys Phe Tyr Met Pro Lys
                35                 40                 45
Lys Ala Thr Glu Leu Lys His Leu Gln Cys Leu Glu Glu Leu Lys
        50                 55                 60
Pro Leu Glu Asn Val Ser Asn Leu Ala Gln Ser Lys Asn Phe His Leu
65                 70                 75                 80
Arg Pro Arg Asp Leu Ile Ser Asn Ile Asn Val Ile Val Leu Glu Leu
                85                 90                 95
Lys Gly Ser Glu Thr Thr Phe Met Cys Glu Tyr Ala Asp Glu Thr Ala
                100                105                110
Thr Ile Val Glu Phe Leu Asn Arg Trp Ile Thr Phe Ser Gln Ser Ile
                115                120                125
Ile Ser Thr Leu Thr
        130

<210> SEQ ID NO 34
<211> LENGTH: 133
<212> TYPE: PRT
<213> ORGANISM: artificial sequence
<220> FEATURE:
<223> OTHER INFORMATION: L010 : IL-2.glycan4

<400> SEQUENCE: 34

Ala Pro Thr Ser Ser Ser Thr Lys Lys Thr Gln Leu Gln Leu Glu His
1               5                  10                 15
Leu Leu Leu Asp Leu Gln Met Ile Leu Asn Gly Ile Asn Asn Tyr Lys
                20                 25                 30
```

Asn Pro Lys Leu Thr Arg Met Leu Thr Phe Lys Phe Asn Met Ser Lys
                35                  40                  45

Lys Ala Thr Glu Leu Lys His Leu Gln Cys Leu Glu Glu Glu Leu Lys
 50                      55                  60

Pro Leu Glu Glu Val Leu Asn Leu Ala Gln Ser Lys Asn Phe His Leu
 65                  70                  75                  80

Arg Pro Arg Asp Leu Ile Ser Asn Ile Asn Val Ile Val Leu Glu Leu
                 85                  90                  95

Lys Gly Ser Glu Thr Thr Phe Met Cys Glu Tyr Ala Asp Glu Thr Ala
                100                 105                 110

Thr Ile Val Glu Phe Leu Asn Arg Trp Ile Thr Phe Ser Gln Ser Ile
                115                 120                 125

Ile Ser Thr Leu Thr
            130

<210> SEQ ID NO 35
<211> LENGTH: 133
<212> TYPE: PRT
<213> ORGANISM: artificial sequence
<220> FEATURE:
<223> OTHER INFORMATION: L011 : IL-2.glycan5

<400> SEQUENCE: 35

Ala Pro Thr Ser Ser Ser Thr Lys Lys Thr Gln Leu Gln Leu Glu His
 1               5                  10                  15

Leu Leu Leu Asp Leu Gln Met Ile Leu Asn Gly Ile Asn Asn Tyr Lys
                 20                  25                  30

Asn Pro Lys Leu Thr Arg Met Leu Thr Phe Asn Phe Thr Met Pro Lys
                35                  40                  45

Lys Ala Thr Glu Leu Lys His Leu Gln Cys Leu Glu Glu Glu Leu Lys
 50                      55                  60

Pro Leu Glu Glu Val Leu Asn Leu Ala Gln Ser Lys Asn Phe His Leu
 65                  70                  75                  80

Arg Pro Arg Asp Leu Ile Ser Asn Ile Asn Val Ile Val Leu Glu Leu
                 85                  90                  95

Lys Gly Ser Glu Thr Thr Phe Met Cys Glu Tyr Ala Asp Glu Thr Ala
                100                 105                 110

Thr Ile Val Glu Phe Leu Asn Arg Trp Ile Thr Phe Ser Gln Ser Ile
                115                 120                 125

Ile Ser Thr Leu Thr
            130

<210> SEQ ID NO 36
<211> LENGTH: 133
<212> TYPE: PRT
<213> ORGANISM: artificial sequence
<220> FEATURE:
<223> OTHER INFORMATION: L012 : IL-2.glycan6

<400> SEQUENCE: 36

Ala Pro Thr Ser Ser Ser Thr Lys Lys Thr Gln Leu Gln Leu Glu His
 1               5                  10                  15

Leu Leu Leu Asp Leu Gln Met Ile Leu Asn Gly Ile Asn Asn Tyr Lys
                 20                  25                  30

Asn Pro Lys Leu Thr Arg Met Leu Thr Phe Lys Phe Tyr Met Pro Lys
                35                  40                  45

Lys Ala Thr Glu Leu Lys His Leu Gln Cys Leu Glu Glu Asn Leu Thr
 50                      55                  60

```
Pro Leu Glu Glu Val Leu Asn Leu Ala Gln Ser Lys Asn Phe His Leu
65                  70                  75                  80

Arg Pro Arg Asp Leu Ile Ser Asn Ile Asn Val Ile Val Leu Glu Leu
                85                  90                  95

Lys Gly Ser Glu Thr Thr Phe Met Cys Glu Tyr Ala Asp Glu Thr Ala
            100                 105                 110

Thr Ile Val Glu Phe Leu Asn Arg Trp Ile Thr Phe Ser Gln Ser Ile
        115                 120                 125

Ile Ser Thr Leu Thr
        130

<210> SEQ ID NO 37
<211> LENGTH: 133
<212> TYPE: PRT
<213> ORGANISM: artificial sequence
<220> FEATURE:
<223> OTHER INFORMATION: L013 : IL-2.glycan7

<400> SEQUENCE: 37

Ala Pro Thr Ser Ser Ser Thr Lys Lys Thr Gln Leu Gln Leu Glu His
1               5                   10                  15

Leu Leu Leu Asp Leu Gln Met Ile Leu Asn Gly Ile Asn Asn Tyr Lys
                20                  25                  30

Asn Pro Lys Leu Thr Arg Met Leu Thr Phe Lys Phe Tyr Met Pro Lys
            35                  40                  45

Lys Ala Thr Glu Leu Lys His Leu Gln Cys Leu Glu Glu Glu Leu Lys
        50                  55                  60

Pro Leu Glu Glu Val Leu Asn Asn Ala Thr Ser Lys Asn Phe His Leu
65                  70                  75                  80

Arg Pro Arg Asp Leu Ile Ser Asn Ile Asn Val Ile Val Leu Glu Leu
                85                  90                  95

Lys Gly Ser Glu Thr Thr Phe Met Cys Glu Tyr Ala Asp Glu Thr Ala
            100                 105                 110

Thr Ile Val Glu Phe Leu Asn Arg Trp Ile Thr Phe Ser Gln Ser Ile
        115                 120                 125

Ile Ser Thr Leu Thr
        130

<210> SEQ ID NO 38
<211> LENGTH: 133
<212> TYPE: PRT
<213> ORGANISM: artificial sequence
<220> FEATURE:
<223> OTHER INFORMATION: L014 : IL-2.glycan8

<400> SEQUENCE: 38

Ala Pro Thr Ser Ser Ser Thr Lys Lys Thr Gln Leu Gln Leu Glu His
1               5                   10                  15

Leu Leu Leu Asp Leu Gln Met Ile Leu Asn Gly Ile Asn Asn Tyr Lys
                20                  25                  30

Asn Pro Lys Leu Thr Arg Met Leu Thr Phe Lys Phe Tyr Met Pro Lys
            35                  40                  45

Lys Ala Thr Glu Leu Lys His Leu Gln Cys Leu Glu Glu Glu Leu Lys
        50                  55                  60

Pro Leu Glu Glu Val Leu Asn Leu Ala Asn Ser Thr Asn Phe His Leu
65                  70                  75                  80

Arg Pro Arg Asp Leu Ile Ser Asn Ile Asn Val Ile Val Leu Glu Leu
```

```
                85                  90                  95
Lys Gly Ser Glu Thr Thr Phe Met Cys Glu Tyr Ala Asp Glu Thr Ala
            100                 105                 110

Thr Ile Val Glu Phe Leu Asn Arg Trp Ile Thr Phe Ser Gln Ser Ile
            115                 120                 125

Ile Ser Thr Leu Thr
            130

<210> SEQ ID NO 39
<211> LENGTH: 133
<212> TYPE: PRT
<213> ORGANISM: artificial sequence
<220> FEATURE:
<223> OTHER INFORMATION: L015 : IL-2.glycan9

<400> SEQUENCE: 39

Ala Pro Thr Ser Ser Ser Thr Lys Lys Thr Gln Leu Gln Leu Glu His
1               5                   10                  15

Leu Leu Leu Asp Leu Gln Met Ile Leu Asn Gly Ile Asn Asn Tyr Lys
            20                  25                  30

Asn Pro Lys Leu Thr Arg Met Leu Asn Phe Ser Phe Tyr Met Pro Lys
        35                  40                  45

Lys Ala Thr Glu Leu Lys His Leu Gln Cys Leu Glu Glu Glu Leu Lys
    50                  55                  60

Pro Leu Glu Glu Val Leu Asn Leu Ala Gln Ser Lys Asn Phe His Leu
65                  70                  75                  80

Arg Pro Arg Asp Leu Ile Ser Asn Ile Asn Val Ile Val Leu Glu Leu
                85                  90                  95

Lys Gly Ser Glu Thr Thr Phe Met Cys Glu Tyr Ala Asp Glu Thr Ala
            100                 105                 110

Thr Ile Val Glu Phe Leu Asn Arg Trp Ile Thr Phe Ser Gln Ser Ile
            115                 120                 125

Ile Ser Thr Leu Thr
            130

<210> SEQ ID NO 40
<211> LENGTH: 129
<212> TYPE: PRT
<213> ORGANISM: artificial sequence
<220> FEATURE:
<223> OTHER INFORMATION: L017 : IL-2hyb15BCL

<400> SEQUENCE: 40

Ala Pro Thr Ser Ser Ser Thr Lys Lys Thr Gln Leu Gln Leu Glu His
1               5                   10                  15

Leu Leu Leu Asp Leu Gln Met Ile Leu Asn Gly Ile Asn Asn Tyr Lys
            20                  25                  30

Asn Pro Lys Leu Thr Arg Met Leu Thr Phe Lys Phe Tyr Met Pro Lys
        35                  40                  45

Lys Ala Thr Glu Leu Lys His Leu Gln Cys Leu Glu Glu Glu Leu Lys
    50                  55                  60

Pro Leu Glu Glu Val Leu Asn Leu Ser Gly Asp Ala Ser Ile His Asp
65                  70                  75                  80

Leu Ile Ser Asn Ile Asn Val Ile Val Leu Glu Leu Lys Gly Ser Glu
                85                  90                  95

Thr Thr Phe Met Cys Glu Tyr Ala Asp Glu Thr Ala Thr Ile Val Glu
            100                 105                 110
```

```
Phe Leu Asn Arg Trp Ile Thr Phe Ser Gln Ser Ile Ile Ser Thr Leu
            115                 120                 125

Thr

<210> SEQ ID NO 41
<211> LENGTH: 129
<212> TYPE: PRT
<213> ORGANISM: artificial sequence
<220> FEATURE:
<223> OTHER INFORMATION: L057 : IL-2truncate1

<400> SEQUENCE: 41

Ala Pro Thr Ser Ser Ser Thr Lys Lys Thr Gln Leu Gln Leu Glu His
1               5                   10                  15

Leu Leu Leu Asp Leu Gln Met Ile Leu Asn Gly Ile Asn Asn Tyr Lys
            20                  25                  30

Asn Pro Lys Leu Thr Arg Met Leu Thr Phe Lys Phe Tyr Met Pro Lys
        35                  40                  45

Lys Ala Thr Glu Leu Lys His Leu Gln Cys Leu Glu Glu Glu Leu Lys
50                  55                  60

Pro Leu Glu Glu Val Leu Asn Leu Ala Gln Ser Lys Asn Phe His Asp
65                  70                  75                  80

Leu Ile Ser Asn Ile Asn Val Ile Val Leu Glu Leu Lys Gly Ser Glu
            85                  90                  95

Thr Thr Phe Met Cys Glu Tyr Ala Asp Glu Thr Ala Thr Ile Val Glu
            100                 105                 110

Phe Leu Asn Arg Trp Ile Thr Phe Ser Gln Ser Ile Ile Ser Thr Leu
            115                 120                 125

Thr

<210> SEQ ID NO 42
<211> LENGTH: 129
<212> TYPE: PRT
<213> ORGANISM: artificial sequence
<220> FEATURE:
<223> OTHER INFORMATION: L058 : IL-2truncate2

<400> SEQUENCE: 42

Ala Pro Thr Ser Ser Ser Thr Lys Lys Thr Gln Leu Gln Leu Glu His
1               5                   10                  15

Leu Leu Leu Asp Leu Gln Met Ile Leu Asn Gly Ile Asn Asn Tyr Lys
            20                  25                  30

Asn Pro Lys Leu Thr Arg Met Leu Thr Phe Lys Phe Tyr Met Pro Lys
        35                  40                  45

Lys Ala Thr Glu Leu Lys His Leu Gln Cys Leu Glu Glu Glu Leu Lys
50                  55                  60

Pro Leu Glu Glu Val Leu Asn Leu Ala Gly Ser Lys Asn Phe His Asp
65                  70                  75                  80

Leu Ile Ser Asn Ile Asn Val Ile Val Leu Glu Leu Lys Gly Ser Glu
            85                  90                  95

Thr Thr Phe Met Cys Glu Tyr Ala Asp Glu Thr Ala Thr Ile Val Glu
            100                 105                 110

Phe Leu Asn Arg Trp Ile Thr Phe Ser Gln Ser Ile Ile Ser Thr Leu
            115                 120                 125

Thr

<210> SEQ ID NO 43
```

<211> LENGTH: 129
<212> TYPE: PRT
<213> ORGANISM: artificial sequence
<220> FEATURE:
<223> OTHER INFORMATION: L059 : IL-2 truncate3

<400> SEQUENCE: 43

Ala Pro Thr Ser Ser Ser Thr Lys Lys Thr Gln Leu Gln Leu Glu His
1               5                   10                  15

Leu Leu Leu Asp Leu Gln Met Ile Leu Asn Gly Ile Asn Asn Tyr Lys
            20                  25                  30

Asn Pro Lys Leu Thr Arg Met Leu Thr Phe Lys Phe Tyr Met Pro Lys
        35                  40                  45

Lys Ala Thr Glu Leu Lys His Leu Gln Cys Leu Glu Glu Glu Leu Lys
    50                  55                  60

Pro Leu Glu Glu Val Leu Asn Leu Ala Gln Ser Ala Asn Phe His Asp
65                  70                  75                  80

Leu Ile Ser Asn Ile Asn Val Ile Val Leu Glu Leu Lys Gly Ser Glu
                85                  90                  95

Thr Thr Phe Met Cys Glu Tyr Ala Asp Glu Thr Ala Thr Ile Val Glu
            100                 105                 110

Phe Leu Asn Arg Trp Ile Thr Phe Ser Gln Ser Ile Ile Ser Thr Leu
        115                 120                 125

Thr

<210> SEQ ID NO 44
<211> LENGTH: 129
<212> TYPE: PRT
<213> ORGANISM: artificial sequence
<220> FEATURE:
<223> OTHER INFORMATION: L060 : IL-2 truncate4

<400> SEQUENCE: 44

Ala Pro Thr Ser Ser Ser Thr Lys Lys Thr Gln Leu Gln Leu Glu His
1               5                   10                  15

Leu Leu Leu Asp Leu Gln Met Ile Leu Asn Gly Ile Asn Asn Tyr Lys
            20                  25                  30

Asn Pro Lys Leu Thr Arg Met Leu Thr Phe Lys Phe Tyr Met Pro Lys
        35                  40                  45

Lys Ala Thr Glu Leu Lys His Leu Gln Cys Leu Glu Glu Glu Leu Lys
    50                  55                  60

Pro Leu Glu Glu Val Leu Asn Leu Ala Gln Ser Ala Asn Ile His Asp
65                  70                  75                  80

Leu Ile Ser Asn Ile Asn Val Ile Val Leu Glu Leu Lys Gly Ser Glu
                85                  90                  95

Thr Thr Phe Met Cys Glu Tyr Ala Asp Glu Thr Ala Thr Ile Val Glu
            100                 105                 110

Phe Leu Asn Arg Trp Ile Thr Phe Ser Gln Ser Ile Ile Ser Thr Leu
        115                 120                 125

Thr

<210> SEQ ID NO 45
<211> LENGTH: 133
<212> TYPE: PRT
<213> ORGANISM: artificial sequence
<220> FEATURE:
<223> OTHER INFORMATION: Combinatorial mutation : IL-2 glycan5.glycan8

<400> SEQUENCE: 45

```
Ala Pro Thr Ser Ser Ser Thr Lys Lys Thr Gln Leu Gln Leu Glu His
1               5                   10                  15

Leu Leu Leu Asp Leu Gln Met Ile Leu Asn Gly Ile Asn Asn Tyr Lys
            20                  25                  30

Asn Pro Lys Leu Thr Arg Met Leu Thr Phe Asn Phe Thr Met Pro Lys
        35                  40                  45

Lys Ala Thr Glu Leu Lys His Leu Gln Cys Leu Glu Glu Glu Leu Lys
    50                  55                  60

Pro Leu Glu Glu Val Leu Asn Leu Ala Asn Ser Thr Asn Phe His Leu
65                  70                  75                  80

Arg Pro Arg Asp Leu Ile Ser Asn Ile Asn Val Ile Val Leu Glu Leu
                85                  90                  95

Lys Gly Ser Glu Thr Thr Phe Met Cys Glu Tyr Ala Asp Glu Thr Ala
                100                 105                 110

Thr Ile Val Glu Phe Leu Asn Arg Trp Ile Thr Phe Ser Gln Ser Ile
            115                 120                 125

Ile Ser Thr Leu Thr
        130
```

<210> SEQ ID NO 46
<211> LENGTH: 133
<212> TYPE: PRT
<213> ORGANISM: artificial sequence
<220> FEATURE:
<223> OTHER INFORMATION: Combinatorial mutation : IL-2 glycan5.glycan1

<400> SEQUENCE: 46

```
Ala Pro Thr Ser Ser Ser Thr Lys Lys Thr Gln Leu Gln Leu Glu His
1               5                   10                  15

Leu Leu Leu Asp Leu Gln Met Ile Leu Asn Gly Ile Asn Asn Tyr Lys
            20                  25                  30

Asn Pro Asn Leu Thr Arg Met Leu Thr Phe Asn Phe Thr Met Pro Lys
        35                  40                  45

Lys Ala Thr Glu Leu Lys His Leu Gln Cys Leu Glu Glu Glu Leu Lys
    50                  55                  60

Pro Leu Glu Glu Val Leu Asn Leu Ala Gln Ser Lys Asn Phe His Leu
65                  70                  75                  80

Arg Pro Arg Asp Leu Ile Ser Asn Ile Asn Val Ile Val Leu Glu Leu
                85                  90                  95

Lys Gly Ser Glu Thr Thr Phe Met Cys Glu Tyr Ala Asp Glu Thr Ala
                100                 105                 110

Thr Ile Val Glu Phe Leu Asn Arg Trp Ile Thr Phe Ser Gln Ser Ile
            115                 120                 125

Ile Ser Thr Leu Thr
        130
```

<210> SEQ ID NO 47
<211> LENGTH: 133
<212> TYPE: PRT
<213> ORGANISM: artificial sequence
<220> FEATURE:
<223> OTHER INFORMATION: Combinatorial mutation : IL-2 glycan5.K35Q

<400> SEQUENCE: 47

```
Ala Pro Thr Ser Ser Ser Thr Lys Lys Thr Gln Leu Gln Leu Glu His
1               5                   10                  15

Leu Leu Leu Asp Leu Gln Met Ile Leu Asn Gly Ile Asn Asn Tyr Lys
```

```
                    20                  25                  30

Asn Pro Gln Leu Thr Arg Met Leu Thr Phe Asn Phe Thr Met Pro Lys
            35                  40                  45

Lys Ala Thr Glu Leu Lys His Leu Gln Cys Leu Glu Glu Glu Leu Lys
        50                  55                  60

Pro Leu Glu Glu Val Leu Asn Leu Ala Gln Ser Lys Asn Phe His Leu
65                  70                  75                  80

Arg Pro Arg Asp Leu Ile Ser Asn Ile Asn Val Ile Val Leu Glu Leu
                85                  90                  95

Lys Gly Ser Glu Thr Thr Phe Met Cys Glu Tyr Ala Asp Glu Thr Ala
            100                 105                 110

Thr Ile Val Glu Phe Leu Asn Arg Trp Ile Thr Phe Ser Gln Ser Ile
        115                 120                 125

Ile Ser Thr Leu Thr
        130

<210> SEQ ID NO 48
<211> LENGTH: 129
<212> TYPE: PRT
<213> ORGANISM: artificial sequence
<220> FEATURE:
<223> OTHER INFORMATION: Combinatorial mutation : IL-2 glycan5.15BCL

<400> SEQUENCE: 48

Ala Pro Thr Ser Ser Ser Thr Lys Lys Thr Gln Leu Gln Leu Glu His
1               5                   10                  15

Leu Leu Leu Asp Leu Gln Met Ile Leu Asn Gly Ile Asn Asn Tyr Lys
                20                  25                  30

Asn Pro Lys Leu Thr Arg Met Leu Thr Phe Asn Phe Thr Met Pro Lys
            35                  40                  45

Lys Ala Thr Glu Leu Lys His Leu Gln Cys Leu Glu Glu Glu Leu Lys
        50                  55                  60

Pro Leu Glu Glu Val Leu Asn Leu Ser Gly Asp Ala Ser Ile His Asp
65                  70                  75                  80

Leu Ile Ser Asn Ile Asn Val Ile Val Leu Glu Leu Lys Gly Ser Glu
                85                  90                  95

Thr Thr Phe Met Cys Glu Tyr Ala Asp Glu Thr Ala Thr Ile Val Glu
            100                 105                 110

Phe Leu Asn Arg Trp Ile Thr Phe Ser Gln Ser Ile Ile Ser Thr Leu
        115                 120                 125

Thr

<210> SEQ ID NO 49
<211> LENGTH: 129
<212> TYPE: PRT
<213> ORGANISM: artificial sequence
<220> FEATURE:
<223> OTHER INFORMATION: Combinatorial mutation : IL-2 glycan5.truncate1

<400> SEQUENCE: 49

Ala Pro Thr Ser Ser Ser Thr Lys Lys Thr Gln Leu Gln Leu Glu His
1               5                   10                  15

Leu Leu Leu Asp Leu Gln Met Ile Leu Asn Gly Ile Asn Asn Tyr Lys
                20                  25                  30

Asn Pro Lys Leu Thr Arg Met Leu Thr Phe Asn Phe Thr Met Pro Lys
            35                  40                  45

Lys Ala Thr Glu Leu Lys His Leu Gln Cys Leu Glu Glu Glu Leu Lys
```

```
                    50                  55                  60
Pro Leu Glu Glu Val Leu Asn Leu Ala Gln Ser Lys Asn Phe His Asp
65                  70                  75                  80

Leu Ile Ser Asn Ile Asn Val Ile Val Leu Glu Leu Lys Gly Ser Glu
                85                  90                  95

Thr Thr Phe Met Cys Glu Tyr Ala Asp Glu Thr Ala Thr Ile Val Glu
                100                 105                 110

Phe Leu Asn Arg Trp Ile Thr Phe Ser Gln Ser Ile Ile Ser Thr Leu
            115                 120                 125

Thr

<210> SEQ ID NO 50
<211> LENGTH: 129
<212> TYPE: PRT
<213> ORGANISM: artificial sequence
<220> FEATURE:
<223> OTHER INFORMATION: Combinatorial mutation : IL-2 glycan5.truncate2

<400> SEQUENCE: 50

Ala Pro Thr Ser Ser Ser Thr Lys Lys Thr Gln Leu Gln Leu Glu His
1               5                   10                  15

Leu Leu Leu Asp Leu Gln Met Ile Leu Asn Gly Ile Asn Asn Tyr Lys
                20                  25                  30

Asn Pro Lys Leu Thr Arg Met Leu Thr Phe Asn Phe Thr Met Pro Lys
            35                  40                  45

Lys Ala Thr Glu Leu Lys His Leu Gln Cys Leu Glu Glu Glu Leu Lys
        50                  55                  60

Pro Leu Glu Glu Val Leu Asn Leu Ala Gly Ser Lys Asn Phe His Asp
65                  70                  75                  80

Leu Ile Ser Asn Ile Asn Val Ile Val Leu Glu Leu Lys Gly Ser Glu
                85                  90                  95

Thr Thr Phe Met Cys Glu Tyr Ala Asp Glu Thr Ala Thr Ile Val Glu
                100                 105                 110

Phe Leu Asn Arg Trp Ile Thr Phe Ser Gln Ser Ile Ile Ser Thr Leu
            115                 120                 125

Thr
```